United States Patent
Shigenaga et al.

(10) Patent No.: US 9,747,454 B2
(45) Date of Patent: Aug. 29, 2017

(54) DIRECTIVITY CONTROL SYSTEM AND SOUND OUTPUT CONTROL METHOD

(71) Applicant: Panasonic Intellectual Property Management Co., Ltd., Osaka (JP)

(72) Inventors: Shinichi Shigenaga, Fukuoka (JP);
Hirotaka Sawa, Fukuoka (JP);
Kazunori Hayashi, Fukuoka (JP);
Toshimichi Tokuda, Fukuoka (JP);
Shintaro Yoshikuni, Fukuoka (JP);
Kosuke Shinozaki, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 136 days.

(21) Appl. No.: 14/311,910

(22) Filed: Jun. 23, 2014

(65) Prior Publication Data
US 2014/0376740 A1 Dec. 25, 2014

(30) Foreign Application Priority Data

Jun. 24, 2013 (JP) .................................. 2013-131797
Oct. 28, 2013 (JP) .................................. 2013-223717

(51) Int. Cl.
*H04R 3/00* (2006.01)
*G06F 21/60* (2013.01)
(Continued)

(52) U.S. Cl.
CPC .......... *G06F 21/60* (2013.01); *G08B 13/1672* (2013.01); *G08B 13/19652* (2013.01);
(Continued)

(58) Field of Classification Search
CPC ............... G06F 21/60; G06B 13/1672; G06B 13/19652; G06B 13/19686;
(Continued)

(56) References Cited

U.S. PATENT DOCUMENTS

2001/0024233 A1\* 9/2001 Urisaka .................. H04N 5/232
348/211.6
2005/0140810 A1 6/2005 Ozawa
(Continued)

FOREIGN PATENT DOCUMENTS

EP 1 526 756 A2 4/2005
EP 2 276 007 A1 1/2011
(Continued)

OTHER PUBLICATIONS

Extended European Search Report dated Oct. 20, 2014, for corresponding EP Application No. 14173531.6-1803, 8 pages.

*Primary Examiner* — Andrew L Sniezek
(74) *Attorney, Agent, or Firm* — Seed IP Law Group LLP

(57) ABSTRACT

A system includes an imaging part that captures an image, a sound collection part that collects sounds, a display part that displays image data captured by the imaging part, a directive direction calculation part that calculates a directive direction which directs toward a sound position corresponding to a designated position of the image data from the sound collection part when any position of the displayed image data is designated, and a control part that forms a directivity in the sounds in the calculated directive direction. The control part controls output of the sounds collected by the sound collection part or output of the sounds which are collected by the sound collection part and of which the directivity is formed, or suspends collection of sounds in the sound collection part, when it is determined that the sound position is included in a preset protection region.

20 Claims, 28 Drawing Sheets

(51) Int. Cl.
*G08B 13/16* (2006.01)
*G08B 13/196* (2006.01)

(52) U.S. Cl.
CPC . *G08B 13/19686* (2013.01); *G08B 13/19695* (2013.01); *H04R 3/005* (2013.01); *H04R 2201/401* (2013.01); *H04R 2430/23* (2013.01)

(58) Field of Classification Search
CPC .............. G06B 13/19695; H04R 3/005; H04R 2201/401; H04R 2430/23
See application file for complete search history.

(56) References Cited

U.S. PATENT DOCUMENTS

| | | | |
|---|---|---|---|
| 2010/0254543 A1* | 10/2010 | Kjolerbakken | H04R 27/00 381/92 |
| 2011/0074978 A1 | 3/2011 | Kogane et al. | |
| 2011/0082690 A1 | 4/2011 | Togami et al. | |
| 2012/0300022 A1 | 11/2012 | Kaneko | |
| 2014/0085538 A1* | 3/2014 | Kaine | H04N 9/802 348/462 |

FOREIGN PATENT DOCUMENTS

| | | |
|---|---|---|
| EP | 2 288 139 A1 | 2/2011 |
| JP | 2008-193196 A | 8/2008 |
| JP | 2008-309959 A | 12/2008 |
| JP | 2012-078900 A | 4/2012 |
| JP | 2012-129854 A | 7/2012 |
| JP | 2012-186551 A | 9/2012 |
| JP | 2013-007911 A | 1/2013 |
| WO | 2008/016360 A1 | 2/2008 |

\* cited by examiner

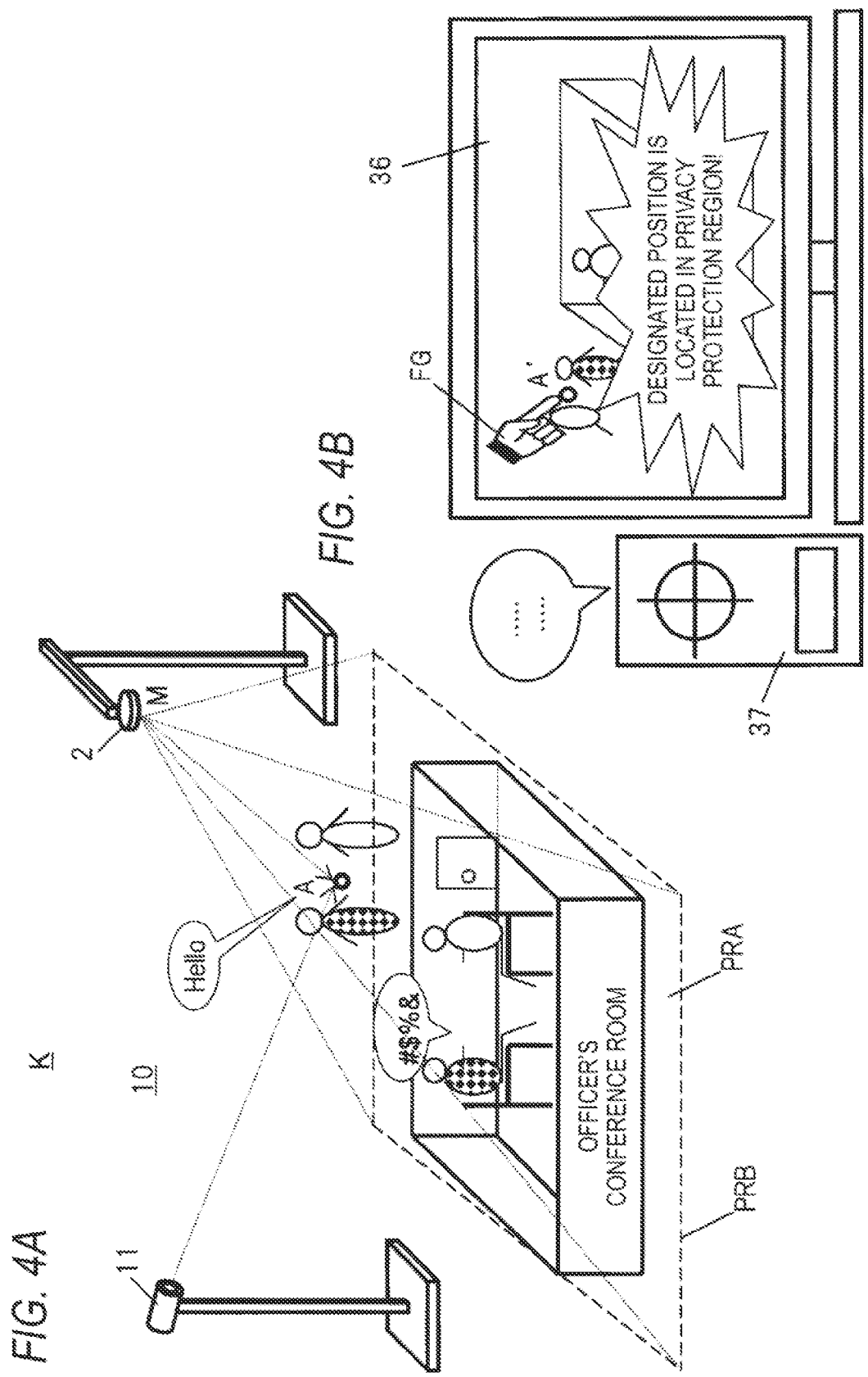

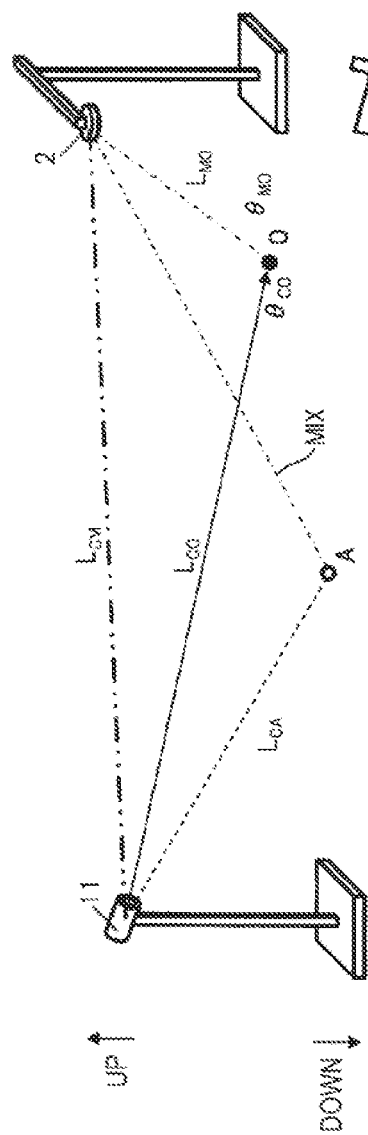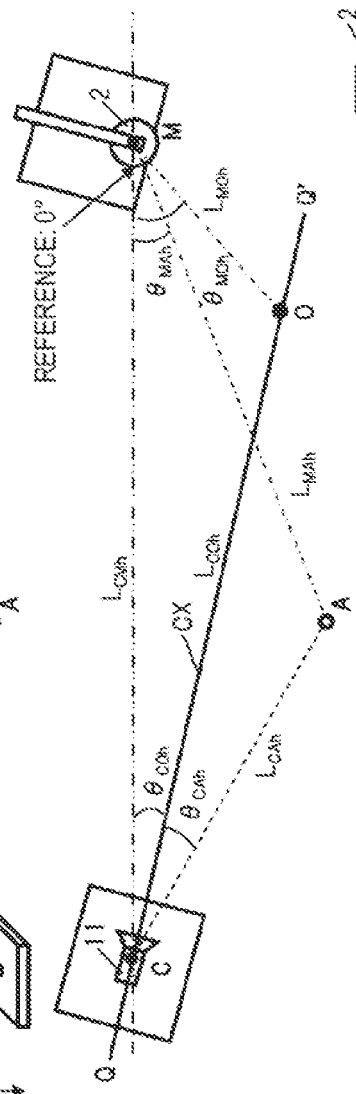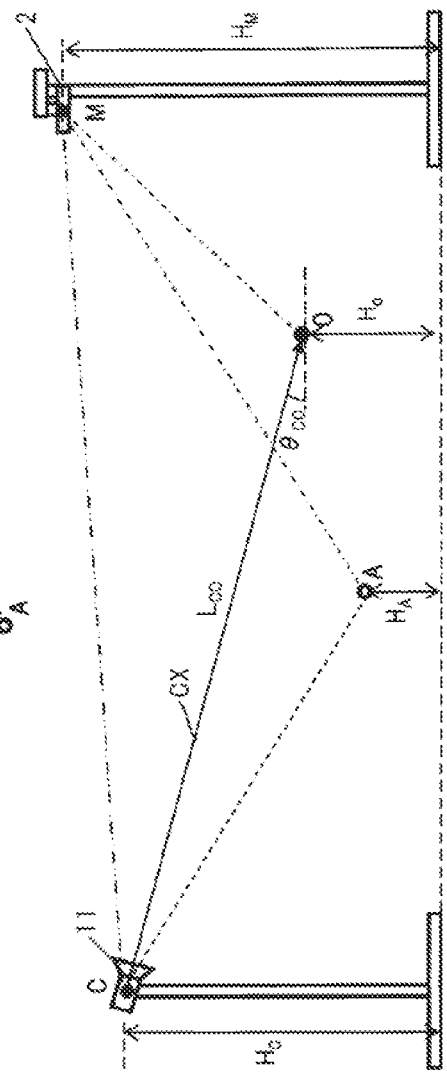
FIG. 13A
FIG. 13B
FIG. 13C

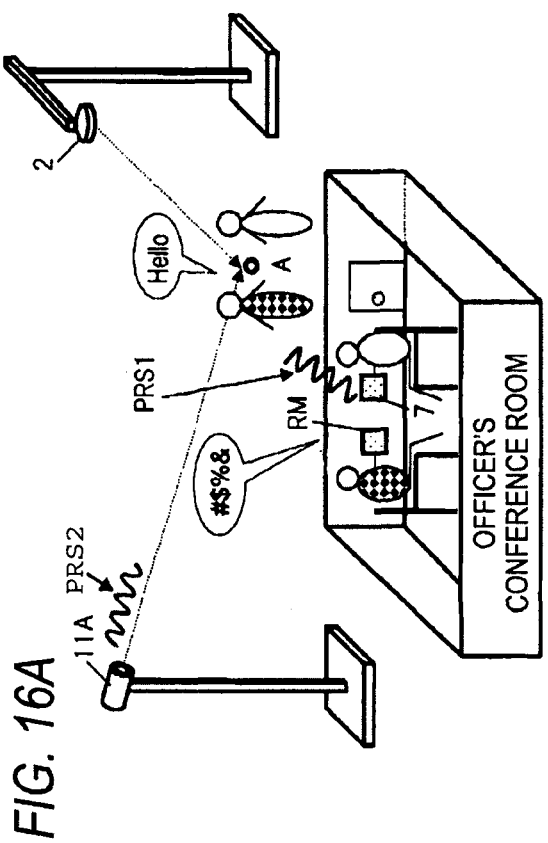
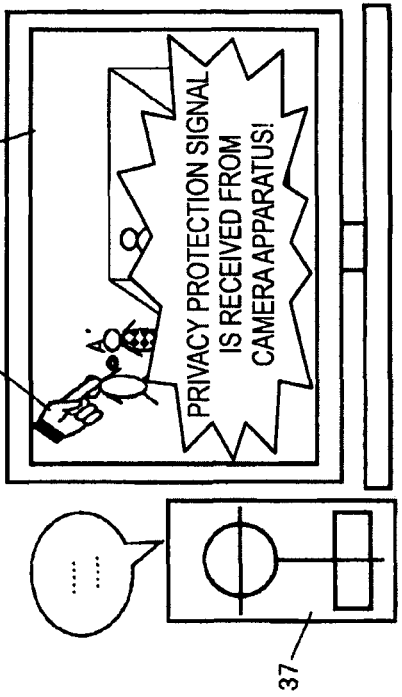
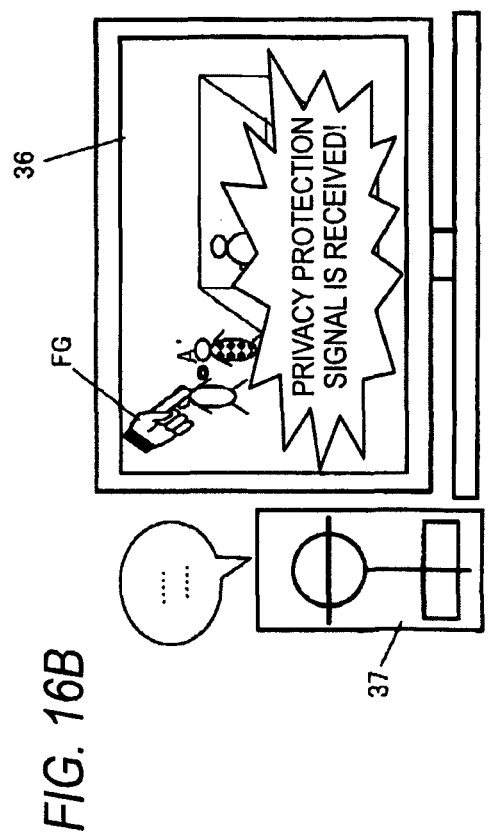
FIG. 16A
FIG. 16B
FIG. 16C

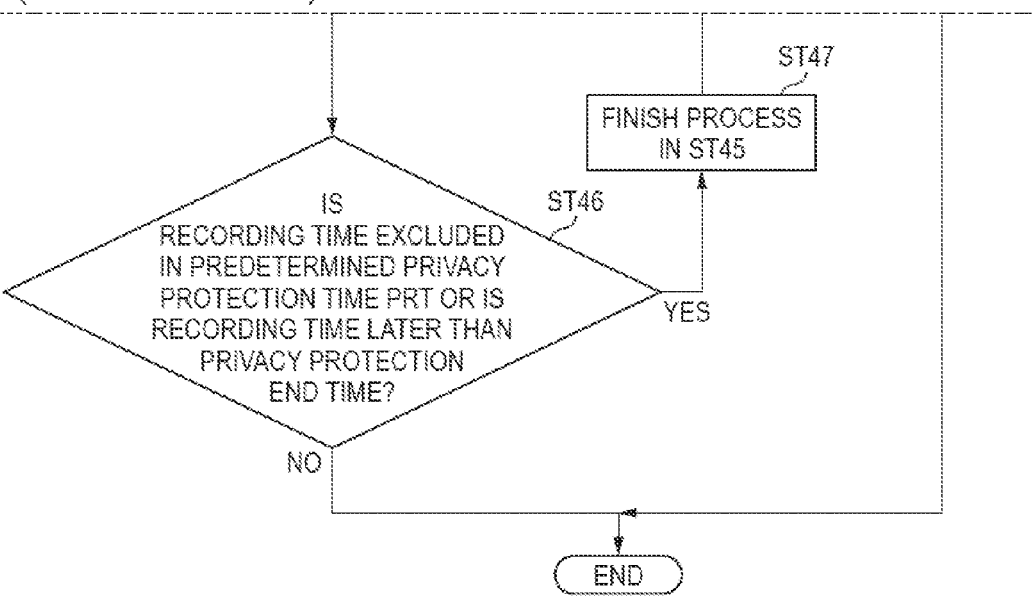

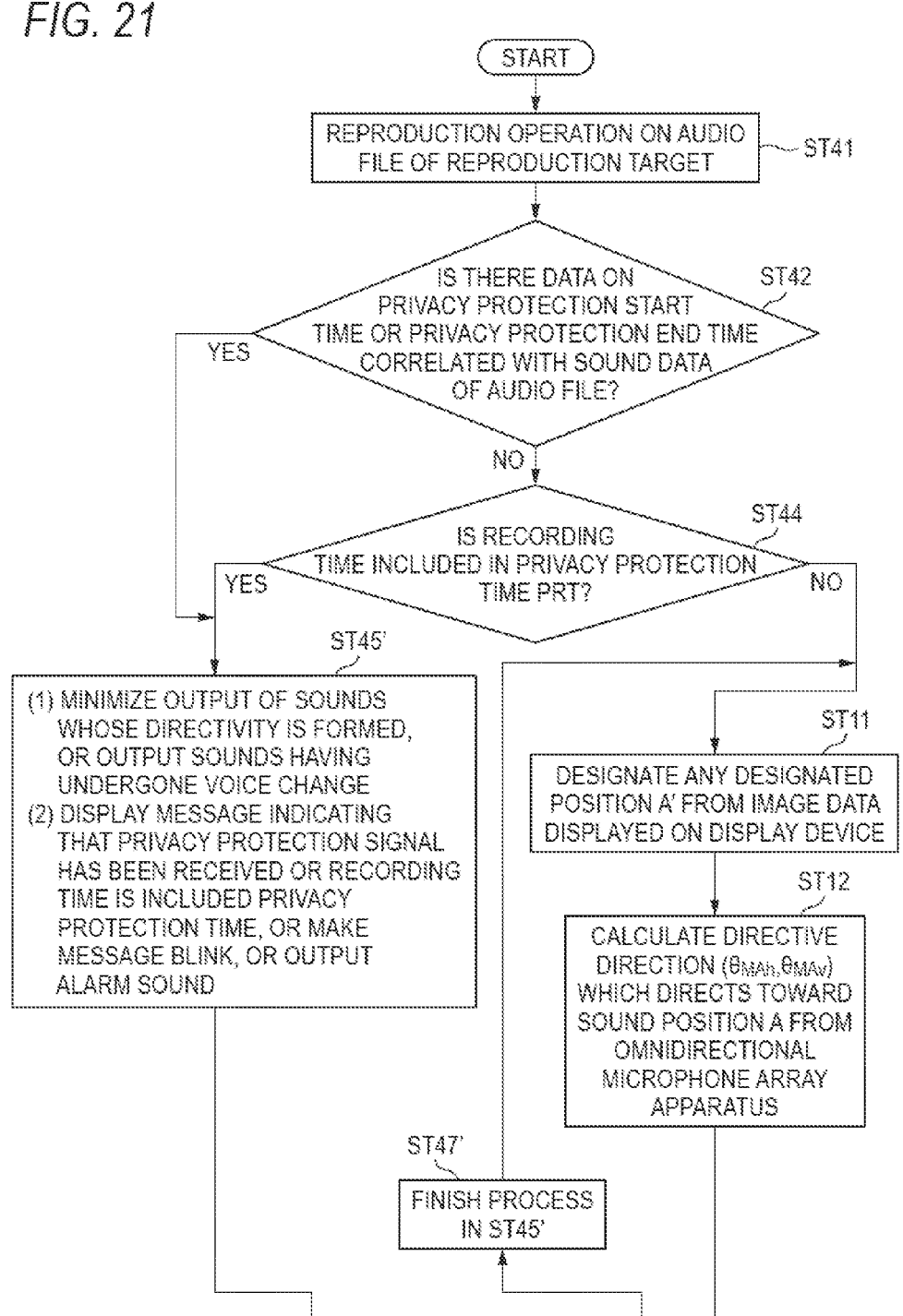

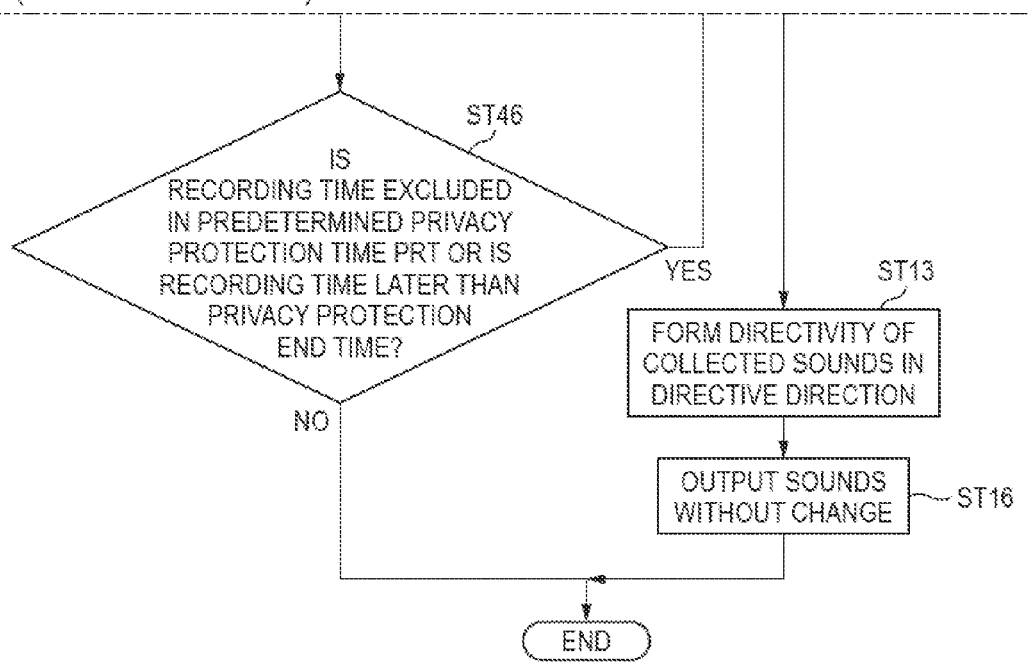

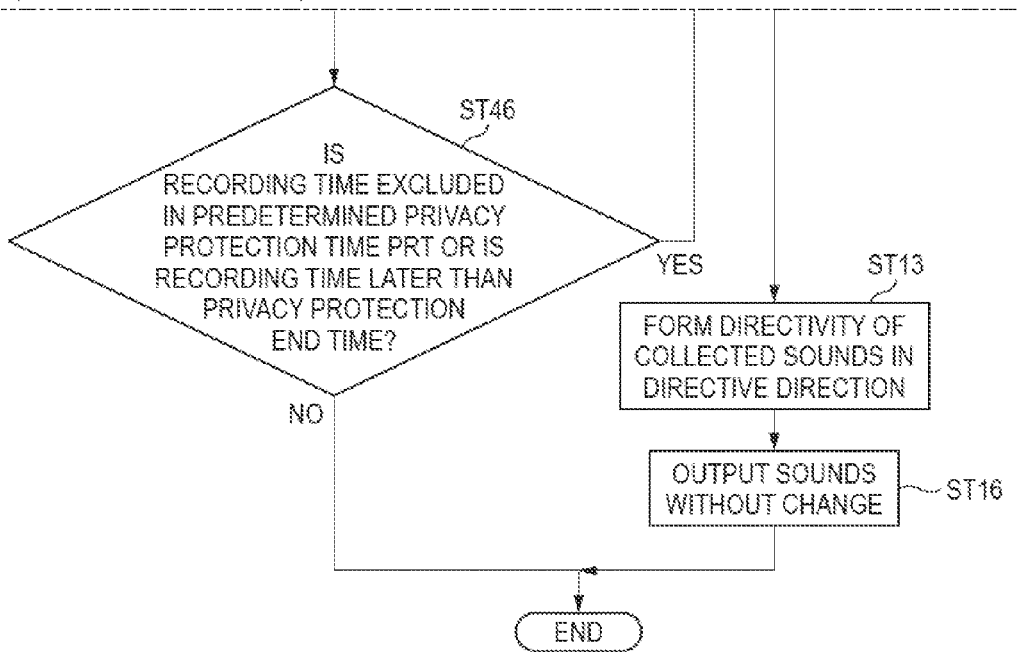

DIRECTIVITY CONTROL SYSTEM AND SOUND OUTPUT CONTROL METHOD

BACKGROUND

1. Field of the Invention

The present invention relates to a directivity control system and a sound output control method capable of controlling output of sound data which is collected in a privacy protection region inside a sound collection space.

2. Description of the Related Art

In the related art, in surveillance systems installed at predetermined positions (for example, a ceiling) of factories, companies, stores (for example, retail stores or banks), or public places (for example, a library), a plurality of camera apparatuses (for example, a pan/tilt camera apparatus or an omnidirectional camera apparatus) are connected to each other via a network, so as to achieve a wide angle of view of image data (including a still image and a moving image; this is also the same for the following) of a monitoring target in a predetermined range.

In addition, since an information amount obtained with the monitoring only using images may possibly be limited, there are increasing demands for a surveillance system in which a microphone array apparatus as well as the camera apparatus is disposed, and thus sound data is obtained in a direction (hereinafter, referred to as an "imaging direction") in which a specific subject is imaged by the camera apparatus.

Here, a control apparatus is known which controls each operation of a camera apparatus and a microphone array apparatus so as to obtain sound data of a subject which is present in an imaging direction of the camera apparatus (for example, refer to JP-A-2012-186551). A control apparatus disclosed in JP-A-2012-186551 controls each operation of, for example, a camera apparatus which is installed in a conference room which is available to a television conference system and is operable in a horizontal direction (panning direction) and a microphone array apparatus which can change a sound collection range.

The control apparatus disclosed in JP-A-2012-186551 changes a sound collection range of the microphone array apparatus by using a distance between a position of the camera apparatus and a position of a subject captured in an image acquired by the camera apparatus, a panning direction of the camera apparatus, a distance between the position of the camera apparatus and a position of the microphone array apparatus, and a direction of the position of the microphone array apparatus with the position of the camera apparatus as a reference.

SUMMARY

JP-A-2012-186551 is based on, for example, the camera apparatus, the microphone array apparatus, and a subject (for example, a speaker) being present on the same plane assuming usage forms in the television conference system. However, in the above-described surveillance system, the camera apparatus, the microphone array apparatus, and a subject (for example, a staff of a store, or a customer) are all seldom present on the same plane in practice.

For example, since the camera apparatus and the microphone array apparatus are often installed on an upper side (for example, a ceiling surface of a store) of a subject, the camera apparatus, the microphone array apparatus, and the subject are not present on a planar two-dimensional coordinate but are present on a stereoscopic three-dimensional coordinate in most cases.

Therefore, in the above-described surveillance system, in a case where the microphone array apparatus collects sounds of conversations of subjects in an image which is currently captured by the camera apparatus, if a method of JP-A-2012-186551 is used, there is a problem in that a coordinate (horizontal angle, vertical angle) indicating a direction in which the microphone array apparatus collects sounds cannot be appropriately calculated.

In addition, there is a problem in that, depending on introduction destinations (for example, companies) of the surveillance system, if sound data of sounds, collected by the microphone array apparatus in a place such as an officer's conference room in a company where a conference using high confidential company information is held, is reproduced by a third person other than the people involved, the information may be leaked.

A non-limited object of the present invention is to provide a directivity control system and a sound output control method capable of forming a directivity of collected sounds in a directive direction which directs toward a designated sound position from a microphone array apparatus, and controlling output of sounds collected by the microphone array apparatus or sounds which are collected by the microphone array apparatus and whose directivity is formed, or suspending collection of sounds, in a case where the sound position is included in a predetermined privacy protection region or a sound collection time or a recording time is included in a predetermined privacy protection time.

An aspect of the present invention provides a directivity control system including: at least one imaging part that captures an image; a sound collection part that collects sounds; a display part that displays image data captured by the at least one imaging part; a directive direction calculation part that calculates a directive direction which directs toward a sound position corresponding to a designated position of the image data from the sound collection part when any position of the displayed image data is designated; and a control part that forms a directivity in the sounds collected by the sound collection part in the calculated directive direction, wherein the control part controls output of the sounds collected by the sound collection part or output of the sounds which are collected by the sound collection part and of which the directivity is formed, or suspends collection of sounds in the sound collection part, when it is determined that the sound position is included in a preset protection region.

Another aspect of the present invention provides a directivity control system including: at least one imaging part that captures an image; a sound collection part that collects sounds; a recording part that records the sounds collected by the sound collection part; a display part that displays image data captured by the at least one imaging part; a directive direction calculation part that calculates a directive direction which directs toward a sound position corresponding to a designated position of the image data from the sound collection part when any position of the displayed image data is designated; and a control part that forms a directivity in the sounds collected by the sound collection part in the calculated directive direction, wherein the control part controls output of the sounds collected by the sound collection part or output of the sounds which are collected by the sound collection part and of which the directivity is formed, or suspends collection of sounds in the sound collection part, when it is determined that a sound collection time in the sound collection part or a recording time in the recording part is included in a preset protection time.

Still another aspect of the present invention provides a sound output control method in a directivity control system including at least one imaging part that captures an image and a sound collection part that collects sounds, the method including: displaying image data captured by the at least one imaging part; calculating a directive direction which directs toward a sound position corresponding to a designated position of the image data from the sound collection part when any position of the displayed image data is designated; forming a directivity in the sounds collected by the sound collection part in the calculated directive direction; determining whether or not the sound position is included in a preset protection region; and controlling output of the sounds collected by the sound collection part or output of the sounds which are collected by the sound collection part and of which the directivity is formed, or suspending collection of sounds in the sound collection part, when it is determined that the sound position is included in the protection region.

Still another aspect of the present invention provides a sound output control method in a directivity control system including at least one imaging part that captures an image, a sound collection part that collects sounds, and a recording part that records the sounds collected by the sound collection part, the method including: displaying image data captured by the at least one imaging part; calculating a directive direction which directs toward a sound position corresponding to a designated position of the image data from the sound collection part when any position of the displayed image data is designated; forming a directivity in the sounds collected by the sound collection part in the calculated directive direction; determining whether or not a sound collection time in the sound collection part or a recording time in the recording part is included in a preset protection time; and controlling output of the sounds collected by the sound collection part or output of the sounds which are collected by the sound collection part and of which the directivity is formed, or suspending collection of sounds in the sound collection part, when it is determined that the sound collection time in the sound collection part or the recording time in the recording part is included in the protection time.

According to any of the aspects of the present invention, it is possible to form a directivity of collected sounds in a directive direction which directs toward a designated sound position from a microphone array apparatus, and control output of sounds collected by the microphone array apparatus or sounds which are collected and whose directivity is formed, or to suspend collection of sounds, in a case where the sound position is included in a predetermined privacy protection region, or in a case where a sound collection time or a recording time is included in a predetermined privacy protection time.

BRIEF DESCRIPTION OF THE DRAWINGS

In the accompanying drawings:

FIG. 4A is a diagram illustrating a privacy protection region PRA inside a sound collection space K in which the directivity control system of the first embodiment is provided, and FIG. 4B is a diagram illustrating a state in which outputting of sounds collected by the omnidirectional microphone array apparatus is minimized in a case where a sound position A corresponding to a designated position A' which is designated with the finger FG of a user in an image displayed on a display device is included in the privacy protection region PRA;

FIG. 12B is a horizontal direction plan view in which FIG. 12A is viewed in a vertically lower direction from a vertically upper direction.

FIG. 13A is a perspective view illustrating each position of the camera apparatus, the omnidirectional microphone array apparatus, the reference point O, and the sound position A; FIG. 13B is a horizontal direction plan view in which FIG. 13A is viewed in a vertically lower direction from a vertically upper direction; and FIG. 13C is a vertical direction cross-sectional view taken along the line Q-Q' of FIG. 13B;

FIG. 14B is a horizontal direction plan view in which FIG. 14A is viewed in a vertically lower direction from a vertically upper direction.

FIG. 16A is a diagram illustrating a state in which a privacy protection signal is transmitted through an operation performed by a person in an officer's conference room inside a sound collection space K in which the directivity control system of the second embodiment is installed; FIG. 16B is a diagram illustrating a state of controlling output of sounds collected by an omnidirectional microphone array apparatus or sounds which are collected by the omnidirectional microphone array apparatus 2 and whose directivity is formed, or of suspending collection of sounds in the omnidirectional microphone array apparatus 2, due to the privacy protection signal which is transmitted from a privacy protection signal transmitter through the operation performed by the person in the officer's conference room illustrated in FIG. 16A; and FIG. 16C is a diagram illustrating a state of controlling output of sounds collected by the omnidirectional microphone array apparatus or sounds which are collected by the omnidirectional microphone array apparatus 2 and whose directivity is formed, or of suspending collection of sounds in the omnidirectional microphone array apparatus 2, due to the privacy protection signal which is transmitted from the privacy protection signal transmitter through the operation performed by the person in the officer's conference room illustrated in FIG. 16A;

FIG. 21 is a flowchart illustrating another example of the operation procedure of changing sound output control depending on whether or not a privacy protection signal is received in a case where the directivity control system of the second embodiment reproduces sound data of a recorded audio file;

DETAILED DESCRIPTION

Hereinafter, each embodiment of a directivity control system and a sound output control method according to the present invention will be described with reference to the drawings. A directivity control system of each embodiment is used as a surveillance system (including a manned surveillance system and an unmanned surveillance system) which is installed in, for example, factories, companies, public facilities (for example, a library or an event site), or stores (for example, a retail store or a bank), but an installation location is not particularly limited. In the following respective embodiments, the directivity control system of each embodiment will be described assuming that the system is installed in, for example, a company.

In addition, the present invention can be expressed as respective apparatuses (for example, a directivity control apparatus described later) forming the directivity control system, or a sound output control method including respective operations (steps) performed by each apparatus forming the directivity control system.

(Configuration of Directivity Control System)

Figure 1:
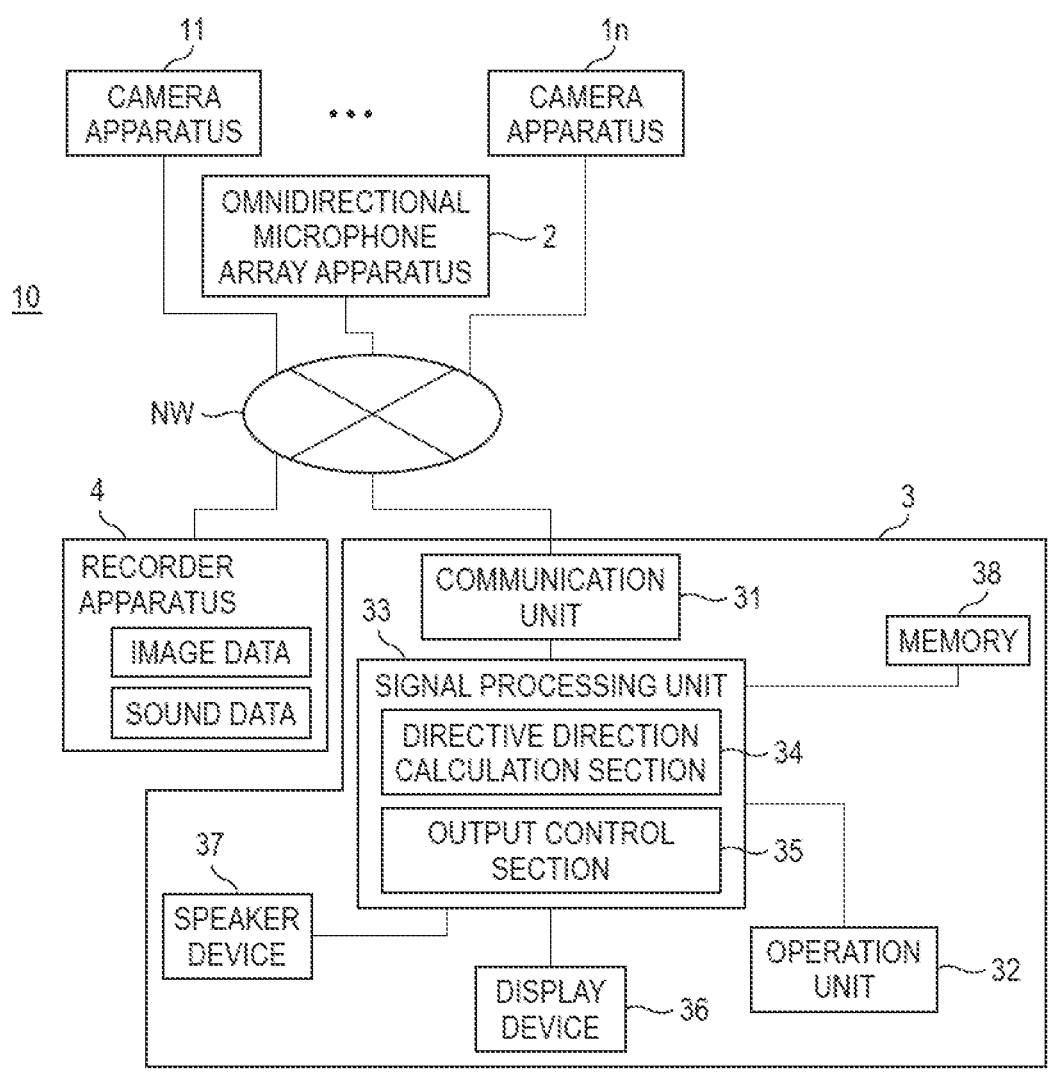
FIG. 1 is a block diagram illustrating a configuration of a directivity control system of a first embodiment.

FIG. 1 is a block diagram illustrating a configuration of a directivity control system 10 of a first embodiment. The directivity control system 10 illustrated in FIG. 1 includes at least one of camera apparatuses 11 to 1n, an omnidirectional microphone array apparatus 2, a directivity control apparatus 3, and a recorder apparatus 4. Here, the sign n indicates the number of camera apparatuses, and is an integer of 1 or higher. The camera apparatuses 11 to 1n, the omnidirectional microphone array apparatus 2, the directivity control apparatus 3, and the recorder apparatus 4 are connected to each other via a network NW. The network NW may be a wired network (for example, an intranet or the Internet), and may be a wireless network (for example, a wireless local area network (LAN)), which is also the same form the following respective embodiments.

Each of the camera apparatuses 11 to 1n has at least one imaging part including a casing into which an optical system (not illustrated) (for example, a wide angle lens) and an imaging system (for example, an image sensor) are built, and functions as a surveillance camera which is installed on, for example, a ceiling surface of a room of a company or a predetermined stand (refer to FIG. 4A) in a fixed manner. The camera apparatuses 11 to 1n are connected to the directivity control apparatus 3 of a central control room (not illustrated) via the network NW, and perform a panning direction operation, a tilting direction operation, a zooming operation, an imaging operation, a distance-measuring operation of measuring a distance to a practical position corresponding to a designated position (for example, a designated position A') on a screen of a display device 36 (see below) on which a captured image is displayed, an angle-measuring operation of measuring angles (for example, a horizontal angle and a vertical angle), and the like, in response to a remote operation from the directivity control apparatus 3. In addition, the camera apparatus 11 stores the time when an image is captured (imaging time) in correlation with image data. The camera apparatus 11 transmits the image data and the imaging time data to the directivity control apparatus 3 or the recorder apparatus 4.

Figure 12A:
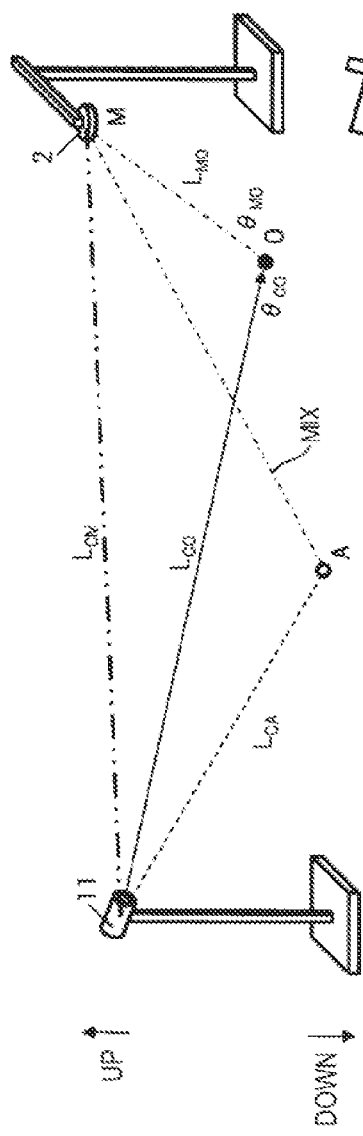
FIG. 12A is a perspective view illustrating each position of the camera apparatus, the omnidirectional microphone array apparatus, the reference point O, and the sound position A.
Figure 12B:
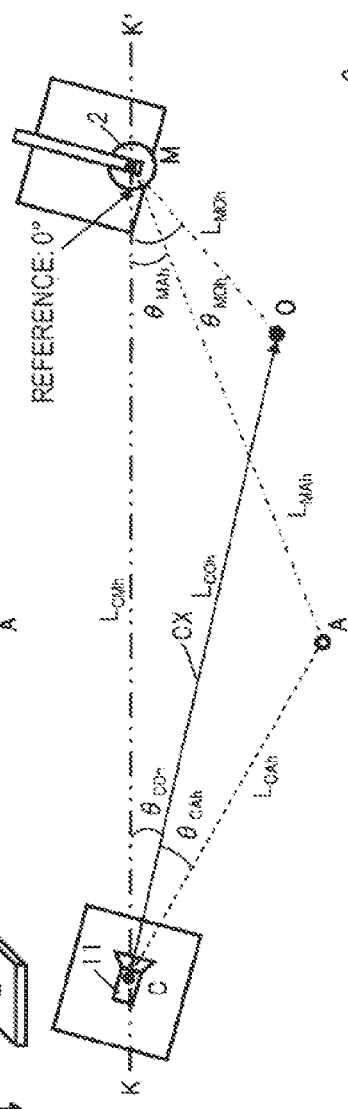

In addition, the camera apparatuses 11 to 1n capture an image (including a still image and a moving image; this is also the same for the following) of a subject which is present in a predefined angle of view centering on an optical axis CX (refer to FIG. 12B). The camera apparatuses 11 to 1n acquires captured image data, and input parameters for calculating a coordinate ($\theta_{MAh}, \theta_{MAv}$) (hereinafter, abbreviated to a directive direction ($\theta_{MAh}, \theta_{MAv}$) in some cases) indicating a directive direction described later, and transmits the acquired data and parameters to the directivity control apparatus 3 or the recorder apparatus 4 via the network NW.

The omnidirectional microphone array apparatus 2 as a sound collection part has a casing 21C (refer to FIG. 2D) with, for example, a doughnut shape or a ring shape (annular shape) in which an opening 21a is formed at a casing center, and is installed on, for example, a ceiling surface of a room of a company or at a predetermined stand (refer to FIG. 4A) in a fixed manner. The omnidirectional microphone array apparatus 2 collects sounds in all directions in a sound collection space (sound collection region) where the omnidirectional microphone array apparatus 2 is installed. In addition, the omnidirectional microphone array apparatus 2 may form a directivity of collected sounds with high accuracy in a directive direction which directs toward a sound position A (see below) from an installation position M of the omnidirectional microphone array apparatus 2, and may emphasize and output conversation sounds (for example, "Hello") of two people who are subjects present in the directive direction. Further, a casing shape of the omnidirectional microphone array apparatus 2 is not limited to a doughnut shape or a ring shape (annular shape), and will be described later with reference to FIGS. 2A to 2E.

In the omnidirectional microphone array apparatus 2, a plurality of microphone units 22 are disposed in a concentric shape in a circumferential direction of a casing 21 around the opening 21a. The microphone unit 22 uses, for example, a high-quality small-sized electret condenser microphone (ECM), and this is also the same for the following respective embodiments.

The omnidirectional microphone array apparatus 2 is connected to the network NW and includes at least microphone units 22 and 23 in which microphones are provided at equal intervals (refer to FIGS. 2A to 2E) and a control unit (not illustrated) which controls an operation of each of the microphone units 22 and 23.

The omnidirectional microphone array apparatus 2 collects sounds in all directions in a sound collection space K where a subject serving as a sound collection target is present or collects sounds in a directive direction in which the subject is present, by using each of the microphone units 22 and 23, and stores sound data collected by each of the microphone units 22 and 23, or sound data whose directivity is formed by using the sound data and a directive direction ($\theta_{MAh}, \theta_{MAv}$). In addition, the omnidirectional microphone array apparatus 2 stores the time when sounds are collected in correlation with the sound data. Further, the omnidirectional microphone array apparatus 2 transmits the stored sound data and data on the sound collection time to the directivity control apparatus 3 or the recorder apparatus 4 via the network NW.

The omnidirectional microphone array apparatus 2 forms a directivity of each of the microphone units 22 and 23 in a directive direction ($\theta_{MAh}, \theta_{MAv}$) included in a directivity forming instruction in response to the directivity forming instruction from the directivity control apparatus 3 described later.

Accordingly, the omnidirectional microphone array apparatus 2 can relatively increase a volume level of sound data in the directive direction ($\theta_{MAh}, \theta_{MAv}$) in which the subject is present, and can relatively reduce a volume level of sound data in a direction in which the subject is not present. In addition, a calculation method of the directive direction ($\theta_{MAh}, \theta_{MAv}$) will be described later.

Here, an exterior of the omnidirectional microphone array apparatus 2 will be described with reference to FIGS. 2A to 2E. FIGS. 2A to 2E are exterior views of the omnidirectional microphone array apparatus 2. Omnidirectional microphone array apparatuses 2C, 2A, 2B, 2 and 2D illustrated in FIGS. 2A to 2E have different exteriors and arrangement positions of a plurality of microphone units, but functions of the omnidirectional microphone array apparatuses are equivalent to each other.

Figure 2:
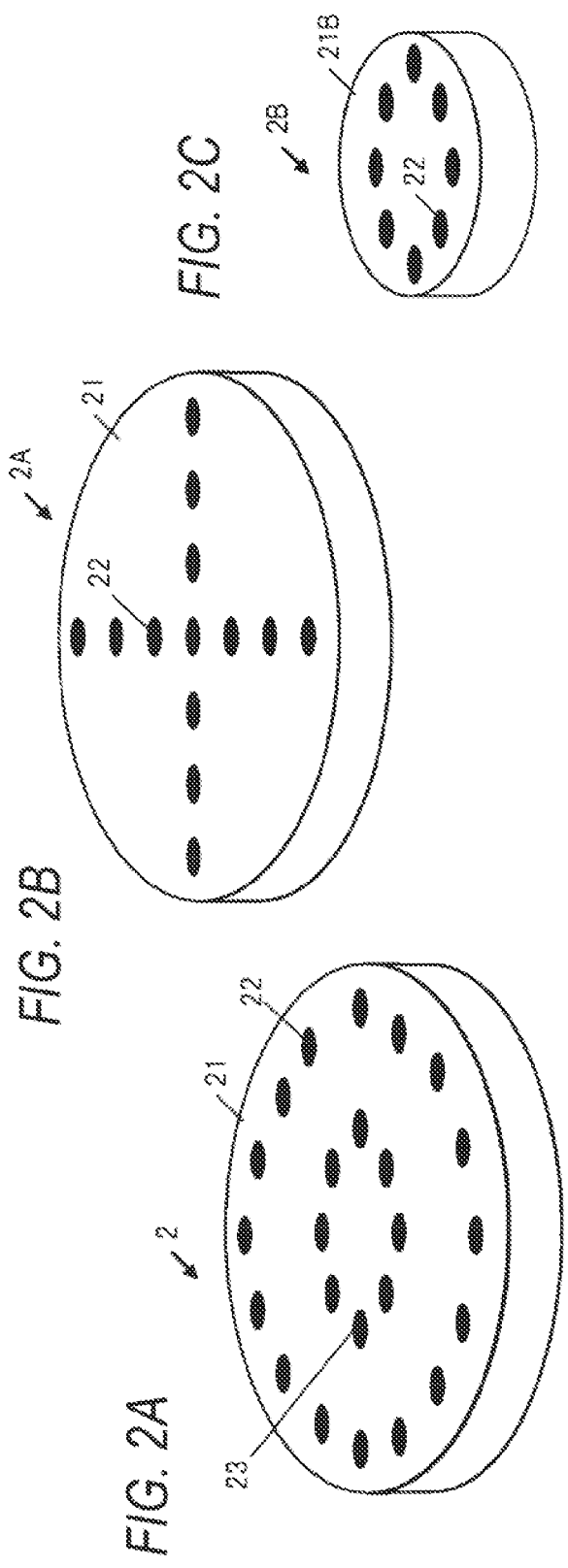
FIGS. 2A to 2E are exterior views of an omnidirectional microphone array apparatus.

The omnidirectional microphone array apparatus 2C illustrated in FIG. 2A has a disc-shaped casing 21. The plurality of microphone units 22 and 23 are disposed in a concentric shape in the casing 21. Specifically, the plurality of microphone units 22 are disposed on an outside of the casing 21 in a concentric shape having the same center as the casing 21, and the plurality of microphone units 23 are disposed on an inside of the casing 21 in a concentric shape having the same center as the casing 21. The respective microphone units 22 have a wide interval therebetween, have a large diameter, and have a characteristic suitable for a low sound range. On the other hand, the respective microphone units 23 have a narrow interval therebetween, have a small diameter, and have a characteristic suitable for a high sound range.

The omnidirectional microphone array apparatus 2A illustrated in FIG. 2B has a disc-shaped casing 21. In the casing 21, the plurality of microphone units 22 are disposed in a straight line in two directions including a horizontal direction and a vertical direction and are separated from each other at uniform intervals, and an arrangement in the vertical direction and an arrangement in the horizontal direction intersect each other at a center of the casing 21. In the omnidirectional microphone array apparatus 2A, the plurality of microphone units 22 are disposed in a straight line in the two directions including the vertical direction and the horizontal direction, and thus it is possible to reduce a calculation amount in a directivity forming process of sound data. In addition, in the omnidirectional microphone array apparatus 2A illustrated in FIG. 2B, the plurality of microphone units 22 may be disposed either in the vertical direction or in the horizontal direction.

The omnidirectional microphone array apparatus 2B illustrated in FIG. 2C has a disc-shaped casing 21B with a smaller diameter than that of the omnidirectional microphone array apparatus 2 illustrated in FIG. 2A. In the casing 21B, the plurality of microphone units 22 are disposed so as to be separated from each other at uniform intervals in a circumferential direction of the casing 21B. Since the intervals between the respective microphone units 22 are short, the omnidirectional microphone array apparatus 2B illustrated in FIG. 2C has a characteristic suitable for a high sound range.

The omnidirectional microphone array apparatus 2 illustrated in FIG. 2D has a casing 21C with a doughnut shape or a ring shape in which the opening 21a with a predetermined diameter centering on a center of the casing 21C is formed. In the directivity control system 10 of the present embodiment, for example, the omnidirectional microphone array apparatus 2C illustrated in FIG. 2D is used. In the casing 21C, the plurality of microphone units 22 are separated from each other at uniform intervals in a circumferential direction of the casing 21C and are disposed in a concentric shape.

The omnidirectional microphone array apparatus 2D illustrated in FIG. 2E has a rectangular casing 21D. In the casing 21D, the plurality of microphone units 22 are disposed so as to be separated from each other at uniform intervals in a circumferential direction of the casing 21D. In the omnidirectional microphone array apparatus 2D illustrated in FIG. 2E, the casing 21D has a rectangular shape, and thus the omnidirectional microphone array apparatus 2D can be easily installed even at, for example, a corner or a wall surface.

In addition, a microphone forming each of the microphone units 22 and 23 may use a nondirectional microphone, a bidirectional microphone, a unidirectional microphone, a sharply directional microphone, a super-directional microphone (for example, a shotgun microphone), or a combination thereof.

The directivity control apparatus 3 may be, for example, a stationery personal computer (PC) installed in a central control room (not illustrated) of a company, and may be a data communication terminal apparatus such as a user portable mobile phone, a tablet terminal, or a smart phone.

The directivity control apparatus 3 includes at least a communication unit 31, an operation unit 32, a signal processing unit 33, a display device 36, a speaker device 37, and a memory 38. The signal processing unit 33 includes at least a directive direction calculation section 34 and an output control section 35.

The communication unit 31 receives image data including an imaging time transmitted by the camera apparatuses 11 to 1n, data on input parameters required to calculate a directive direction $(\theta_{MAh}, \theta_{MAv})$, or sound data including a sound collection time transmitted by the omnidirectional microphone array apparatus 2, and outputs the received data to the signal processing unit 33.

The operation unit 32 is a user interface (UI) for notifying the signal processing unit 33 of content of a user's input operation, and is, for example, a pointing device such as a mouse or a keyboard. In addition, the operation unit 32 may be configured by using a touch panel or a touch pad which is disposed so as to correspond to, for example, a screen of the display device 36 and allows an input operation to be performed with the finger FG of a user or a stylus pen.

Figure 5A:
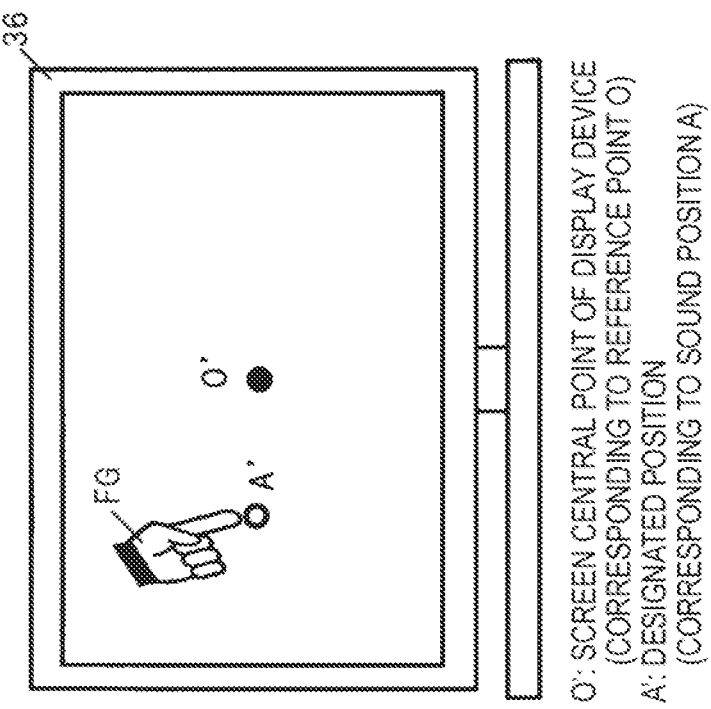
FIG. 5A is a flowchart illustrating an operation procedure of initial setting in the directivity control system of the first embodiment.
Figure 5B:
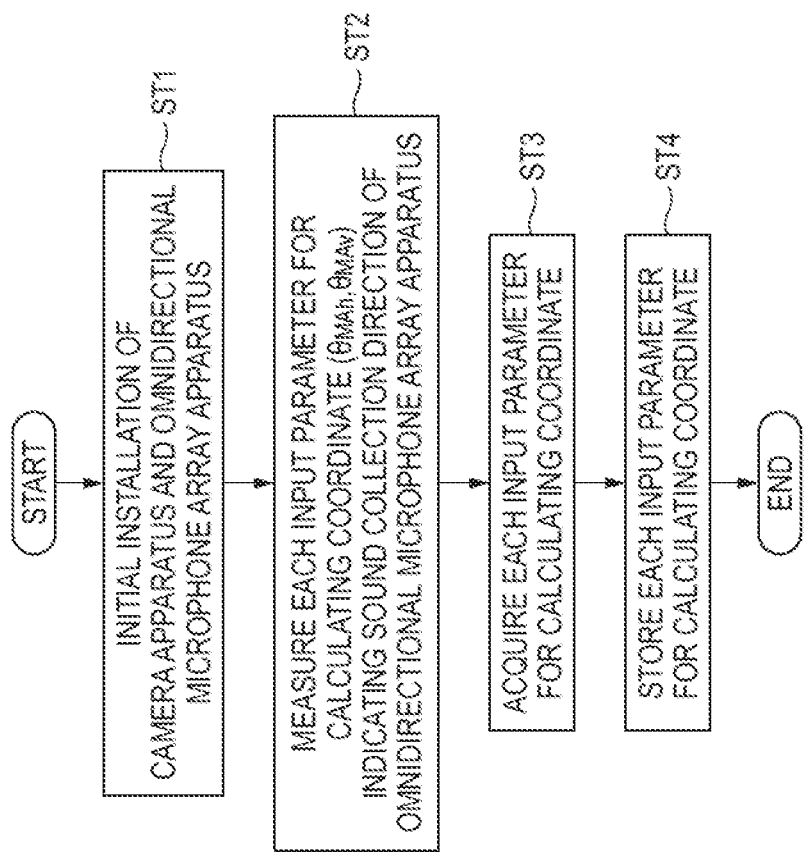
FIG. 5B is a diagram illustrating a position of a reference point O and a designated position A' on a screen of the display device, for calculating a directive direction of the omnidirectional microphone array apparatus.

The operation unit 32 acquires coordinate data indicating a position where the user desires to increase a volume level, that is, a designated position A' illustrated in FIG. 4B or 5B, from image data (refer to FIG. 4B) of the camera apparatus 11 displayed on the display device 36, and outputs the acquired coordinate data to the signal processing unit 33.

Further, if a reference point O described later is designated with the finger FG of the user, the operation unit 32 acquires coordinate data of a position of the designated reference point O from image data of the camera apparatus 11 displayed on the display device 36, and outputs the acquired coordinate data to the signal processing unit 33.

The signal processing unit 33 is configured by using, for example, a central processing unit (CPU), a micro processing unit (MPU), or a digital signal processor (DSP), and performs a control process for collectively controlling operations of the respective units of the directivity control apparatus 3, a data input and output process with other respective units, a data operation (calculation) process, and a data storage process.

The directive direction calculation section 34 calculates a coordinate $(\theta_{MAh}, \theta_{MAv})$ indicating a directive direction which directs toward a sound position A corresponding to a designated position A' from an installation position M of the omnidirectional microphone array apparatus 2, in response to designation of any position (=the designated position A') by the user, from image data captured by any one (for example, the camera apparatus 11; this is also the same for the following) of the camera apparatuses 11 to 1n, displayed on the display device 36.

In the directive direction $(\theta_{MAh}, \theta_{MAv})$, $\theta_{MAh}$ indicates a horizontal angle of the directive direction which directs toward the sound position A from the omnidirectional microphone array apparatus 2, and $\theta_{MAv}$ indicates a vertical angle of the directive direction which directs toward the sound position A from the omnidirectional microphone array apparatus 2. In addition, the sound position A is a field position which corresponds to the designated position A' designated with the finger FG of the user or a stylus pen in image data which is displayed on the display device 36 by the operation unit 32, and is a practical monitoring target.

The output control section 35 as a control part controls operations of the camera apparatuses 11 to 1n, the omnidirectional microphone array apparatus 2, the display device 36, and the speaker device 37, so as to reproduce and output image data transmitted from the camera apparatuses 11 to 1n from the display device 36 and to output sound data transmitted from the omnidirectional microphone array apparatus 2 as sounds from the speaker device 37. The output control section 35 causes the omnidirectional microphone array apparatus 2 to form a directivity of sound data in a directive direction corresponding to a sound collection direction coordinate $(\theta_{MAh}, \theta_{MAv})$ calculated by the directive direction calculation section 34. In addition, the output control section 35 itself may perform a directivity forming process (refer to FIG. 3) by using sound data which is collected by the omnidirectional microphone array apparatus 2 and is transmitted to the directivity control apparatus 3 so as to form a directivity of the sound data in a directive direction corresponding to a sound collection direction coordinate $(\theta_{MAh}, \theta_{MAv})$ calculated by the directive direction calculation section 34.

Further, the output control section 35 determines whether or not the sound position A is included in a preset privacy protection region PRA (refer to FIG. 4A) inside the sound collection space K on the basis of the coordinate data indicating the directive direction calculated by the directive direction calculation section 34. In a case where it is determined that the sound position A is included in the preset privacy protection region PRA inside the sound collection space K, the output control section 35 controls (control content will be described later) output of sounds which are collected by the omnidirectional microphone array apparatus 2, or sounds which are collected by the omnidirectional microphone array apparatus 2 and whose directivity is formed, or suspends collection of sounds in the omnidirectional microphone array apparatus 2. The privacy protection region PRA will be described with reference to FIG. 4A.

In addition, the output control section 35 may determine whether or not a sound collection time in the omnidirectional microphone array apparatus 2 or a recording time (see below) in the recorder apparatus 4 is included in a preset privacy protection time PRT instead of the process of determining whether or not the sound position A is included in the privacy protection region PRA. In a case where it is determined that the sound collection time or the recording time is included in the privacy protection time PRT, the output control section 35 controls (control content will be described later) output of sounds which are collected by the omnidirectional microphone array apparatus 2, or sounds which are collected by the omnidirectional microphone array apparatus 2 and whose directivity is formed, or suspends collection of sounds in the omnidirectional microphone array apparatus 2. Further, the privacy protection time PRT may be defined in advance in an operation of the output control section 35, and may be one read from the memory 38 by the output control section 35 as necessary. Furthermore, the privacy protection time PRT may be changed in response to a user's input operation as appropriate.

Figure 24A:
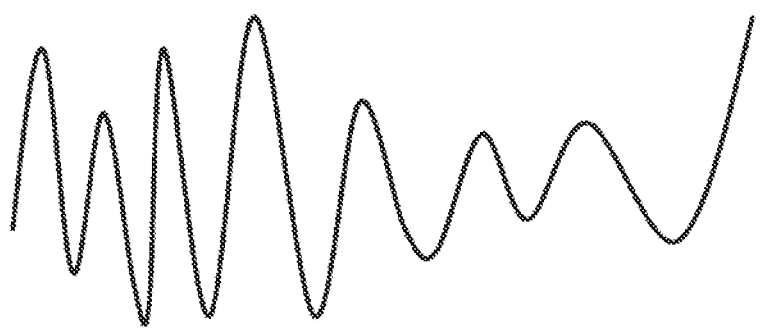
FIG. 24A is a diagram illustrating a waveform of sound data.
Figure 24B:
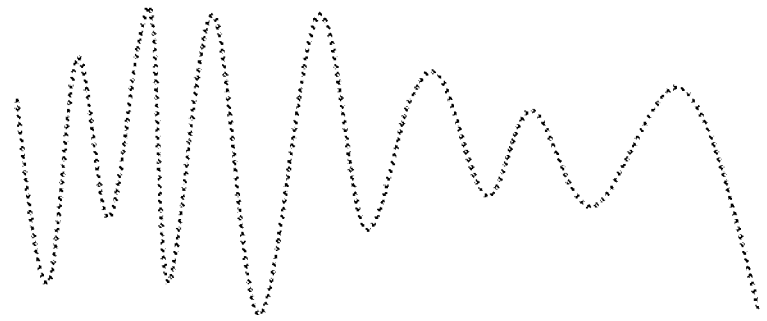
FIG. 24B is a diagram illustrating a waveform of an inverse phase signal of the waveform illustrated in FIG. 24A.
Figure 24C:
FIG. 24C is a diagram illustrating a waveform obtained by combining the waveforms illustrated in FIGS. 24A and 24B.

Here, as an example of the above-described sound output control process, the output control section 35 performs, for example, a mute process on an audio signal of sounds collected by the omnidirectional microphone array apparatus 2 or sounds which are collected by the omnidirectional microphone array apparatus 2 and whose directivity is formed, so as to minimize output of the sounds collected by the omnidirectional microphone array apparatus 2 or the sounds which are collected by the omnidirectional microphone array apparatus 2 and whose directivity is formed. Alternatively, the output control section 35 generates an inverse phase waveform (refer to FIG. 24B) of an audio signal waveform (refer to FIG. 24A) of sounds collected by the omnidirectional microphone array apparatus 2, and performs a combination process (also referred to as a masking process) of the audio signal waveform illustrated in FIG. 24A with the inverse phase waveform of the audio signal waveform illustrated in FIG. 24B, so as to minimize output of the sounds collected by the omnidirectional microphone array apparatus 2 or the sounds which are collected by the omnidirectional microphone array apparatus 2 and whose directivity is formed. FIG. 24A is a diagram illustrating a waveform of sound data. FIG. 24B is a diagram illustrating a waveform of an inverse phase signal of the waveform illustrated in FIG. 24A. FIG. 24C is a diagram illustrating a waveform obtained by combining the waveforms illustrated in FIGS. 24A and 24B with each other.

Figure 25A:
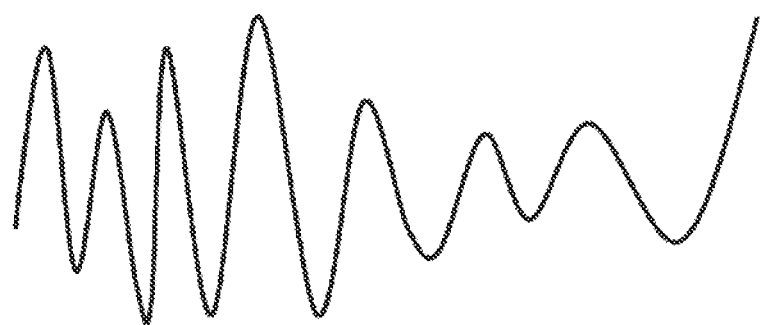
FIG. 25A is a diagram illustrating a waveform example corresponding to a pitch before a voice change process is performed.
Figure 25B:
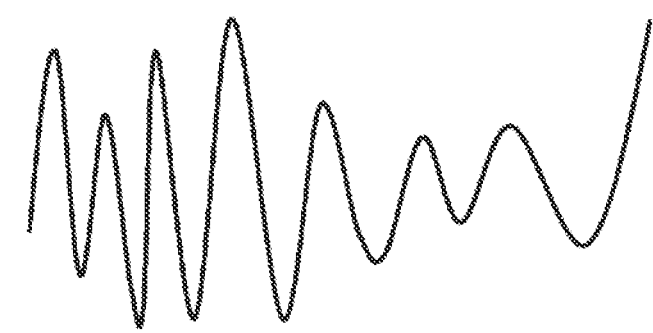
FIG. 25B is a diagram illustrating a waveform example corresponding to a pitch after the voice change process is performed.

In addition, as another example of the above-described sound output control process, the output control section 35 may perform, for example, a voice change process on sound data of sounds collected by the omnidirectional microphone array apparatus 2 or sound data of sounds which are collected by the omnidirectional microphone array apparatus 2 and whose directivity is formed (refer to FIGS. 25A and 25B). FIG. 25A is a diagram illustrating a waveform example corresponding to a pitch before the voice change process is performed. FIG. 25B is a diagram illustrating a waveform example corresponding to a pitch after the voice change process is performed. Further, as an example of the voice change process, the output control section 35, for example, increases or decreases a pitch of a waveform (for example, refer to FIG. 25A) of sound data of sounds collected by the omnidirectional microphone array apparatus 2 or sound data of sounds which are collected by the omnidirectional microphone array apparatus 2 and whose directivity is formed. Accordingly, the output control section 35 can make it difficult to specify who utters the sounds collected by the omnidirectional microphone array apparatus 2 or the sounds which are collected by the omnidirectional microphone array apparatus 2 and whose directivity is formed, and thus can effectively protect a privacy of a subject (for example, a person) present in the privacy protection region PRA.

In addition, the output control section 35 transmits a sound collection suspending instruction for suspending collection of sounds in the omnidirectional microphone array apparatus 2, to the omnidirectional microphone array apparatus 2. The omnidirectional microphone array apparatus 2 temporarily suspends collection of sounds in response to the sound collection suspending instruction transmitted from the directivity control apparatus 3. Accordingly, the output control section 35 can prevent recording of a conversation itself which may serve as evidence in the privacy protection region PRA where, for example, the conversion of highly confidential content is performed. Further, the sound output control process in the output control section 35 or the sound suspension process in the omnidirectional microphone array apparatus 2 may be applied to the following second embodiment in the same manner.

Furthermore, the output control section 35 may explicitly notify the user that the sound position A corresponding to the designated position A' designated with the finger FG of the user or a stylus pen is included in the privacy protection region PRA or that the sound collection time in the omnidirectional microphone array apparatus 2 or the recording time in the recorder apparatus 4. The output control section 35 displays (refer to FIG. 4B), for example, a message indicating that the sound position A corresponding to the designated position A' is included in the privacy protection region PRA or that the sound collection time in the omnidirectional microphone array apparatus 2 or the recording time in the recorder apparatus 4 is included in the privacy protection time PRT, or makes the message blink on the display device 36, or outputs a predetermined alarm sound from the speaker device 37. Accordingly, the output control section 35 can make the user explicitly perceive that the sound position A corresponding to the designated position A' designated with the finger FG of the user or a stylus pen is included in the privacy protection region PRA or that the sound collection time in the omnidirectional microphone array apparatus 2 or the recording time in the recorder apparatus 4 is included in the privacy protection time PRT.

The display device 36 as a display part displays image data captured by the camera apparatuses 11 to 1$n$ on a screen.

The speaker device 37 as a sound output part outputs, as sounds, sound data collected by the omnidirectional microphone array apparatus 2 or sound data which is collected by the omnidirectional microphone array apparatus 2 and whose directivity is formed in a directive direction ($\theta_{MAh}$, $\theta_{MAv}$) calculated by the directive direction calculation section 34. In addition, the display device 36 and the speaker device 37 may be configured separately from the directivity control apparatus 3.

The memory 38 is configured by using, for example, a random access memory (RAM), and functions as a program memory, a data memory, and a work memory when the respective units of the directivity control apparatus 3 operate.

The recorder apparatus 4 as an example of a recording part records image data including data on an imaging time when the camera apparatuses 11 to 1$n$ capture images in correlation with sound data including data on a sound collection time when the omnidirectional microphone array apparatus 2 collects sounds. In addition, for example, in a case where the recorded image data and sound data are reproduced (for example, the image data is displayed and the sound data is output) by the directivity control apparatus 3, the recorder apparatus 4 transmits the data on the sound collection time when the omnidirectional microphone array apparatus 2 collects sounds to the directivity control apparatus 3 as data on a recording time in the recorder apparatus 4.

Figure 3:
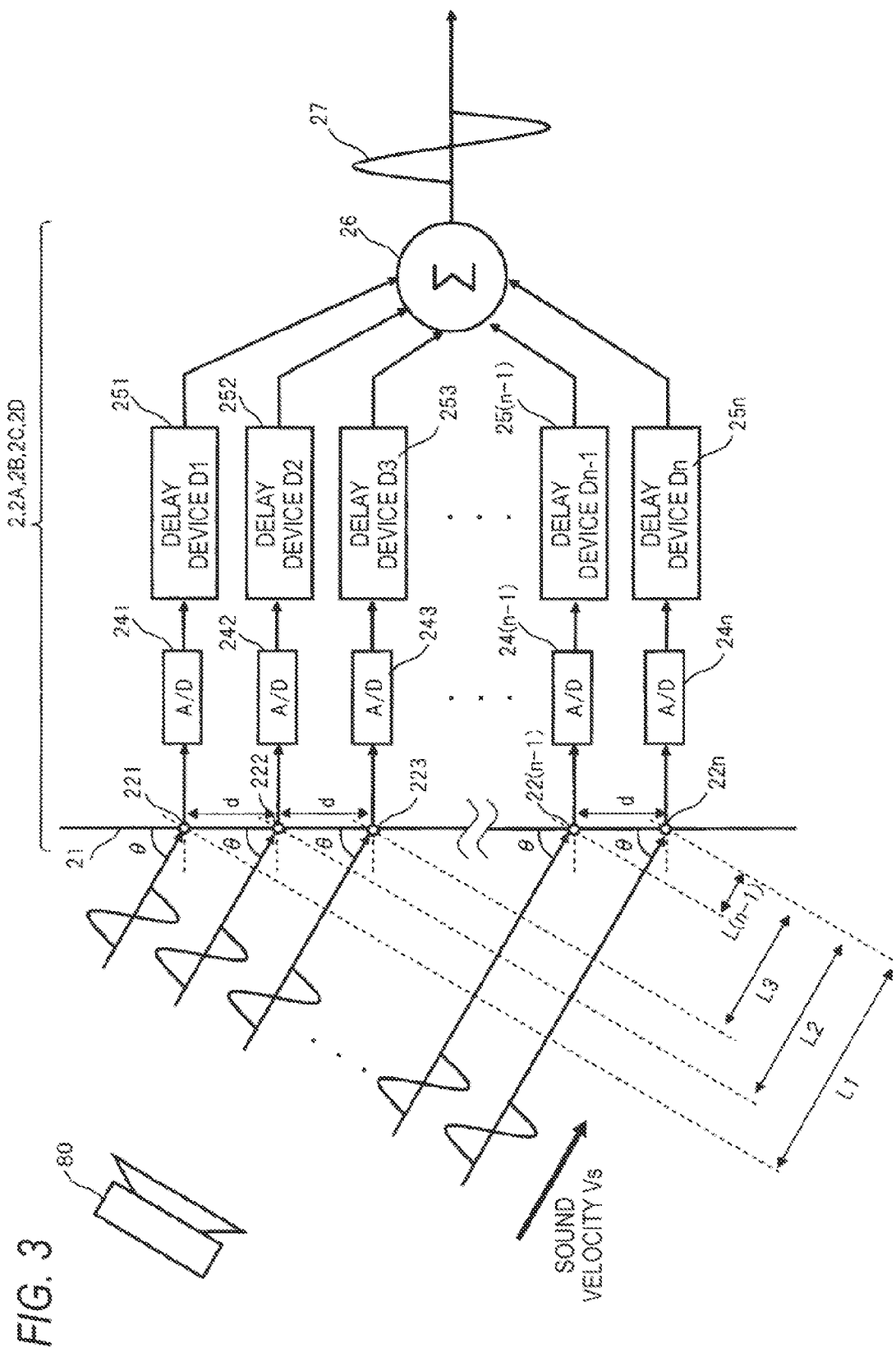
FIG. 3 is a principle diagram illustrating content in which the omnidirectional microphone array apparatus forms a directivity in a predetermined direction θ as a directive direction of a sound.

FIG. 3 is a principle diagram illustrating content in which the omnidirectional microphone array apparatus 2 forms a directivity in a predetermined direction θ as a directive direction of sounds. For better understanding of description, the microphones are linearly arranged in a one-dimensional manner. In this case, a directivity is formed in a two-dimensional space of a plane, but, in order to form a directivity in a three-dimensional space, the microphones may be arranged in a two-dimensional manner, and the same processing method may be performed. In FIG. 3, a brief description will be made of a principle of a directivity control process using, for example, a delay sum method. Sound waveforms generated from a sound source 80 are incident to respective microphones 221, 222, 223, . . . , 22(n−1) and 22n built into the microphone units 22 and 23 of the omnidirectional microphone array apparatus 2 with a predetermined angle (incidence angle=(90−θ) [degrees]). An incidence angle θ illustrated in FIG. 3 may be a horizontal angle $θ_{MAh}$ or a vertical angle $θ_{MAv}$ of a directive direction which directs toward the sound position A from the omnidirectional microphone array apparatus 2.

The sound source 80 is, for example, a conversation of subjects (for example, two people in an officer's conference room illustrated in FIG. 4A, or two people outside the officer's conference room) of the camera apparatus 11, present in a sound collection direction in which the omnidirectional microphone array apparatus 2 collects sounds, and is present in a direction of a predetermined angle θ with respect to the upper surface of the casing 21 of the omnidirectional microphone array apparatus 2. In addition, gaps d between the respective microphones 221, 222, 223, . . . , 22(n−1) and 22n are assumed to be constant.

The sound waveforms generated from the sound source 80 initially arrive at and are collected by the microphone 221, then arrive at and are collected by the microphone 222, similarly, sequentially arrive at and are collected by the microphones, and, finally, arrive at and are collected by the microphone 22n.

In addition, a direction which directs toward the sound source 80 from each of the microphones 221, 222, 223, . . . , 22(n−1) and 22n of the omnidirectional microphone array apparatus 2 is the same as, for example, a direction which directs toward the sound position A corresponding to the designated position A' designated by the user on a screen of the display device 36 from each microphone of the omnidirectional microphone array apparatus 2 in a case where the sound source 80 is the sound of conversations which people have.

Here, there are occurrences of arrival time differences τ1, τ2, τ3, . . . and τ(n−1) between time points when the sound waves arrive at the microphones 221, 222, 223, . . . and 22(n−1) and finally arrive at the microphone 22n. For this reason, if sound data of sounds collected by the respective microphones 221, 222, 223, . . . , 22(n−1) and 22n is added without change, the sound data is added in a state where a phase thereof is shifted, and thus a volume level of the sound waves is totally lowered.

In addition, τ1 indicates a time difference between the time point when the sound wave arrives at the microphone 221 and the time point when the sound wave arrives at the microphone 22n, τ2 indicates a time difference between the time point when the sound wave arrives at the microphone 222 and the time point when the sound wave arrives at the microphone 22n, and, similarly, τ(n−1) indicates a time difference between the time point when the sound wave arrives at the microphone 22(n−1) and the time point when the sound wave arrives at the microphone 22n.

In the present embodiment, the omnidirectional microphone array apparatus 2 includes A/D converters 241, 242, 243, . . . , 24(n−1) and 24n and delay devices 251, 252, 253, . . . , 25(n−1) and 25n which are respectively provided so as to correspond to the microphones 221, 222, 223, . . . , 22(n−1) and 22n, and an adder 26 (refer to FIG. 3).

In other words, in the omnidirectional microphone array apparatus 2, the A/D converters 241, 242, 243, . . . , 24(n−1) and 24n A/D convert analog sound data collected by the respective microphones 221, 222, 223, . . . , 22(n−1) and 22n into digital sound data.

In addition, in the omnidirectional microphone array apparatus 2, the delay devices 251, 252, 253, . . . , 25(n−1) and 25n provide delay times corresponding to the arrival time differences in the respective microphones 221, 222, 223, . . . , 22(n−1) and 22n to all phases of the sound waves so that the phases thereof are made to match each other, and then the adder 26 adds the sound data having undergone the delay process together. Accordingly, the omnidirectional microphone array apparatus 2 can form a directivity of the sound data in each of the microphones 221, 222, 223, . . . , 22(n−1) and 22n in a direction of the predetermined angel θ.

For example, in FIG. 3, delay times D1, D2, D3, . . . , D(n−1) and Dn which are respectively set in the delay devices 251, 252, 253, . . . , 25(n−1) and 25n respectively correspond to the arrival time differences τ1, τ2, τ3, . . . and τ(n−1), and are expressed by Equation (1)

[Equation 1]

$$D1 = \frac{L1}{Vs} = \frac{\{d \times (n-1) \times \cos θ\}}{Vs} \quad (1)$$

$$D2 = \frac{L2}{Vs} = \frac{\{d \times (n-2) \times \cos θ\}}{Vs}$$

$$D3 = \frac{L3}{Vs} = \frac{\{d \times (n-3) \times \cos θ\}}{Vs}$$

$$, \ldots ,$$

$$D(n-1) = \frac{L(n-1)}{Vs} = \frac{\{d \times 1 \times \cos θ\}}{Vs}$$

$$Dn = 0$$

Here, L1 indicates a difference between sound wave arrival distances in the microphone 221 and the microphone 22n. L2 indicates a difference between sound wave arrival distances in the microphone 222 and the microphone 22n. L3 indicates a difference between sound wave arrival distances in the microphone 223 and the microphone 22n, and, similarly, L(n−1) indicates a difference between sound wave arrival distances in the microphone 22(n−1) and the microphone 22n. Vs indicates a velocity of the sound wave (sound velocity). L1, L2, L3, . . . , and L(n−1), and Vs are known values. In FIG. 3, the delay time Dn set in the delay device 25n is 0 (zero).

As mentioned above, the omnidirectional microphone array apparatus 2 can simply form a directivity of sound data collected by each of the microphone units 22 and 23 by changing the delay times D1, D2, D3, . . . , D(n−1) and Dn which are respectively set in the delay devices 251, 252, 253, . . . , 25(n−1) and 25n.

In addition, for convenience of description, the directivity forming process illustrated in FIG. 3 has been described on the premise that the omnidirectional microphone array apparatus 2 performs the process. However, in a case where the signal processing unit 33 of the directivity control apparatus 3 includes the A/D converters 24 and the same number of the delay devices 251 to 25n as the number of microphones of the omnidirectional microphone array apparatus 2, and the single adder 26, the signal processing unit 33 of the directivity control apparatus 3 may perform the directivity forming process illustrated in FIG. 3 by using sound data of sounds collected by the respective microphones of the omnidirectional microphone array apparatus 2. Further, processes subsequent to the process in the delay devices may be realized as processes using software in a control unit (not illustrated) of the omnidirectional microphone array apparatus 2 or the signal processing unit 33 of the directivity control apparatus 3.

Next, a summary of an operation of the directivity control system 10 of the present embodiment will be described with reference to FIGS. 4A and 4B. FIG. 4A is a diagram illustrating the privacy protection region PRA inside the sound collection space K where the directivity control system 10 of the first embodiment is installed. FIG. 4B is a diagram illustrating a state in which output of sounds collected by the omnidirectional microphone array apparatus 2 is minimized in a case where the sound position A corresponding to the designated position A' which is designated with the finger FG of the user in an image displayed on the display device 36 is included in the privacy protection region PRA.

In the directivity control system 10 illustrated in FIG. 4A, the camera apparatus 11 captures an image of subjects (for example, two people in an officer's conference room illustrated in FIG. 4A or two people outside the officer's conference room) reflected in a range of a unique angle of view of the camera apparatus 11. In addition, for convenience of description of FIG. 4A, it is assumed that the camera apparatus 11 and the omnidirectional microphone array apparatus 2 are installed at a position higher than the officer's conference room inside the sound collection space K, and that the officer's conference room does not have a ceiling. Therefore, the two people in the officer's conference room and the two people outside the officer's conference room are imaged by the camera apparatus 11 as subjects.

The omnidirectional microphone array apparatus 2 collects sounds around the installation position M of the omnidirectional microphone array apparatus 2 in the sound collection space K. In FIG. 4A, the two people in the officer's conference room have conversations using, for example, highly confidential information, and "#$%&" is an example of conversation content using the highly confidential information. In addition, the two people outside the officer's conference room have daily conversations using, for example, information which is not highly confidential in a passage or the like outside the officer's conference room, and "Hello" is an example of daily conversation content using the information which is not highly confidential. Image data captured by the camera apparatus 11 is displayed on the display device 36 of the directivity control apparatus 3 (refer to FIG. 4B).

Here, when the designated position A' of the display device 36 is designated with the finger FG of the user, the directivity control apparatus 3 calculates a coordinate ($\theta_{MAh}$, $\theta_{MAv}$) indicating a directive direction which directs toward the sound position A from the installation position M of the omnidirectional microphone array apparatus 2 by using coordinate data indicating the designated position A'. The omnidirectional microphone array apparatus 2 or the directivity control apparatus 3 forms a directivity in the directive direction MIX which directs toward the sound position A from the installation position M of the omnidirectional microphone array apparatus 2 by using coordinate data of the coordinate ($\theta_{MAh}$, $\theta_{MAv}$) indicating the directive direction calculated by the directivity control apparatus 3.

In addition, in the present embodiment, a range of a quadrangular pyramid which directs toward a predetermined range PRB (refer to a long dashed line illustrated in FIG. 4A) inside the sound collection space K from the installation position M of the omnidirectional microphone array apparatus 2 is set in advance as a privacy protection region PRA in which output of sounds collected by the omnidirectional microphone array apparatus 2 is controlled (for example, a mute process, a masking process, or a voice change process), or collection of sounds is suspended. Initial setting of the privacy protection region PRA may be performed, for example, when the camera apparatus 11 or the omnidirectional microphone array apparatus 2 forming the directivity control system 10 illustrated in FIG. 4A is installed.

Therefore, in the directivity control system 10 of the present embodiment, in a case where it is determined that the sound position A corresponding to the designated position A' designated with the finger FG of the user or a stylus pen from the omnidirectional microphone array apparatus 2 is included in the privacy protection region PRA, the output control section 35 of the signal processing unit 33 of the directivity control apparatus 3 controls (for example, a mute process, a masking process, or a voice change process) output of sounds of conversations performed by the two people present at the sound position A, that is, in the passage or the like outside the officer's conference room, or causes the omnidirectional microphone array apparatus 2 to suspend collection of sounds.

In other words, the sounds of conversations performed by the two people present in the passage or the like outside the officer's conference room are not output from the speaker device 37, or, even if output, it is difficult to specify who utters the sounds (refer to FIG. 4B). In addition, in a case where it is determined that the sound position A corresponding to the designated position A' designated with the finger FG of the user or a stylus pen is included in the privacy protection region PRA, the output control section 35 displays, for example, a message indicating that the sound position A is included in the privacy protection region PRA, on the display device 36 (refer to FIG. 4B).

In addition, in FIG. 4A, even when the vicinity of the two people present in the officer's conference room is designated in the image displayed on the display device 36, in a case where it is determined that this designated position is included in the privacy protection region PRA, similarly, the output control section 35 of the signal processing unit 33 of the directivity control apparatus 3 controls (for example, a mute process, a masking process, or a voice change process) output of sounds of conversations performed by the two people present at the sound position A, that is, in the officer's conference room, or suspends collection of sounds.

Therefore, in a case where the sound position A corresponding to the designated position A' designated with the finger FG of the user or a stylus pen is included in the privacy protection region PRA, the directivity control apparatus 3 controls (for example, a mute process, a masking process, or a voice change process) output of sounds of conversations performed by the two people who are subjects present at the sound position A, or causes the omnidirectional microphone array apparatus 2 to suspend collection of sounds, regardless of whether or not the sounds of the people who are subjects use highly confidential information. In addition, whether or not the sound position A is included in the privacy protection region PRA will be described in detail with reference to FIG. 6.

Next, an operation procedure of the initial setting in the directivity control system 10 of the present embodiment will be described with reference to FIG. 5A. FIG. 5A is a flowchart illustrating an operation procedure of the initial setting in the directivity control system 10 of the first embodiment. The initial setting includes, for example, an operation in which the camera apparatuses 11 to 1n or the omnidirectional microphone array apparatus 2 are initially installed, and an operation in which the directive direction calculation section 34 acquires input parameters which are required to calculate a directive direction.

In FIG. 5A, the camera apparatus 11 and the omnidirectional microphone array apparatus 2 forming the directivity control system 10 are initially installed so as to be fixed at a predetermined position (for example, a ceiling surface of a room of a company or a stand) (ST1). The camera apparatus 11 and the omnidirectional microphone array apparatus 2 are respectively installed at different positions (refer to FIG. 4A).

After the camera apparatus 11 and the omnidirectional microphone array apparatus 2 are initially installed, the directive direction calculation section 34 measures each input parameter which is required to calculate a coordinate $(\theta_{MAh},\theta_{MAv})$ indicating a directive direction (ST2). The step ST2 includes a case where the user measures the input parameter by using a measuring device (for example, a laser range finder) or a case where the camera apparatus 11 measures and acquires the input parameter by using functions of well-known techniques of the camera apparatus 11. Each input parameter in step ST2 is different for each directive direction calculation method, and will be described in detail with reference to FIGS. 7 to 9.

After step ST2, each input parameter measured in step ST2 is input to the signal processing unit 33 of the directivity control apparatus 3 from the camera apparatus 11, or is input to the signal processing unit 33 from the operation unit 32 (ST3). For example, the camera apparatus 11 transmits an input parameter acquired by using functions of well-known techniques of the camera apparatus 11, to the communication unit 31 of the directivity control apparatus 3. The communication unit 31 outputs the input parameter transmitted by the camera apparatus 11, to the signal processing unit 33.

The signal processing unit 33 temporarily preserves each input parameter acquired in step ST3, in the memory 38 (ST4). Due to the above-described steps, the operation of the initial setting in the directivity control system 10 is finished.

Figure 6:
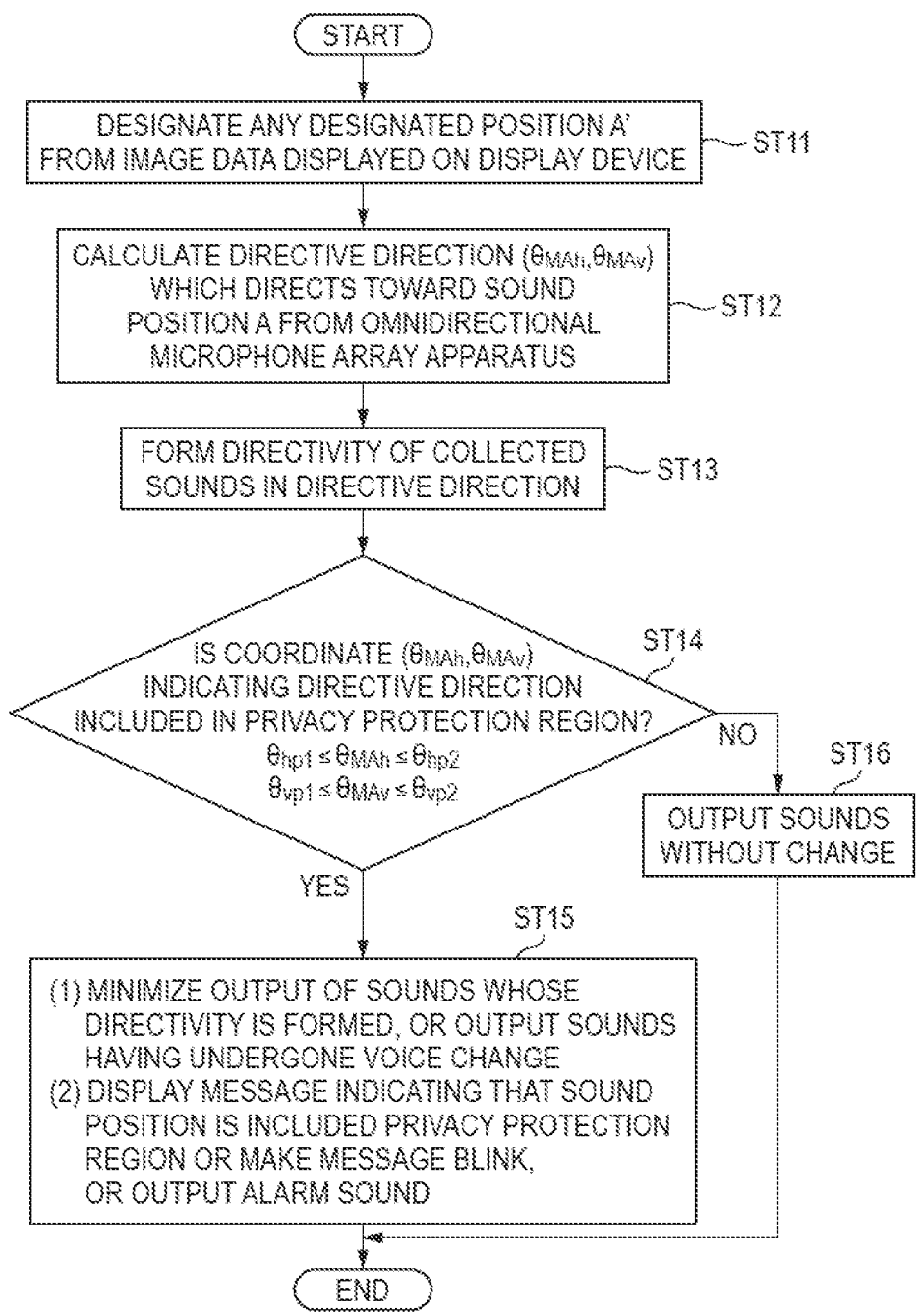
FIG. 6 is a flowchart illustrating an operation procedure of changing sound output control depending on a coordinate indicating a directive direction in the directivity control system of the first embodiment.

Next, with reference to FIGS. 6 to 11, a description will be made of an operation procedure after the initial setting in the directivity control system 10 of the present embodiment is performed. FIG. 6 is a flowchart illustrating an operation procedure of changing sound output control depending on a coordinate indicating a directive direction in the directivity control system 10 of the first embodiment. In addition, it is assumed that, prior to starting of the flowcharts illustrated in FIGS. 6 to 11, the omnidirectional microphone array apparatus 2 collects sounds in the sound collection space K.

In FIG. 6, the directivity control apparatus 3 receives designation of any designated position A' in the image data displayed on the display device 36 illustrated in FIG. 4B, via the operation unit 32 (ST11). The directivity control apparatus 3 transmits, to the camera apparatus 11, a notification indicating that the designation of any designated position A' in the image data displayed on the display device 36 has been received. In addition, in step ST11, the directivity control apparatus 3 transmits coordinate data of the designated position A' in the image data displayed on the display device 36, to the camera apparatus 11.

After step ST11, when the coordinate data of the designated position A' and the notification indicating that the designation has been received are received from the directivity control apparatus 3, the camera apparatus 11 calculates and acquires coordinate data of a distance to a sound position A corresponding to the designated position A' designated in step ST11, a horizontal angle, and a vertical angle $(L_{CA},\theta_{CAh},\theta_{CAv})$ with an installation position C of the camera apparatus 11 as a starting point.

The camera apparatus 11 transmits, to the directivity control apparatus 3, the coordinate data of the distance to the sound position A corresponding to the designated position A' designated in step ST11, the horizontal angle, and the vertical angle $(L_{CA},\theta_{CAh},\theta_{CAv})$ with the installation position C of the camera apparatus 11 as a starting point.

The directive direction calculation section 34 of the signal processing unit 33 of the directivity control apparatus 3 calculates a coordinate $(\theta_{MAh},\theta_{MAv})$ indicating a directive direction which directs toward the sound position A from the installation position M of the omnidirectional microphone array apparatus 2 by using the coordinate data of the distance from the camera apparatus 11 to the sound position A, the horizontal angle, and the vertical angle $(L_{CA},\theta_{CAh},\theta_{CAv})$, and each input parameter which is temporarily preserved in the memory 38 in step ST4 illustrated in FIG. 5A (ST12). A calculation process of the coordinate $(\theta_{MAh},\theta_{MAv})$ indicating the directive direction will be described in detail with reference to FIGS. 12 to 14.

The directivity control apparatus 3 transmits a directivity forming instruction including coordinate data of the coordinate $(\theta_{MAh},\theta_{MAv})$ indicating the directive direction calculated in step ST12, to the omnidirectional microphone array apparatus 2. The omnidirectional microphone array apparatus 2 forms a directivity of sound data in the directive direction of the coordinate $(\theta_{MAh},\theta_{MAv})$ calculated by the directivity control apparatus 3 in response to the directivity forming instruction from the directivity control apparatus 3 (ST13).

In addition, in the directivity forming process of collected sounds shown in step ST13, the description is made that the omnidirectional microphone array apparatus 2 performs the process in response to the directivity forming instruction transmitted from the directivity control apparatus 3, but the directivity control apparatus 3 itself may perform the directivity forming process of collected sounds shown in step ST13. Specifically, the output control section 35 performs the directivity forming process described with reference to FIG. 3 by using the coordinate data of the sound collection direction coordinate $(\theta_{MAh},\theta_{MAv})$ calculated in step ST12 and sound data of sounds collected by the omnidirectional microphone array apparatus 2. Accordingly, the directivity control apparatus 3 can easily obtain sounds whose directivity is formed in a directive direction MIX indicated by the directive direction coordinate $(\theta_{MAh},\theta_{MAv})$.

Accordingly, the omnidirectional microphone array apparatus 2 can increase a volume level of sound data of sounds collected from the directive direction $(\theta_{MAh},\theta_{MAv})$ in which a subject is present, and can decrease a volume level of sound data of sounds collected from a direction in which the subject is not present.

The output control section 35 of the signal processing unit 33 of the directivity control apparatus 3 determines whether or not the sound position A is included in the privacy protection region PRA inside the sound collection space K on the basis of the coordinate data of the coordinate ($\theta_{MAh}$, $\theta_{MAv}$) indicating the directive direction calculated by the directive direction calculation section 34 (ST14).

Specifically, the output control section 35 determines whether or not the horizontal angle $\theta_{MAh}$ of the coordinate indicating the directive direction calculated by the directive direction calculation section 34 is an angle in a range from a predetermined value $\theta_{hp1}$ to a predetermined value $\theta_{hp2}$, and the vertical angle $\theta_{MAv}$ of the coordinate indicating the directive direction calculated by the directive direction calculation section 34 is an angle in a range from a predetermined value $\theta_{vp1}$ to a predetermined value $\theta_{vp2}$.

The predetermined values $\theta_{hp1}$ and $\theta_{hp2}$ are respectively a lower limit value and an upper limit value which are provided in order to define a range of the privacy protection region PRA illustrated in FIG. 4A by using a horizontal angle of a directive direction from the installation position M of the omnidirectional microphone array apparatus 2. Similarly, the predetermined values $\theta_{vp1}$ and $\theta_{vp2}$ are respectively a lower limit value and an upper limit value which are provided in order to define a range of the privacy protection region PRA by using a vertical angle of a directive direction from the installation position M of the omnidirectional microphone array apparatus 2. In addition, in a case where the privacy protection region PRA is an entire range of the sound collection space K, the predetermined values $\theta_{hp1}$ and $\theta_{vp1}$ are 0 (zero), and the predetermined values $\theta_{hp2}$ and $\theta_{vp2}$ are 360, which is also the same for the following second embodiment.

Therefore, in the present embodiment, in a case where the coordinate ($\theta_{MAh}$, $\theta_{MAv}$) indicating the directive direction calculated in step ST12 satisfies Equation (2), the output control section 35 determines that the sound position A corresponding to the designated position A' designated with the finger FG of the user is included in the privacy protection region PRA.

[Equation 2]

$$\theta_{hp1} \le \theta_{MAh} \le \theta_{hp2}$$

$$\theta_{vp1} \le \theta_{MAv} \le \theta_{vp2} \quad (2)$$

If it is determined that sound position A is included in the preset privacy protection region PRA inside the sound collection space K (ST14, YES), the output control section 35 controls (for example, a minimization process such as a mute process or a masking process, or a voice change process; this is also the same for the following) output of the sounds whose directivity is formed in the directive direction in step ST13 (ST15). In addition, the output control section 35 explicitly notifies the user that the sound position A corresponding to the designated position A' designated with the finger FG of the user or a stylus pen is included in the privacy protection region PRA (ST15). The output control section 35 displays (refer to FIG. 4B) a message indicating that the sound position A corresponding to the designated position A' is included in the privacy protection region PRA or makes the message blink on the display device 36, or outputs a predetermined alarm sound from the speaker device 37 (ST15).

On the other hand, if it is determined that the sound position A is not included in the preset privacy protection region PRA inside the sound collection space K (ST14, NO), the output control section 35 outputs the sounds whose directivity is formed in the directive direction ($\theta_{MAh}$, $\theta_{MAv}$) in step ST13 from the speaker device 37 without change (ST16). Due to the above-described steps, the operation of the directivity control system 10 illustrated in FIG. 6 is finished.

Figure 7:
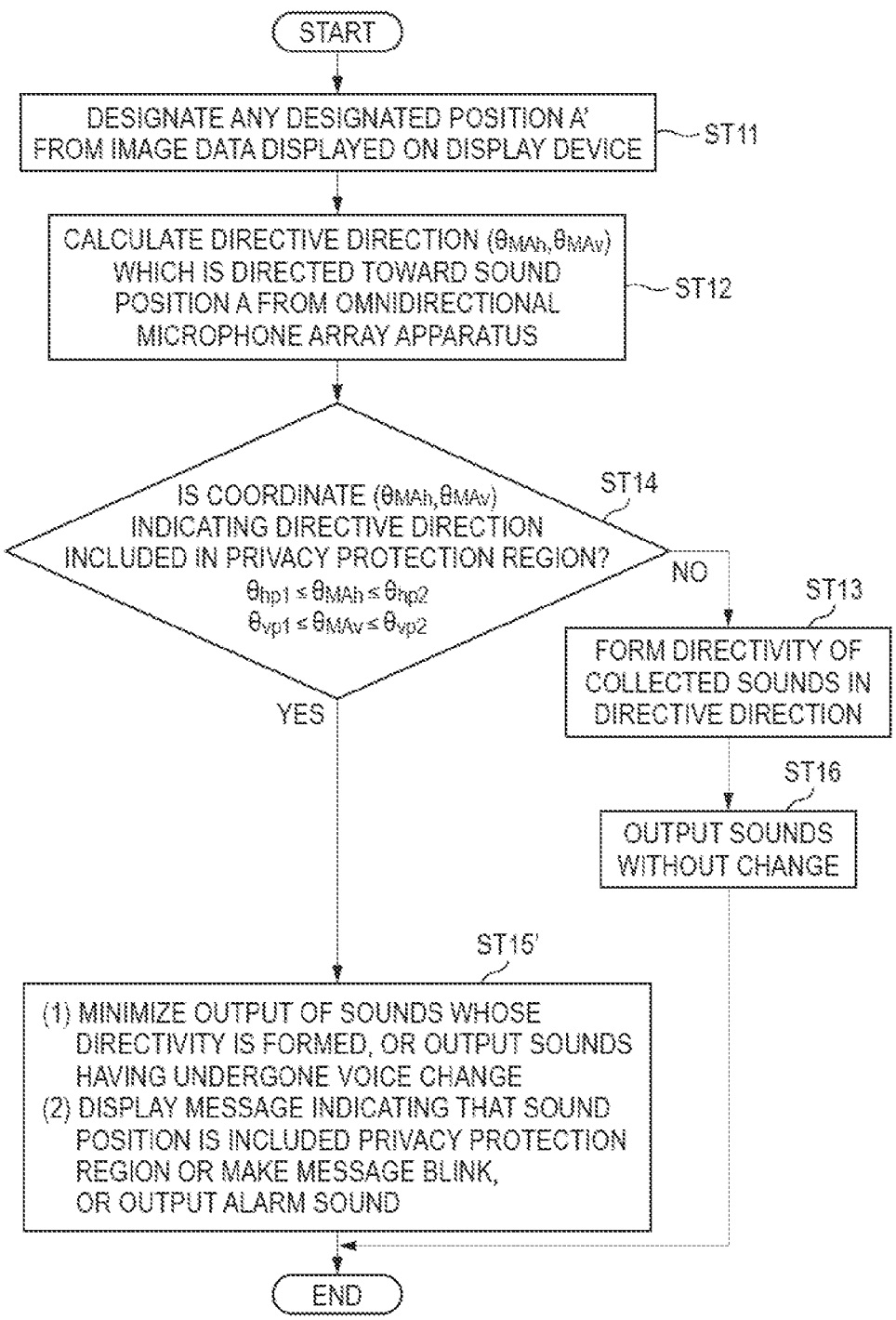
FIG. 7 is a flowchart illustrating another example of the operation procedure of changing sound output control depending on a coordinate indicating a directive direction in the directivity control system of the first embodiment.

FIG. 7 is a flowchart illustrating another example of the operation procedure of changing sound output control depending on a coordinate indicating a directive direction in the directivity control system 10 of the first embodiment. In description of the flowchart illustrated in FIG. 7, content different from the description of the flowchart illustrated in FIG. 6 will be described, and description of the same content will be omitted or made briefly.

A main difference between the flowchart illustrated in FIG. 7 and the flowchart illustrated in FIG. 6 is an execution timing of the directivity forming process in step ST13. In other words, in FIG. 7, the directivity forming process in step ST13 is performed in a case where it is determined that the sound position A is not included in the preset privacy protection region PRA inside the sound collection space K in step ST14. The output control section 35 forms a directivity in sound data of sounds collected by the omnidirectional microphone array apparatus 2 in the directive direction ($\theta_{MAh}$, $\theta_{MAv}$) in step ST13, and outputs the sounds from the speaker device 37 without change (ST16).

On the other hand, if it is determined in step S14 whether or not the sound position A is included in the preset privacy protection region PRA inside the sound collection space K (ST14, YES), the output control section 35 controls output of sounds collected by the omnidirectional microphone array apparatus 2 in a state in which a directivity is not formed in the directive direction ($\theta_{MAh}$, $\theta_{MAv}$) (ST15'). In addition, the output control section 35 displays (refer to FIG. 4B) a message indicating that the sound position A is included in the privacy protection region PRA or makes the message blink on the display device 36, or outputs a predetermined alarm sound from the speaker device 37 (ST15'). Due to the above-described steps, the operation of the directivity control system 10 illustrated in FIG. 7 is finished.

Figure 8:
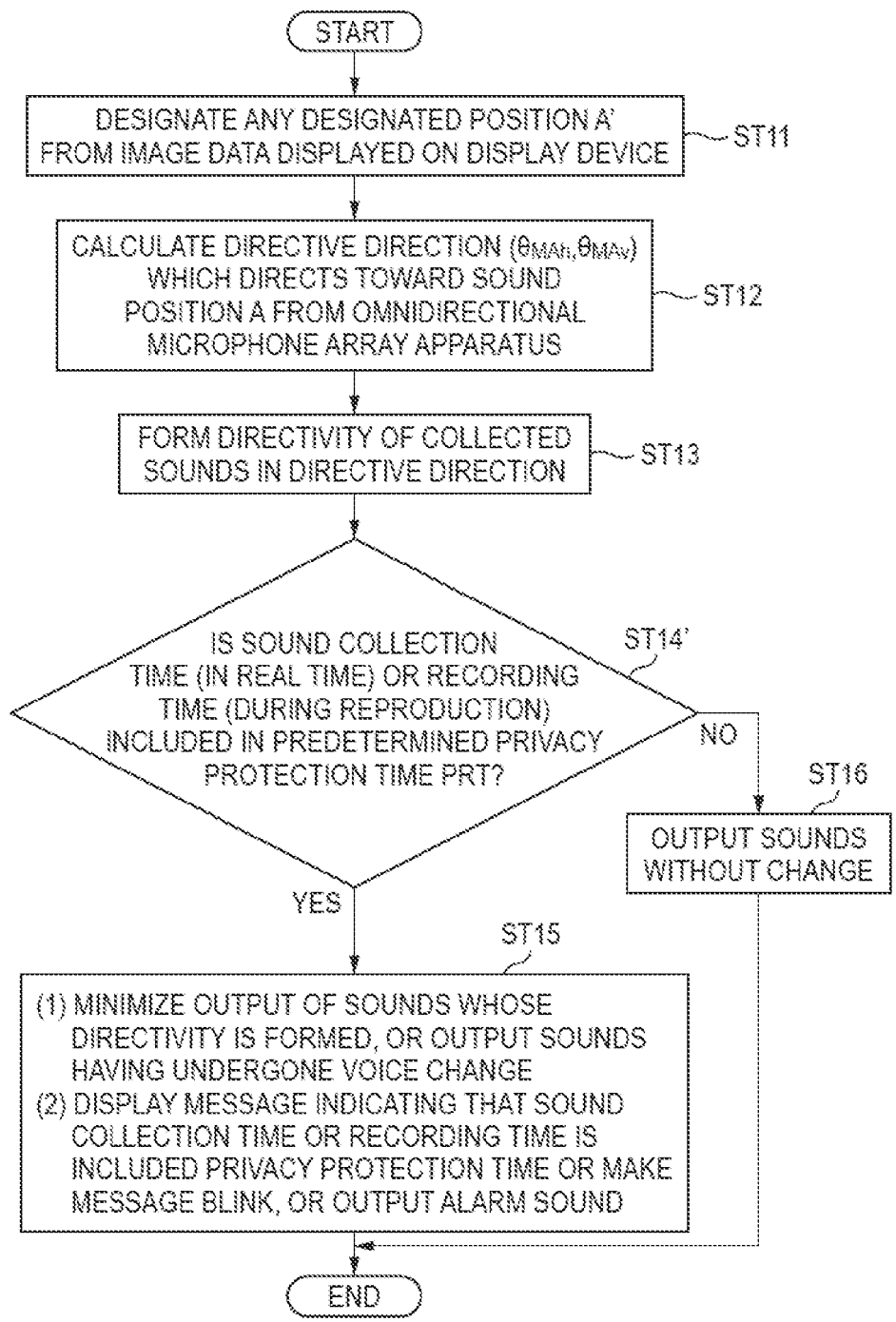
FIG. 8 is a flowchart illustrating an operation procedure of changing sound output control depending on a sound collection time or a recording time in the directivity control system of the first embodiment.

FIG. 8 is a flowchart illustrating an operation procedure of changing sound output control depending on a sound collection time or a recording time in the directivity control system 10 of the first embodiment. In description of the flowchart illustrated in FIG. 8, content different from the description of the flowchart illustrated in FIG. 6 will be described, and description of the same content will be omitted or made briefly. The flowchart illustrated in FIG. 8 is applicable to any case where sound data of sounds collected by the omnidirectional microphone array apparatus 2 is read from the recorder apparatus 4 and is reproduced by the directivity control apparatus 3, even when the omnidirectional microphone array apparatus 2 collects sounds of the sound collection space K in real time.

A main difference between the flowchart illustrated in FIG. 8 and the flowchart illustrated in FIG. 6 is determination content in step ST14' (refer to FIG. 8) and determination content in step ST14 (refer to FIG. 6). In other words, in FIG. 8, the output control section 35 determines whether or not a sound collection time (for example, the current time) in the omnidirectional microphone array apparatus 2 or a recording time when the recorder apparatus 4 records sound data is included in a preset privacy protection time PRT (ST14'). For example, the output control section 35 acquires data on the recording time of the sound data by referring to a header region of an audio file read from the recorder apparatus 4.

If it is determined that the sound collection time or the recording time is included in the privacy protection time PRT (ST14', YES), the output control section 35 controls output of sounds whose directivity is formed in the directive direction ($\theta_{MAh}, \theta_{MAv}$) in step ST13 (ST15). In addition, the output control section 35 displays a message indicating that the sound collection time or the recording time is included in the privacy protection time PRT or makes the message blink on the display device 36, or outputs a predetermined alarm sound from the speaker device 37 (ST15').

On the other hand, if it is determined that the sound collection time or the recording time is not included in the privacy protection time PRT (ST14', NO), the output control section 35 outputs the sounds whose directivity is formed in the directive direction ($\theta_{MAh}, \theta_{MAv}$) in step ST13 from the speaker device 37 without change (ST16). Due to the above-described steps, the operation of the directivity control system 10 illustrated in FIG. 8 is finished.

Figure 9:
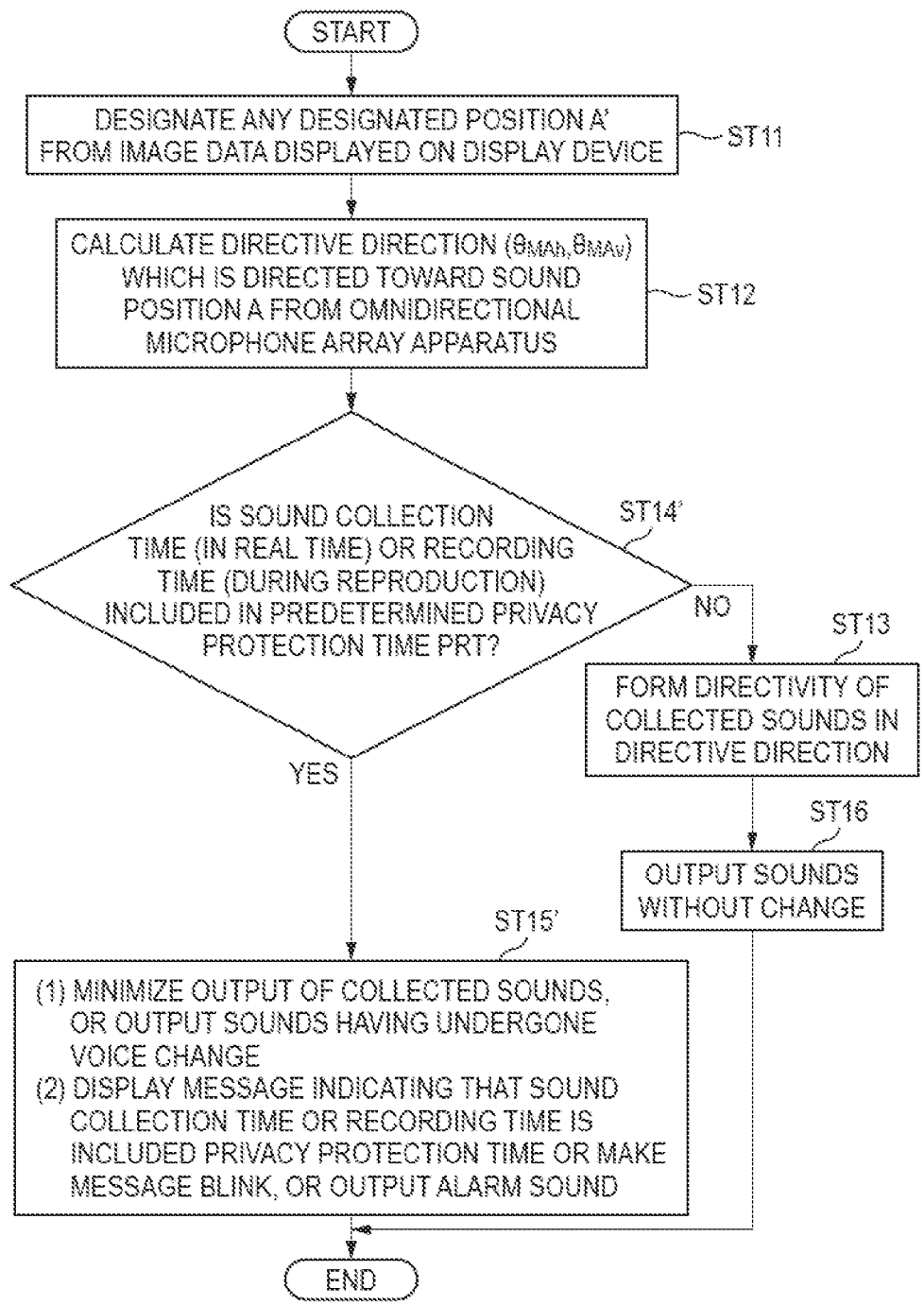
FIG. 9 is a flowchart illustrating another example of the operation procedure of changing sound output control depending on a sound collection time or a recording time in the directivity control system of the first embodiment.

FIG. 9 is a flowchart illustrating another example of the operation procedure of changing sound output control depending on a sound collection time or a recording time in the directivity control system 10 of the first embodiment. In description of the flowchart illustrated in FIG. 9, content different from the description of the flowchart illustrated in FIG. 7 will be described, and description of the same content will be omitted or made briefly. In the same manner as the flowchart illustrated in FIG. 8, the flowchart illustrated in FIG. 9 is applicable to any case where sound data of sounds collected by the omnidirectional microphone array apparatus 2 is read from the recorder apparatus 4 and is reproduced by the directivity control apparatus 3, even when the omnidirectional microphone array apparatus 2 collects sounds of the sound collection space K in real time.

A main difference between the flowchart illustrated in FIG. 9 and the flowchart illustrated in FIG. 7 is determination content in step ST14' (refer to FIG. 9) and determination content in step ST14 (refer to FIG. 7). In other words, in FIG. 9, the output control section 35 determines whether or not a sound collection time (for example, the current time) in the omnidirectional microphone array apparatus 2 or a recording time when the recorder apparatus 4 records sound data is included in a preset privacy protection time PRT (ST14'). For example, the output control section 35 acquires data on the recording time of the sound data by referring to a header region of an sound data file read from the recorder apparatus 4.

If it is determined that the sound collection time or the recording time is included in the privacy protection time PRT (ST14', YES), the output control section 35 controls output of sounds collected by the omnidirectional microphone array apparatus 2 in a state in which a directivity is not formed in the directive direction ($\theta_{MAh}, \theta_{MAv}$) (ST15'). In addition, the output control section 35 displays a message indicating that the sound collection time or the recording time is included in the privacy protection time PRT or makes the message blink on the display device 36, or outputs a predetermined alarm sound from the speaker device 37 (ST15').

On the other hand, if it is determined that the sound collection time or the recording time is not included in the privacy protection time PRT (ST14', NO), the output control section 35 forms a directivity by using sounds collected by the omnidirectional microphone array apparatus 2 in the directive direction ($\theta_{MAh}, \theta_{MAv}$) (ST13). The output control section 35 outputs the sounds whose directivity is formed in the directive direction ($\theta_{MAh}, \theta_{MAv}$) from the speaker device 37 without change (ST16). Due to the above-described steps, the operation of the directivity control system 10 illustrated in FIG. 9 is finished.

Figure 10:
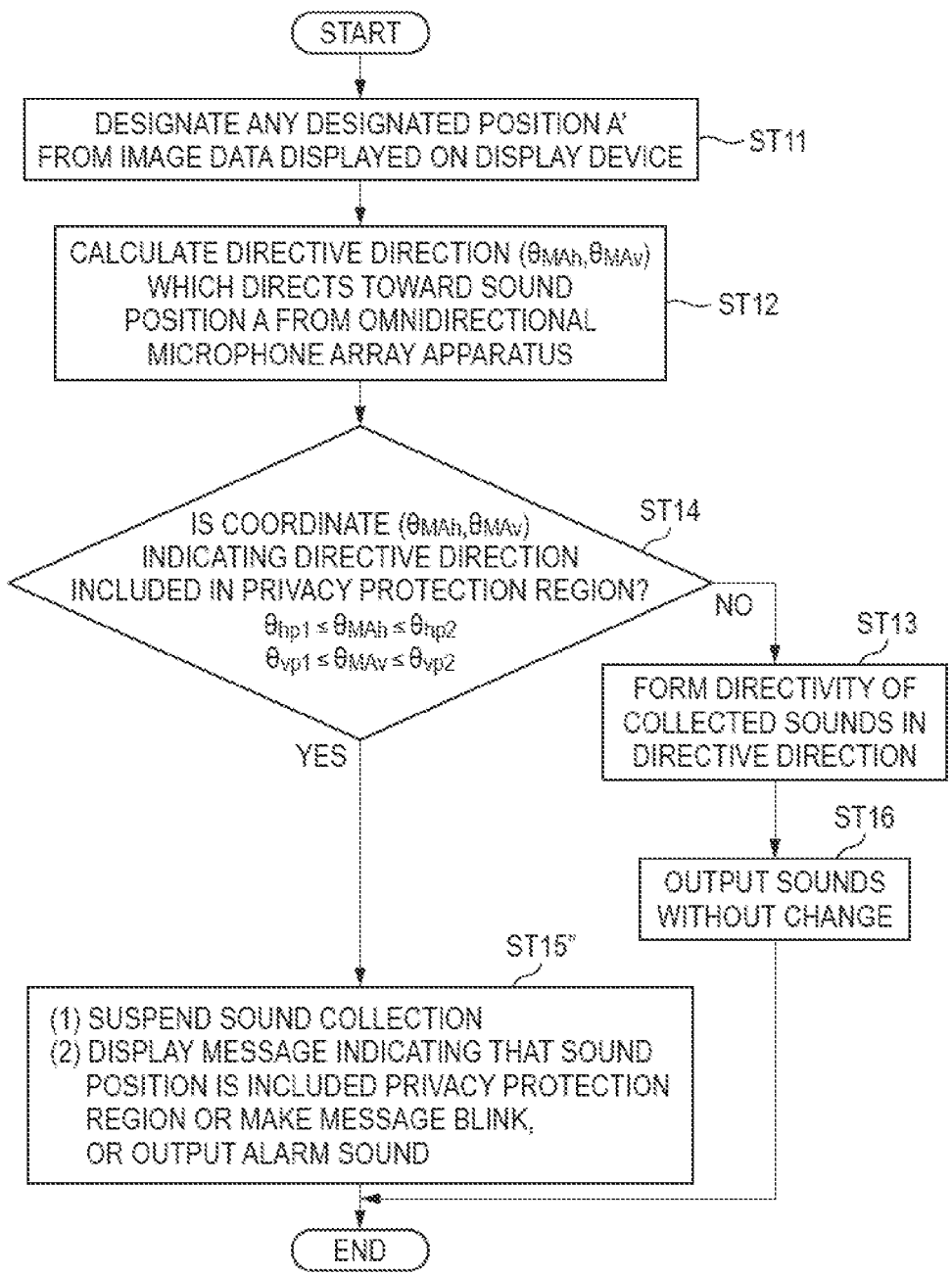
FIG. 10 is a flowchart illustrating an example of an operation procedure of changing a sound collection process between being continued and being suspended depending on a coordinate indicating a directive direction in the directivity control system of the first embodiment.

FIG. 10 is a flowchart illustrating an operation procedure of changing a sound collection process between being continued and being suspended depending on a coordinate indicating a directive direction in the directivity control system 10 of the first embodiment. In description of the flowchart illustrated in FIG. 10, content different from the description of the flowchart illustrated in FIG. 7 will be described, and description of the same content will be omitted or made briefly.

A main difference between the flowchart illustrated in FIG. 10 and the flowchart illustrated in FIG. 7 is a process content in step ST15" and a process content in step ST15'. In other words, in FIG. 10, if it is determined that the sound position A is included in the privacy protection region PRA inside the sound collection space K in step S14, the output control section 35 generates a sound collection suspending instruction for temporarily suspending sound collection in the omnidirectional microphone array apparatus 2 and outputs the instruction to the communication unit 31, so as to cause the communication unit 31 to transmit the sound collection suspending instruction to the omnidirectional microphone array apparatus 2. Accordingly, the omnidirectional microphone array apparatus 2 temporarily suspends collection of sounds in the sound collection space K in response to the sound collection suspending instruction transmitted from the directivity control apparatus 3 (ST15"). In addition, the output control section 35 displays a message indicating that the sound position A is included in the privacy protection region PRA or makes the message blink on the display device 36, or outputs a predetermined alarm sound from the speaker device 37 (ST15").

Further, if it is determined that the sound position A is not included in the privacy protection region PRA inside the sound collection space K, the output control section 35 performs the same operation as in steps ST13 and ST16 illustrated in FIG. 7, and thus description thereof will not be repeated. Due to the above-described steps, the operation of the directivity control system 10 illustrated in FIG. 10 is finished.

Figure 11:
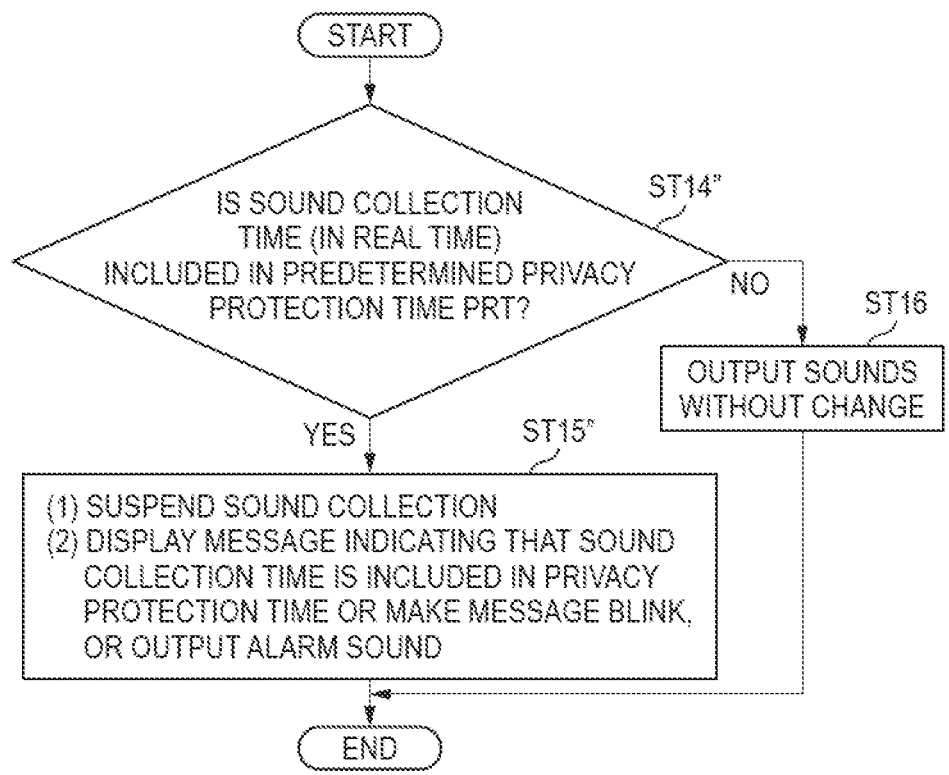
FIG. 11 is a flowchart illustrating an example of an operation procedure of changing a sound collection process between being continued and being suspended depending on a sound collection time in the directivity control system of the first embodiment.

FIG. 11 is a flowchart illustrating an operation procedure of changing a sound collection process between being continued and being suspended depending on a sound collection time in the directivity control system 10 of the first embodiment. An operation of the flowchart illustrated in FIG. 11 is performed when the omnidirectional microphone array apparatus 2 collects sounds of the sound collection space K in real time.

In FIG. 11, the output control section 35 determines whether or not a sound collection time (for example, the current time) in the omnidirectional microphone array apparatus 2 is included in a preset privacy protection time PRT (ST14").

If it is determined that the sound collection time is included in the privacy protection time PRT (ST14", YES), the output control section 35 generates a sound collection suspending instruction for temporarily suspending sound collection in the omnidirectional microphone array apparatus 2 and outputs the instruction to the communication unit 31, so as to cause the communication unit 31 to transmit the sound collection suspending instruction to the omnidirectional microphone array apparatus 2. Accordingly the omnidirectional microphone array apparatus 2 temporarily suspends collection of sounds in the sound collection space K in response to the sound collection suspending instruction transmitted from the directivity control apparatus 3 (ST15"). In addition, the output control section 35 displays a message indicating that the sound collection time is included in the privacy protection time PRT or makes the message blink on the display device 36, or outputs a predetermined alarm sound from the speaker device 37 (ST15").

On the other hand, if it is determined that the sound collection time is not included in the privacy protection time PRT (ST14", NO), the output control section 35 outputs sounds collected by the omnidirectional microphone array apparatus 2 from the speaker device 37 without change in a state in which a directivity is not formed in the directive direction ($\theta_{MAh}, \theta_{MAv}$) (ST16). In addition, if it is determined that the sound collection time is not included in the privacy protection time PRT (ST14", NO), the output control section 35 may form a directivity in the directive direction ($\theta_{MAh}, \theta_{MAv}$) by using the sounds collected by the omnidirectional microphone array apparatus 2 and may output the sounds from the speaker device 37. Due to the above-described steps, the operation of the directivity control system 10 illustrated in FIG. 11 is finished.

(Calculation Method of Coordinate ($\theta_{MAh}, \theta_{MAv}$) Indicating Directive Direction of Omnidirectional Microphone Array Apparatus 2)

Here, with reference to FIGS. 5B and 12 to 14, detailed description will be made of a method in which the directive direction calculation section 34 of the signal processing unit 33 of the directivity control apparatus 3 calculates a coordinate ($\theta_{MAh}, \theta_{MAv}$) indicating a directive direction of the omnidirectional microphone array apparatus 2.

Figure 12C:
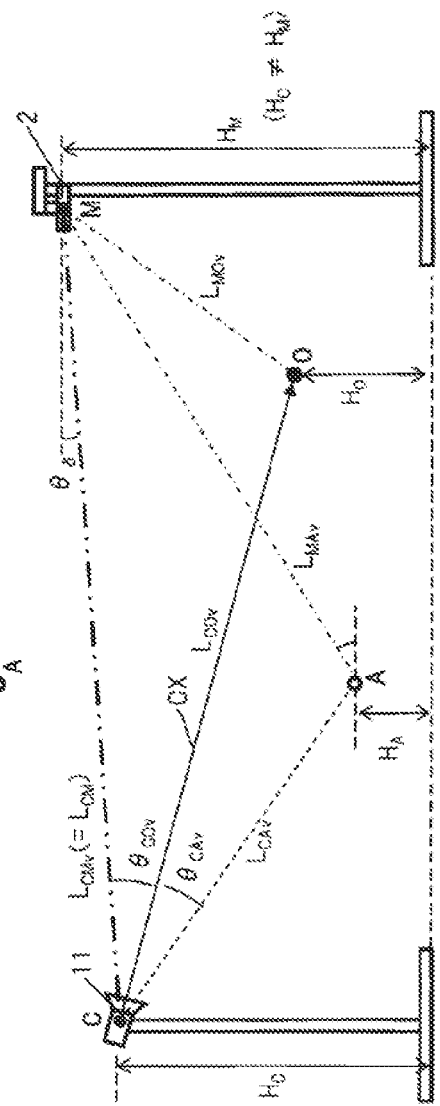
FIG. 12C is a vertical direction cross-sectional view taken along the line K-K' of FIG. 12B.

FIG. 5B is a diagram illustrating a position of a reference point O and a designated position A' on a screen of the display device 36, for calculating a directive direction of the omnidirectional microphone array apparatus 2. FIG. 12A is a perspective view illustrating each position of the camera apparatus 11, the omnidirectional microphone array apparatus 2, the reference point O, and the sound position A. FIG. 12B is a horizontal direction plan view in which FIG. 12A is viewed in a vertically lower direction from a vertically upper direction. FIG. 12C is a vertical direction cross-sectional view taken along the line K-K' of FIG. 12B.

Figure 14A:
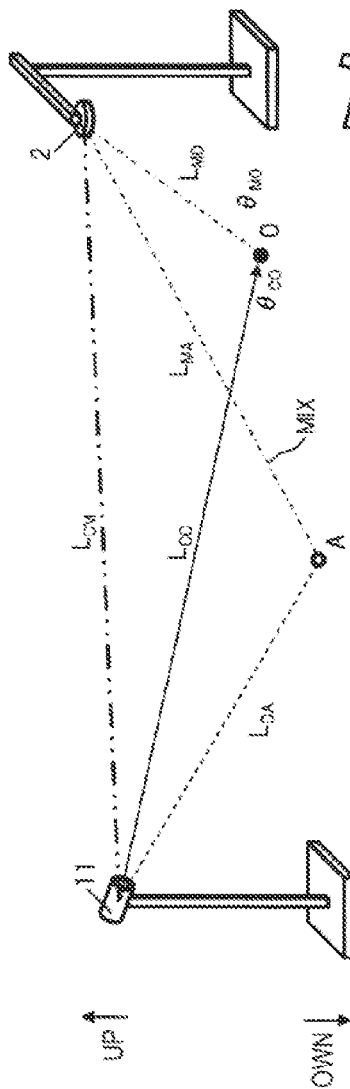
FIG. 14A is a perspective view illustrating each position of the camera apparatus, the omnidirectional microphone array apparatus, the reference point O, and the sound position A
Figure 14B:
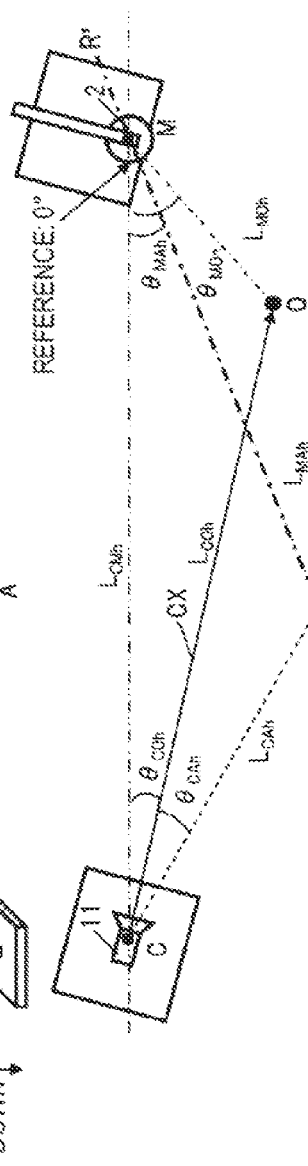
Figure 14C:
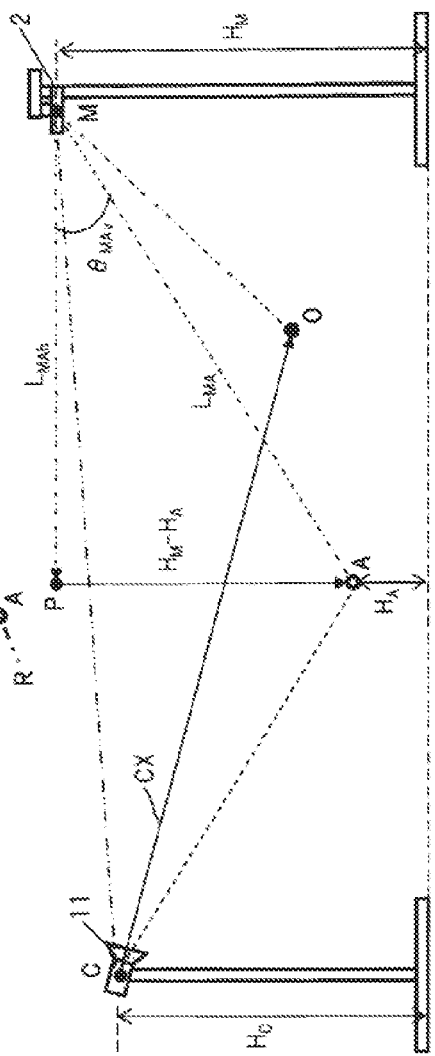
FIG. 14C is a vertical direction cross-sectional view taken along the line R-R' of FIG. 14B.

FIG. 13A is a perspective view illustrating each position of the camera apparatus 11, the omnidirectional microphone array apparatus 2, the reference point O, and the sound position A. FIG. 13B is a horizontal direction plan view in which FIG. 13A is viewed in a vertically lower direction from a vertically upper direction. FIG. 13C is a vertical direction cross-sectional view taken along the line Q-Q' of FIG. 13B. FIG. 14A is a perspective view illustrating each position of the camera apparatus 11, the omnidirectional microphone array apparatus 2, the reference point O, and the sound position A. FIG. 14B is a horizontal direction plan view in which FIG. 14A is viewed in a vertically lower direction from a vertically upper direction. FIG. 14C is a vertical direction cross-sectional view taken along the line R-R' of FIG. 14B.

For example, in a calculation method (hereinafter, referred to as the "present calculation method") of a directive direction in the directive direction calculation section 34, a reference point O is provided at a predetermined position in a direction of an optical axis CX of the camera apparatus 11, for example. The reference point O is present in the direction of the optical axis CX of the camera apparatus 11, and is thus a practical site position corresponding to a central point O' of a screen of the display device 36 illustrated in FIG. 5B.

The directive direction calculation section 34 calculates a coordinate ($\theta^{MAh}, \theta_{MAv}$) indicating a directive direction of the omnidirectional microphone array apparatus 2 on the basis of:

(1) a horizontal component distance $L_{CMh}$ of a distance $L_{CM}$ from the camera apparatus 11 to the omnidirectional microphone array apparatus 2;

(2) a distance $L_{CO}$ and a depression angle $\theta_{CO}$ from the camera apparatus 11 to the reference point O;

(3) a distance $L_{MO}$ and a depression angle $\theta_{MO}$ from the omnidirectional microphone array apparatus 2 to the reference point O;

(4) respective heights $H_C$, $H_M$ and $H_O$ of the camera apparatus 11, the omnidirectional microphone array apparatus 2, and the reference point O from a horizontal surface (for example, a surface of a floor of the company);

(5) a horizontal angle $\theta_{CAh}$ and a vertical angle $\theta_{CAv}$ from the camera apparatus 11 to the sound position A; and (6) a height $H_A$ of the sound position A from a horizontal surface (for example, a surface of a floor of the company).

In the present calculation method, the input parameters in step ST2 illustrated in FIG. 5A include:

(1) the horizontal component distance $L_{CMh}$ of the distance $L_{CM}$ from the camera apparatus 11 to the omnidirectional microphone array apparatus 2;

(2) the distance $L_{CO}$ and the depression angle $\theta_{CO}$ from the camera apparatus 11 to the reference point O;

(3) the distance $L_{MO}$ and the depression angle $\theta_{MO}$ from the omnidirectional microphone array apparatus 2 to the reference point O; and (4) the respective heights $H_C$, $H_M$ and $H_O$ of the camera apparatus 11, the omnidirectional microphone array apparatus 2, and the reference point O from a horizontal surface (for example, a surface of a floor of the company).

(1) The horizontal component distance $L_{CMh}$ of the distance $L_{CM}$ from the camera apparatus 11 to the omnidirectional microphone array apparatus 2 is a fixed value defined when the camera apparatus 11 and the omnidirectional microphone array apparatus 2 are initially installed.

(2) The distance $L_{CO}$ and the depression angle $\theta_{CO}$ from the camera apparatus 11 to the reference point O can be simply measured, for example, by the user causing a laser range finder to direct toward the camera apparatus 11 at the position of the reference point O. Data on the measured distance $L_{CO}$ and depression angle $\theta_{CO}$ is input to the signal processing unit 33 from the operation unit 32, for example, in response to the user's input operation.

(3) The distance $L_{MO}$ and the depression angle $\theta_{MO}$ from the omnidirectional microphone array apparatus 2 to the reference point O can be simply measured, for example, by the user causing the laser range finder to direct toward the omnidirectional microphone array apparatus 2 at the position of the reference point O. Data on the measured distance $L_{MO}$ and depression angle $\theta_{MO}$ is input to the signal processing unit 33 from the operation unit 32, for example, in response to the user's input operation.

(4) The respective heights $H_C$ and $H_M$ of the camera apparatus 11 and the omnidirectional microphone array apparatus 2 from a horizontal surface (for example, a surface of a floor of the company) are fixed values defined when the camera apparatus 11 and the omnidirectional microphone array apparatus 2 are initially installed, and the height $H_O$ of the reference point O from the horizontal surface (for example, a surface of a floor of the company) is a fixed value defined when the position of the reference point O is determined.

In addition, in the present calculation method, in the coordinate ($L_{CA}, \theta_{CAh}, \theta_{CAv}$) obtained after step ST11 illustrated in FIG. 6, (5) the horizontal angle $\theta_{CAh}$ and the vertical angle $\theta_{CAv}$ in a direction which directs toward the sound position A from the camera apparatus 11 are used, and are acquired by using a function of a well-known technique of the camera apparatus 11, for example.

In addition, in the present calculation method, (6) the height $H_A$ of the sound position A from a horizontal surface (a surface of a floor of the company) is a fixed value which is set in advance, and is a selected value or an input value with a size of a person as $H_A$, for example, in a case where there is the person around the sound position A when the designated position A' illustrated in FIG. 5B is designated with the finger FG of the user. Alternatively, in a case where the directivity control apparatus 3 determines that there is a person (for example, an adult or a child) at the designated position A' when the designated position A' is designated with the finger FG of the user, a default value (for example, 1.5 m or 0.8 m) may be used.

In the following description of the present calculation method, the designated position A' designated with the finger FG of the user is different from a position of the central point O' (refer to FIG. 5B).

Hereinafter, a detailed description will be made of a method (the present calculation method) in which the directive direction calculation section 34 calculates a coordinate $(\theta_{MAh}, \theta_{MAv})$ indicating a directive direction which is directed toward the sound position A from the installation position M of the omnidirectional microphone array apparatus 2. In the present calculation method, a reference line in a direction of 0 degrees of each horizontal angle of the camera apparatus 11 and the omnidirectional microphone array apparatus 2 is in a direction of a straight line which connects the camera apparatus 11 and the omnidirectional microphone array apparatus 2 to each other, for example, in the horizontal direction plan view illustrated in FIG. 12B.

The directive direction calculation section 34 calculates a horizontal component distance $L_{COh}$ of the distance $L_{CO}$ from the camera apparatus 11 to the reference point O according to Equation (3) by using the distance $L_{CO}$ and the depression angle $\theta_{CO}$ from the camera apparatus 11 to the reference point O.

[Equation 3]

$$L_{COh} = L_{CO} \times \cos \theta_{CO} \quad (3)$$

The directive direction calculation section 34 calculates a horizontal component distance $L_{MOh}$ of the distance $L_{MO}$ from the omnidirectional microphone array apparatus 2 to the reference point O according to Equation (4) by using the distance $L_{MO}$ and the depression angle $\theta_{MO}$ from the omnidirectional microphone array apparatus 2 to the reference point O.

[Equation 4]

$$L_{MOh} = L_{MO} \times \cos \theta_{MO} \quad (4)$$

The directive direction calculation section 34 calculates a cosine value $\cos \theta_{COh}$ for a horizontal angle $\theta_{COh}$ of the depression angle $\theta_{CO}$ from the camera apparatus 11 to the reference point O according to Equation (5) by using the cosine theorem for the triangle COM illustrated in FIG. 12B on the basis of the respective calculation results of Equations (3) and (4).

[Equation 5]

$$\cos \theta_{COh} = \frac{L_{COh}^2 + L_{CMh}^2 - L_{MOh}^2}{2 L_{COh} \times L_{CMh}} \quad (5)$$

The directive direction calculation section 34 calculates a cosine value $\cos \theta_{MOh}$ for a horizontal angle $\theta_{MOh}$ of the depression angle $\theta_{MO}$ from the omnidirectional microphone array apparatus 2 to the reference point O according to Equation (6) by using the cosine theorem for triangle COM illustrated in FIG. 12B on the basis of the respective calculation results of Equations (3) and (4).

[Equation 6]

$$\cos \theta_{MOh} = \frac{L_{MOh}^2 + L_{CMh}^2 - L_{COh}^2}{2 L_{MOh} \times L_{CMh}} \quad (6)$$

The directive direction calculation section 34 calculates a vertical component distance $L_{COv}$ of the distance $L_{CO}$ from the camera apparatus 11 to the reference point O according to Equation (7) by using the respective heights $H_C$ and $H_O$ of the camera apparatus 11 and the reference point O from a horizontal surface (for example, a surface of a floor of the company) and the respective calculation results of Equations (3) and (5).

[Equation 7]

$$L_{COv} = \sqrt{(L_{COh} \times \cos \theta_{COh})^2 + (H_C - H_O)^2} \quad (7)$$

The directive direction calculation section 34 calculates a vertical component distance $L_{MOv}$ of the distance $L_{MO}$ from the omnidirectional microphone array apparatus 2 to the reference point O according to Equation (8) by using the respective heights $H_M$ and $H_O$ of the omnidirectional microphone array apparatus 2 and the reference point O from a horizontal surface (for example, a surface of a floor of the company) and the respective calculation results of Equations (4) and (6).

[Equation 8]

$$L_{MOv} = \sqrt{(L_{MOh} \times \cos \theta_{MOh})^2 + (H_M - H_O)^2} \quad (8)$$

The directive direction calculation section 34 calculates a vertical component distance $L_{CMv}$ $(=L_{CM})$ of the distance $L_{CM}$ from the camera apparatus 11 to omnidirectional microphone array apparatus 2 according to Equation (9) by using the respective heights $H_C$ and $H_M$ of the camera apparatus 11 and the omnidirectional microphone array apparatus 2 from a horizontal surface (for example, a surface of a floor of the company) and the horizontal component distance $L_{CMh}$ of a distance $L_{CM}$ from the camera apparatus 11 to the omnidirectional microphone array apparatus 2.

[Equation 9]

$$L_{CMv} = L_{CM} = \sqrt{L_{CMh}^2 + (H_M - H_C)^2} \quad (9)$$

The directive direction calculation section 34 calculates a cosine value $\cos \theta_{COv}$ for a vertical angle $\theta_{COv}$ of the depression angle $\theta_{CO}$ from the camera apparatus 11 to the reference point O according to Equation (10) by using the cosine theorem for the triangle COM illustrated in FIG. 12C on the basis of the respective calculation results of Equations (7) to (9).

[Equation 10]

$$\cos\theta_{COv} = \frac{L_{COv}^2 + L_{CMv}^2 - L_{MOv}^2}{2L_{COv} \times L_{CMv}} \quad (10)$$

The directive direction calculation section 34 calculates a sine value sin θ_δ of an angle θ_δ between a direction which directs toward the omnidirectional microphone array apparatus 2 from the camera apparatus 11 illustrated in FIG. 12C and a horizontal surface (for example, a ceiling surface of a floor of the company) according to Equation (11) by using the calculation result of Equation (9) and the respective heights $H_C$ and $H_M$ of the camera apparatus 11 and the omnidirectional microphone array apparatus 2 from a horizontal surface (for example, a surface of a floor of the company).

[Equation 11]

$$\sin\theta_s = \frac{H_M - H_C}{L_{CMv}} \quad (11)$$

Next, the directive direction calculation section 34 calculates a distance $L_{CA}$ from the camera apparatus 11 to the sound position A according to Equation (12) by using the respective calculation results of Equations (10) and (11), the vertical angle $\theta_{CAv}$ from the camera apparatus 11 to the sound position A, the height $H_A$ of the sound position A from a horizontal surface (for example, a surface of a floor of the company), and the height $H_C$ of the camera apparatus 11 from the horizontal surface (for example, a surface of a floor of the company).

[Equation 12]

$$L_{CA} = \frac{H_C - H_A}{\sin(\theta_{COv} + \theta_{CAv} - \theta_\delta)} \quad (12)$$

The directive direction calculation section 34 calculates a horizontal component distance $L_{CAh}$ of the distance $L_{CA}$ from the camera apparatus 11 to the sound position A according to Equation (13) by using the respective calculation results of Equations (10) to (12) and the vertical angle $\theta_{CAv}$ from the camera apparatus 11 to the sound position A.

[Equation 13]

$$L_{CAh} = L_{CA} \times \cos(\theta_{COv} + \theta_{CAv} - \theta_\delta) = \frac{H_C - H_A}{\tan(\theta_{COv} + \theta_{CAv} - \theta_\delta)} \quad (13)$$

The directive direction calculation section 34 calculates a horizontal component distance $L_{MAh}$ from the omnidirectional microphone array apparatus 2 to the sound position A according to Equation (14) by using the cosine theorem for the triangle CAM illustrated in FIG. 12B on the basis of the respective calculation results of Equations (5) and (13), the horizontal angle $\theta_{CAh}$ from the camera apparatus 11 to the sound position A, and the horizontal component distance $L_{CMh}$ of the distance $L_{CM}$ from the camera apparatus 11 to the omnidirectional microphone array apparatus 2.

[Equation 14]

$$L_{MAh} = \sqrt{(L_{CAh}^2 + L_{CMh}^2 - 2L_{CAh} \times L_{CMh} \times \cos(\theta_{COh} + \theta_{CAh}))} \quad (14)$$

The directive direction calculation section 34 calculates a cosine value COS $\theta_{MAh}$ for a horizontal angle $\theta_{MAh}$ of the depression angle $\theta_{MA}$ from the omnidirectional microphone array apparatus 2 to the sound position A according to Equation (15) by using the cosine theorem for the triangle CAM illustrated in FIG. 12B on the basis of the respective calculation results of Equations (13) and (14) and the horizontal component distance $L_{CMh}$ from the camera apparatus 11 to the omnidirectional microphone array apparatus 2.

Accordingly, the directive direction calculation section 34 can calculate the horizontal angle $\theta_{MAh}$ of the directive direction which directs toward the sound position A from the omnidirectional microphone array apparatus 2 according to Equation (16).

[Equation 15]

$$\cos\theta_{MAh} = \frac{L_{MAh}^2 + L_{CMh}^2 - L_{CAh}^2}{2L_{MAh} \times L_{CMh}} \quad (15)$$

[Equation 16]

$$\theta_{MAh} = \arccos\left(\frac{L_{MAh}^2 + L_{CMh}^2 - L_{CAh}^2}{2L_{MAh} \times L_{CMh}}\right) \quad (16)$$

In addition, the directive direction calculation section 34 calculates a tangent value tan $\theta_{MAv}$ of the vertical angle $\theta_{MAv}$ of the directive direction which directs toward the sound position A from the omnidirectional microphone array apparatus 2 according to Equation (17) by using a tangent for the triangle MAP illustrated in FIG. 14C on the basis of the calculation result of Equation (14), the height $H_M$ of the omnidirectional microphone array apparatus 2 from a horizontal surface (for example, a surface of a floor of the company) and the height $H_A$ of the sound position A from the horizontal surface (for example, a surface of a floor of the company).

Accordingly, the directive direction calculation section 34 can calculate the vertical angle $\theta_{MAv}$ of the directive direction which directs toward the sound position A from the omnidirectional microphone array apparatus 2 according to Equation (18).

[Equation 17]

$$\tan\theta_{MAv} = \frac{H_M - H_A}{L_{MAh}} \quad (17)$$

[Equation 18]

$$\theta_{MAv} = \arctan\left(\frac{H_M - H_A}{L_{MAh}}\right) \quad (18)$$

As mentioned above, in the directivity control system 10 of the present embodiment, the directive direction calculation section 34 of the directivity control apparatus 3 calculates a directive direction which directs toward the sound position A corresponding to the designated position A' from the omnidirectional microphone array apparatus 2 when the user designates any designated position A' in image data displayed on the display device 36. The output control section 35 of the directivity control apparatus 3 forms a directivity in sounds collected by the omnidirectional microphone array apparatus 2 in the calculated directive direction. In addition, in a case where it is determined that the sound position A is included in the preset privacy protection region PRA, the output control section 35 controls output of sounds collected by the omnidirectional microphone array apparatus 2 or sounds which are collected by the omnidirectional microphone array apparatus 2 and whose directivity is formed, or suspends collection of sound in the omnidirectional microphone array apparatus 2.

Accordingly, in the directivity control system 10, the directivity control apparatus 3 can form the directivity in the directive direction which directs toward the sound position A from the omnidirectional microphone array apparatus 2. In addition, in a case where it is determined that the sound position A designated through a user's input operation is included in the predetermined privacy protection region PRA, the directivity control apparatus 3 can control (for example, a minimization process or a voice change process) outputting of sounds collected by the omnidirectional microphone array apparatus 2 or sounds which are collected by the omnidirectional microphone array apparatus 2 and whose directivity is formed, or can suspend collecting of sounds in the omnidirectional microphone array apparatus 2.

Therefore, for example, when people who are subjects have conversations using highly confidential information, in a case where it is determined that a spatial position (sound position A) where the people have conversations is included in a privacy protection region when viewed from the omnidirectional microphone array apparatus 2 in image data of the subjects imaged by the camera apparatus 11, the directivity control apparatus 3 can minimize output of sounds of the conversations using the highly confidential information, execute voice change of the sounds, or suspend collection of the sounds. Thus, for example, it is possible to prevent the information from leaking to a third person other than the people involved, to make it difficult to specify who had conversations, or to prevent recording of conversation itself which may serve as any evidence.

(Second Embodiment)

In a second embodiment, in the same manner as in the first embodiment, a directivity control apparatus 3A controls output of sounds collected by the omnidirectional microphone array apparatus 2 or sounds which are collected by the omnidirectional microphone array apparatus 2 and whose directivity is formed, or changes states of suspending collection of sounds in the omnidirectional microphone array apparatus 2, on the basis of a determination result of whether or not a sound position A is included in the privacy protection region PRA or a determination result of whether or not a sound collection time or a recording time is included in the privacy protection time PRT. In addition, when a privacy protection signal transmitted from a privacy protection signal transmitter 7 described later or the camera apparatus 11 is received, the directivity control apparatus 3A controls output of sounds collected by the omnidirectional microphone array apparatus 2 or sounds which are collected by the omnidirectional microphone array apparatus 2 and whose directivity is formed, or suspends collection of sounds in the omnidirectional microphone array apparatus 2, in preference to a determination result of whether or not a sound position A is included in the privacy protection region PRA and a determination result of whether or not a sound collection time or a recording time is included in the privacy protection time PRT.

Figure 15:
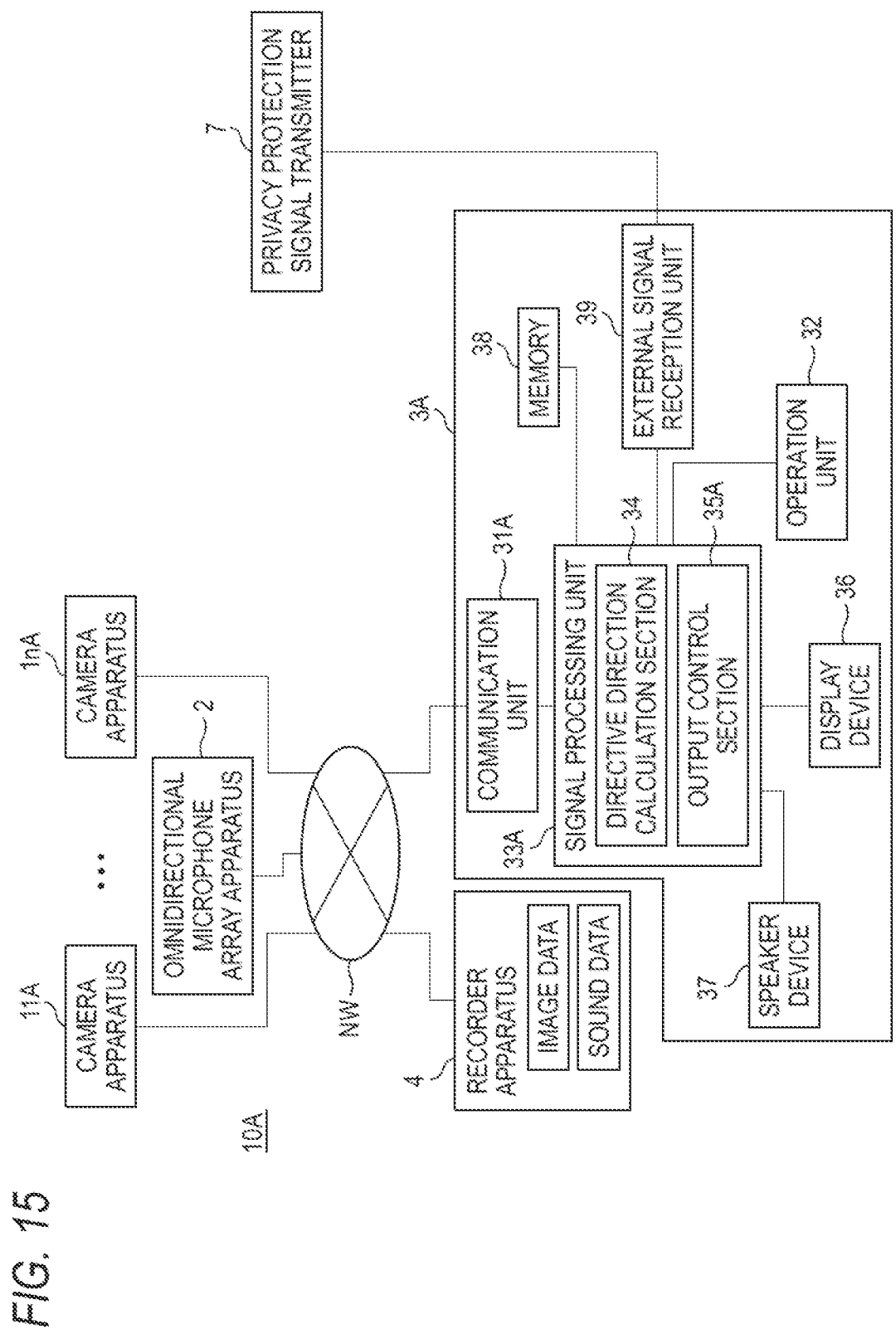
FIG. 15 is a block diagram illustrating a configuration of a directivity control system of a second embodiment.

FIG. 15 is a block diagram illustrating a configuration of a directivity control system 10A of the second embodiment. The directivity control system 10A illustrated in FIG. 15 includes at least one camera apparatuses 11A to 1nA, an omnidirectional microphone array apparatus 2, a directivity control apparatus 3A, a recorder apparatus 4, and a privacy protection signal transmitter 7.

The directivity control apparatus 3A includes a communication unit 31A, an operation unit 32, a signal processing unit 33A, a display device 36, a speaker device 37, a memory 38, and an external signal reception unit 39. The same reference numerals are given to the constituent elements forming the directivity control system 10A illustrated in FIG. 15 which perform the same operations as the operations of the constituent elements forming the directivity control system 10 illustrated in FIG. 1, and description thereof will be omitted or made briefly.

Next, a summary of an operation of the present embodiment will be described with reference to FIGS. 15, 16A, 16B and 16C.

FIG. 16A is a diagram illustrating a state in which a privacy protection signal PRS1 or PRS2 is transmitted through an operation performed by a person in an officer's conference room inside a sound collection space K where the directivity control system 10A of the second embodiment is installed. FIG. 16B is a diagram illustrating a state of controlling output of sounds collected by the omnidirectional microphone array apparatus 2 or sounds which are collected by the omnidirectional microphone array apparatus 2 and whose directivity is formed, or of suspending collection of sounds in the omnidirectional microphone array apparatus 2, due to the privacy protection signal PRS1 which is transmitted from the privacy protection signal transmitter 7 through the operation performed by the person in the officer's conference room illustrated in FIG. 16A. FIG. 16C is a diagram illustrating a state of controlling output of sounds collected by the omnidirectional microphone array apparatus 2 or sounds which are collected by the omnidirectional microphone array apparatus 2 and whose directivity is formed, or of suspending collection of sounds in the omnidirectional microphone array apparatus 2, due to the privacy protection signal PRS2 which is transmitted from the camera apparatus 11A through the operation performed by the person in the officer's conference room illustrated in FIG. 16A.

The privacy protection signal transmitter 7 is, for example, a portable transmitter which is used by a person who is a subject and does not desire his/her own conversation sounds in the officer's conference room illustrated in FIG. 16A to be heard by a third person other than the people involved. The privacy protection signal transmitter 7 transmits the privacy protection signal PRS1 in response to the user's operation. The privacy protection signal PRS1 is received by the external signal reception unit 39 of the directivity control apparatus 3A.

In both cases where, for example, the sound position A is included or not included in the privacy protection region PRA described in the first embodiment, the privacy protection signal PRS1 is a signal transmitted from the privacy protection signal transmitter 7 in order to control output of conversation sounds of a person who is a subject of the camera apparatus 11A, or to suspend collecting of sounds in the omnidirectional microphone array apparatus 2.

When the privacy protection signal PRS1 transmitted from the privacy protection signal transmitter 7 is received by the external signal reception unit 39 of the directivity control apparatus 3A, an output control section 35A of the directivity control apparatus 3A controls output of sounds collected by the omnidirectional microphone array apparatus 2 or sounds which are collected by the omnidirectional microphone array apparatus 2 and whose directivity is formed, or suspends collection of sounds in the omnidirectional microphone array apparatus 2. In addition, the output control section 35A of the directivity control apparatus 3A notifies a user of a message indicating that the privacy protection signal PRS1 has been received by displaying the message or making the message blink on the display device 36, or outputting a predetermined alarm sound (refer to FIG. 16B).

In addition, in the present embodiment, the camera apparatuses 11A to 1nA transmit, for example, the privacy protection signal PRS2 when a person, who is a subject and does not desire his/her own conversation sounds in the officer's conference room illustrated in FIG. 16A to be heard by a third person other than the people involved, performs an operation using a remote controller RM for remote control of the camera apparatuses. The privacy protection signal PRS2 is received by the communication unit 31A of the directivity control apparatus 3A. Hereinafter, for convenience of description, the description will be made assuming that, among the camera apparatuses 11A to 1nA, for example, the camera apparatus 11A transmits the privacy protection signal PRS2.

In both cases where, for example, the sound position A is included or not included in the privacy protection region PRA described in the first embodiment, the privacy protection signal PRS2 is a signal transmitted from, for example, the camera apparatus 11A, in response to an operation of the remote controller RM for starting the privacy protection function which is an existing function of the camera apparatus 11A, in order to control outputting of conversation sounds of a person who is a subject of the camera apparatus 11A, or to suspend collecting of sounds in the omnidirectional microphone array apparatus 2.

When the privacy protection signal PRS2 transmitted from the camera apparatus 11A is received by the communication unit 31A of the directivity control apparatus 3A, the output control section 35A of the directivity control apparatus 3A controls sounds collected by the omnidirectional microphone array apparatus 2 or sounds which are collected by the omnidirectional microphone array apparatus 2 and whose directivity is formed, or suspends collection of sounds in the omnidirectional microphone array apparatus 2. In addition, the output control section 35A of the directivity control apparatus 3A notifies a user of a message indicating that the privacy protection signal PRS2 transmitted from the camera apparatus 11A has been received by displaying the message or making the message blink on the display device 36, or outputting a predetermined alarm sound (refer to FIG. 16C).

Figure 17:
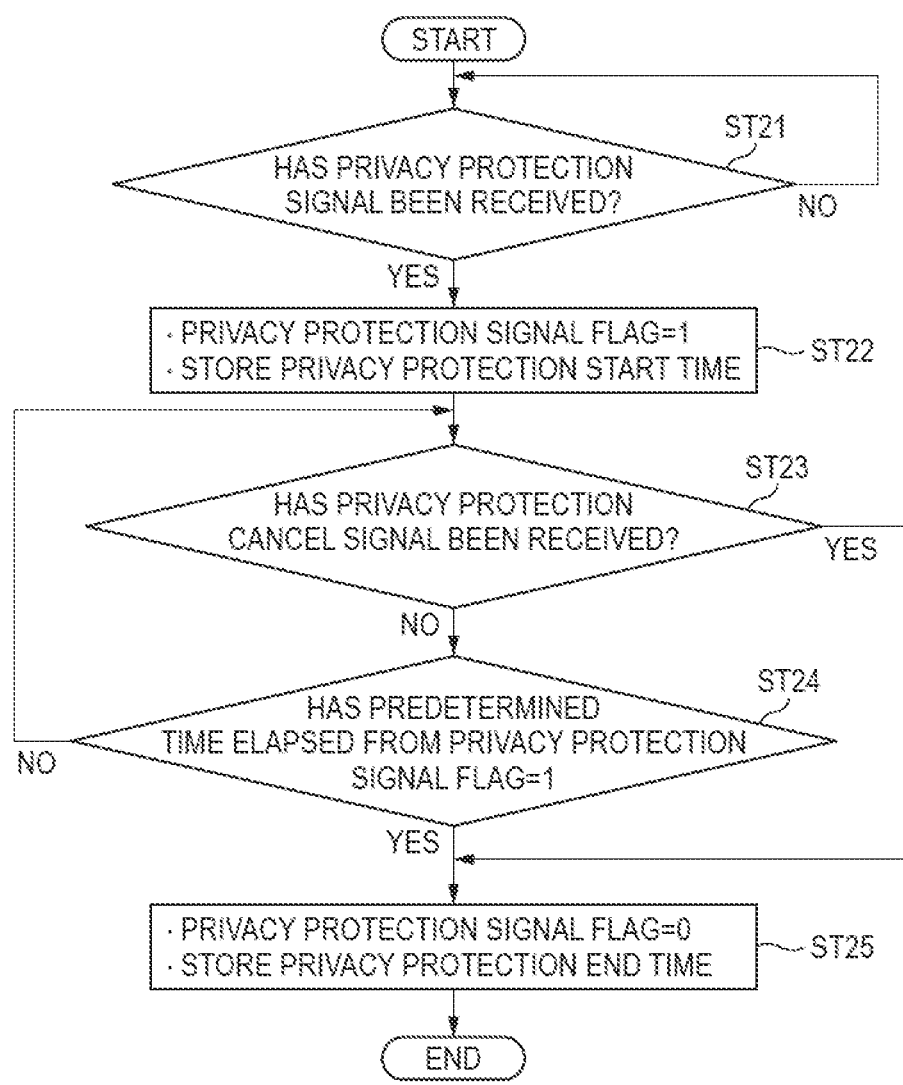
FIG. 17 is a flowchart illustrating an operation procedure in a case where a privacy protection signal is received in the directivity control system of the second embodiment.

Next, with reference to FIG. 17, a description will be made of an operation procedure after the privacy protection signal of the directivity control system 10A of the present embodiment is received. FIG. 17 is a flowchart illustrating an operation procedure in a case where a privacy protection signal PRS1 or PRS2 of the directivity control system 10A of the second embodiment is received.

In FIG. 17, if the privacy protection signal PRS1 transmitted from the privacy protection signal transmitter 7 is received by the external signal reception unit 39 of the directivity control apparatus 3A (ST21, YES), or if the privacy protection signal PRS2 transmitted from the camera apparatus 11A is received by the communication unit 31A of the directivity control apparatus 3A (ST21, YES), an operation of the directivity control apparatus 3A proceeds to step ST22.

In addition, for convenience of description of FIG. 17, the description will be made that the external signal reception unit 39 of the directivity control apparatus 3A receives the privacy protection signal PRS1 transmitted from the privacy protection signal transmitter 7, but this is also the same for a case where the communication unit 31A of the directivity control apparatus 3A receives the privacy protection signal PRS2 transmitted from the camera apparatus 11A.

In other words, the output control section 35A of the directivity control apparatus 3A sets a privacy protection signal flag indicating that the privacy protection signal PRS1 has been received to 1, and stores the time when the privacy protection signal PRS1 is received, that is, the time of starting privacy protection (privacy protection start time) in the memory 38 (ST22). The output control section 35A stores sound data of sounds collected by the omnidirectional microphone array apparatus 2, the privacy protection signal flag (=1), and the privacy protection start time in the memory 38 or the recorder apparatus 4 in correlation with each other.

When the privacy protection signal is received, the output control section 35A controls output of sounds collected by the omnidirectional microphone array apparatus 2 or sounds which are collected by the omnidirectional microphone array apparatus 2 and whose directivity is formed, or starts temporary suspension of sound collection in the omnidirectional microphone array apparatus 2 (ST22).

When a privacy protection cancel signal for cancelling the privacy protection from the privacy protection signal transmitter 7 is received by the external signal reception unit 39 of the directivity control apparatus 3A (ST23, YES), an operation of the directivity control apparatus 3A proceeds to step ST25. In addition, even when a privacy protection cancel signal for cancelling the privacy protection from the privacy protection signal transmitter 7 is not received by the external signal reception unit 39 of the directivity control apparatus 3A (ST23, NO), in a case where a predetermined time has elapsed after the privacy protection signal flag was set to 1 (ST24, YES), an operation of the directivity control apparatus 3A proceeds to step ST25.

In other words, in a case where the privacy protection cancel signal has been received or a predetermined time has elapsed after the privacy protection signal flag was set to 1, the output control section 35A sets the privacy protection signal flag to 0, and stores the time when the privacy protection cancel signal is received, that is, the time of cancelling (ending) the privacy protection (privacy protection end time) in the memory 38 (ST25). The output control section 35A stores sound data of sounds collected by the omnidirectional microphone array apparatus 2, the privacy protection signal flag (=0), and the privacy protection end time in the memory 38 or the recorder apparatus 4 in correlation with each other.

In a case where the privacy protection cancel signal is received, or a predetermined time has elapsed after the privacy protection signal flag was set to 1, the output control section 35A finishes output control of sounds collected by the omnidirectional microphone array apparatus 2 or sounds which are collected by the omnidirectional microphone array apparatus 2 and whose directivity is formed, or restarts temporary sound collection in the omnidirectional microphone array apparatus 2 (ST25).

Next, a description will be made of an operation procedure (refer to FIGS. 18, 20, and 22) while the directivity control system 10A of the present embodiment collects sounds in real time, and an operation procedure (refer to FIGS. 19, 21, and 23), for example, in a case where an audio file recorded in the recorder apparatus 4 is reproduced after sounds are collected, with reference to the respective drawings.

Figure 18:
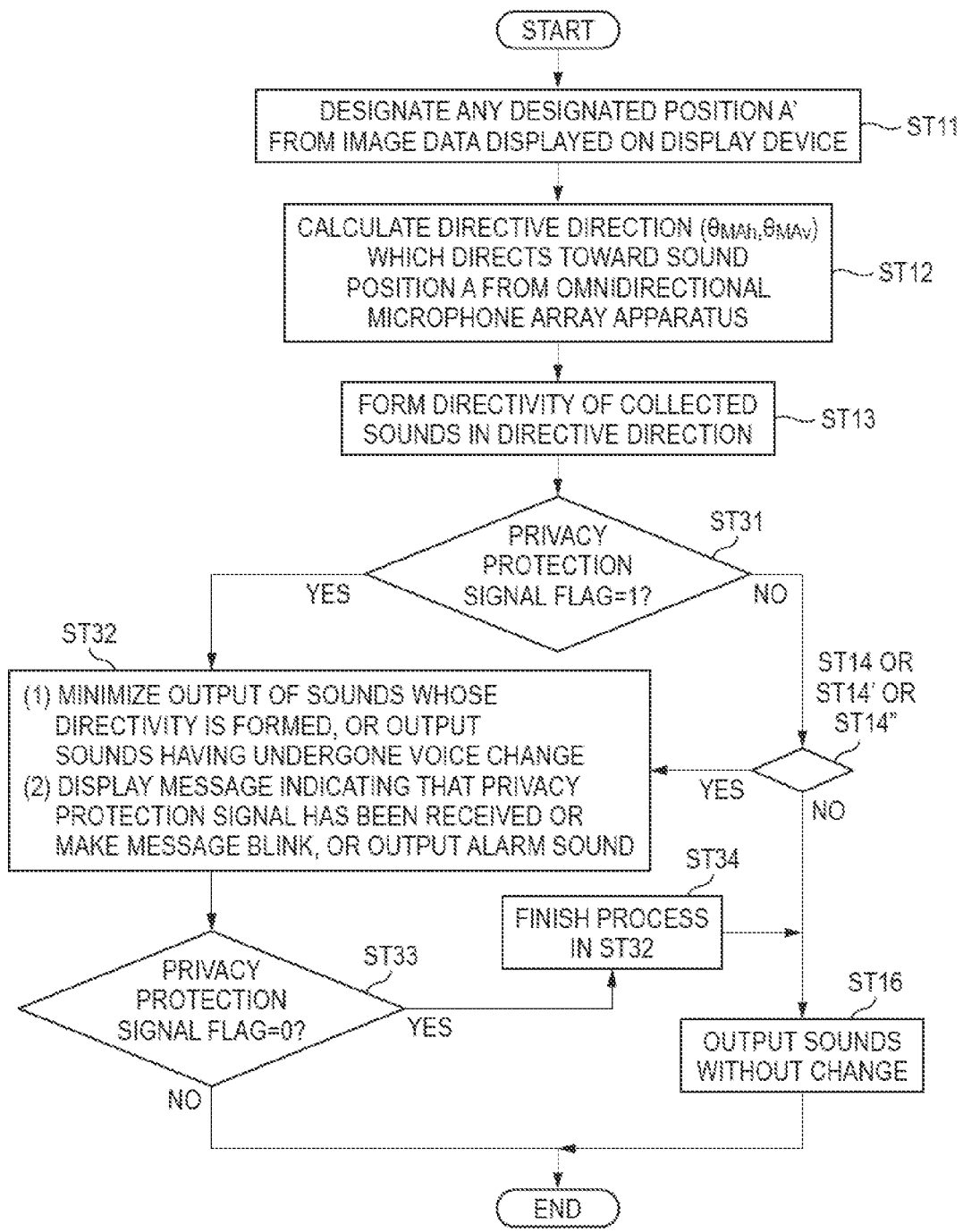
FIG. 18 is a flowchart illustrating an operation procedure of changing sound output control depending on whether or not a privacy protection signal is received while the directivity control system of the second embodiment collects sounds in real time.
Figure 19:
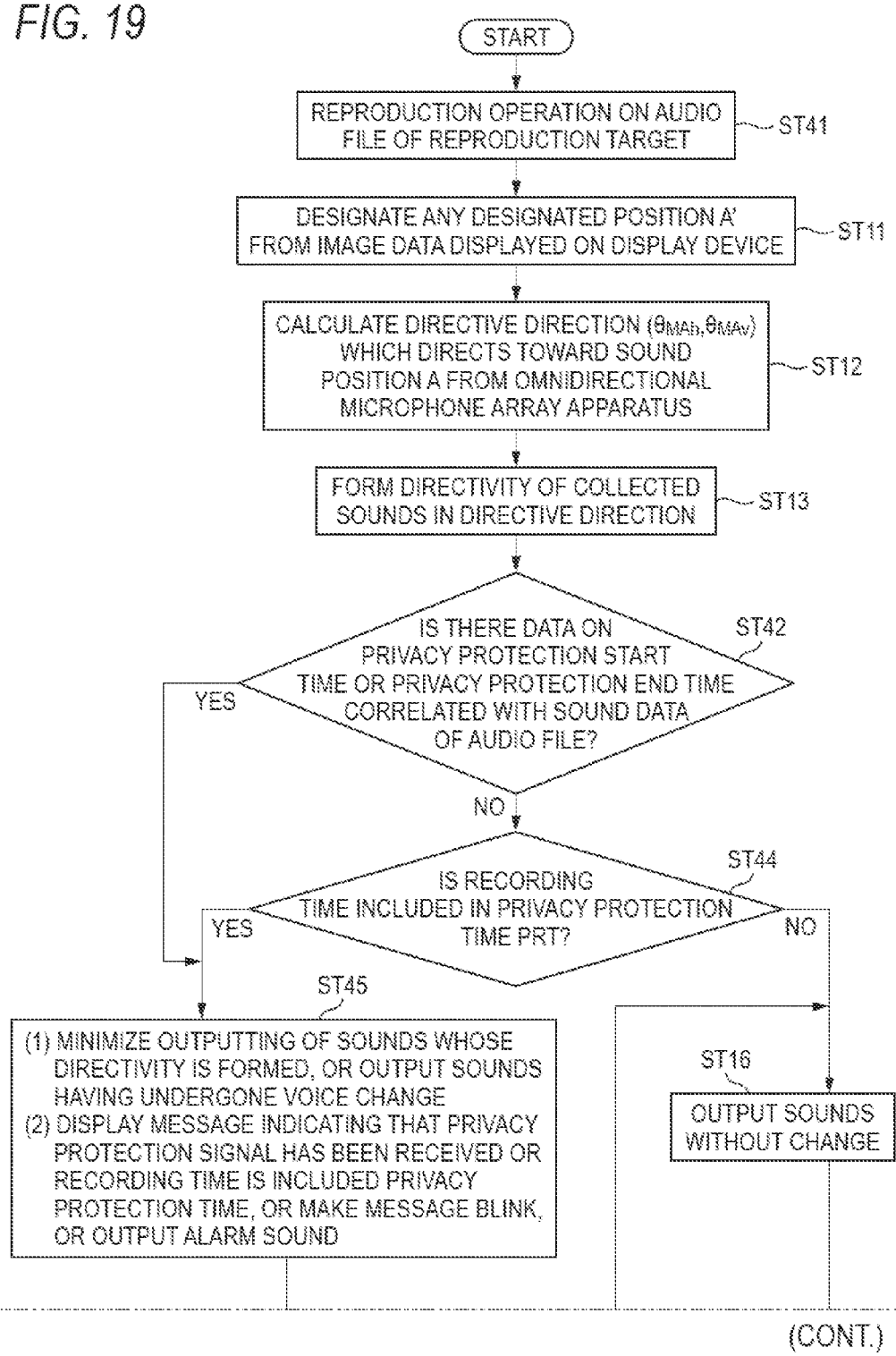
FIG. 19 is a flowchart illustrating an operation procedure of changing sound output control depending on whether or not a privacy protection signal is received in a case where the directivity control system of the second embodiment reproduces sound data of a recorded audio file.

FIG. 18 is a flowchart illustrating an operation procedure of changing sound output control depending on whether or not the privacy protection signal PRS1 or PRS2 is received while the directivity control system 10A of the second embodiment collects sounds in real time. FIG. 19 is a flowchart illustrating an operation procedure of changing sound output control depending on whether or not the privacy protection signal PRS1 or PRS2 is received in a case where the directivity control system 10A of the second embodiment reproduces sound data of a recorded audio file. In addition, in FIGS. 18 and 19, steps having the same operation content as the operation content of the steps illustrated in FIG. 6 are given the same step numbers, and description thereof will be omitted or made briefly, and different content will be described.

In FIG. 18, the output control section 35A forms a directivity in the directive direction $(\theta_{MAh}, \theta_{MAv})$ by using sound data of sounds collected by the omnidirectional microphone array apparatus 2 in step ST13, and then determines whether or not the privacy protection signal flag correlated with sound data of sounds which are collected in real time is set to 1 by referring to the memory 38 or the recorder apparatus 4 (ST31). In other words, in step ST31, the output control section 35A determines whether or not the privacy protection signal PRS1 or PRS2 has been received in a case where the omnidirectional microphone array apparatus 2 collects sounds in real time.

If it is determined that the privacy protection signal flag is set to 1 (ST31, YES), the output control section 35A controls output of the sounds whose directivity is formed in the directive direction $(\theta_{MAh}, \theta_{MAv})$ in step ST13 (ST32). In addition, the output control section 35A explicitly notifies the user that the privacy protection signal PRS1 or PRS2 transmitted from the privacy protection signal transmitter 7 or the camera apparatus 11A has been received (ST32). The output control section 35A displays (refer to FIG. 16B or 16C) a message indicating that the privacy protection signal PRS1 or PRS2 has been received or makes the message blink on the display device 36, or outputs a predetermined alarm sound from the speaker device 37 (ST32).

On the other hand, if it is determined that the privacy protection signal flag is not set to 1 (ST31, NO), the output control section 35A determines whether or not any one of step ST14 illustrated in FIG. 6, step ST14' illustrated in FIG. 8, and step ST14" illustrated in FIG. 11 is satisfied. If any one thereof is satisfied, the output control section 35A performs a process in step ST32. In other words, even when the privacy protection signal is not received while the omnidirectional microphone array apparatus 2 collects sounds in real time, in a case where the sound position A is included in the privacy protection region PRA, or the sound collection time or the recording time is included in the privacy protection time PRT, the output control section 35A controls output of the sounds whose directivity is formed in the directive direction $(\theta_{MAh}, \theta_{MAv})$ in step ST13 in the same manner as in the first embodiment. However, if none of step ST14, step ST14', and step ST14" are satisfied, the output control section 35A outputs the sounds whose directivity is formed in the directive direction $(\theta_{MAh}, \theta_{MAv})$ in step ST13, from the speaker device 37 without change (ST16).

In addition, after step ST32, the output control section 35A determines whether or not the privacy protection signal flag correlated with sound data of sounds which are collected in real time is set to 0 (ST33). In other words, in step ST33, the output control section 35A determines whether or not a privacy protection cancel signal has been received, or whether or not a predetermined time has elapsed after the privacy protection signal PRS1 or PRS2 was received in a case where the omnidirectional microphone array apparatus 2 collects sounds in real time.

If it is determined that the privacy protection signal flag is set to 0 (ST33, YES), the output control section 35A finishes the process in step ST32 (ST34), and then outputs the sounds whose directivity is formed in the directive direction $(\theta_{MAh}, \theta_{MAv})$ in step ST13, from the speaker device 37 without change (ST16). On the other hand, it is determined that the privacy protection signal flag is not set to 0 (ST33, NO), the process in step ST32 is continuously performed. Due to the above-described steps, the operation of the directivity control system 10A illustrated in FIG. 18 is finished.

Next, in FIG. 19, when a reproduction operation as a user's input operation is performed on an audio file which is a reproduction target recorded in the recorder apparatus 4 (ST41), the processes in steps ST11, ST12 and ST13 illustrated in FIG. 6 are performed in this order.

Then, the output control section 35A of the directivity control apparatus 3A determines whether or not data on the privacy protection start time and the privacy protection end time is correlated with sound data of the audio file (ST42). In other words, in step ST42, the output control section 35A determines whether or not the privacy protection signal PRS1 or PRS2 is received while sounds of the audio file are collected by the omnidirectional microphone array apparatus 2.

If it is determined that the data on the privacy protection start time and the privacy protection end time is correlated with sound data of the audio file (ST42, YES), the output control section 35A preferentially performs the process in step ST45 (ST45). Process content of step ST45 will be described later.

On the other hand, if it is determined that the data on the privacy protection start time and the privacy protection end time are not correlated with sound data of the audio file (ST42, NO), the output control section 35A determines whether or not the recording time of the sound data of the audio file is included in the predetermined privacy protection time PRT in the same manner as in the first embodiment (ST44). If it is determined that the recording time of the sound data of the audio file is included in the predetermined privacy protection time PRT in the same manner as in the first embodiment (ST44, YES), the output control section 35A performs the process in step ST45. If it is determined that the recording time of the sound data of the audio file is not included in the predetermined privacy protection time PRT (ST44, NO), the output control section 35A outputs the sounds whose directivity is formed in the directive direction $(\theta_{MAh}, \theta_{MAv})$ in step ST13, from the speaker device 37 without change (ST16).

In step ST45, the output control section 35A controls output of the sounds whose directivity is formed in the directive direction $(\theta_{MAh}, \theta_{MAv})$ in step ST13, and explicitly notifies the user that the privacy protection signal PRS1 or PRS2 has been received, or that the recording time is included in the privacy protection time PRT (ST45). The output control section 35A displays (refer to FIG. 16B or 16C) a message indicating that the privacy protection signal PRS1 or PRS2 has been received or makes the message blink on the display device 36, or outputs a predetermined alarm sound from the speaker device 37 (ST45).

In addition, after step ST45, the output control section 35A determines whether or not the recording time is excluded in the privacy protection time PRT or whether or not the recording time is later than the privacy protection end time (ST46). In other words, in step ST46, the output control section 35A determines whether or not the predetermined privacy protection time PRT ends, whether or not the privacy protection cancel signal has been received, or whether or not a predetermined time has elapsed after the privacy protection signal PRS1 or PRS2 was received, during reproduction of the audio file.

If it is determined that the recording time is not included in the privacy protection time PRT or is later than the privacy protection end time (ST46, YES), the output control section 35A finishes the process in step ST45 (ST47), and then outputs the sounds whose directivity is formed in the directive direction ($\theta_{MAh}, \theta_{MAv}$) in step ST13, from the speaker device 37 without change (ST16). On the other hand, if it is determined that the recording time is included in the privacy protection time PRT or is not later than the privacy protection end time (ST46, NO), the process in step ST45 is continuously performed. Due to the above-described steps, the operation of the directivity control system 10A illustrated in FIG. 19 is finished.

Figure 20:
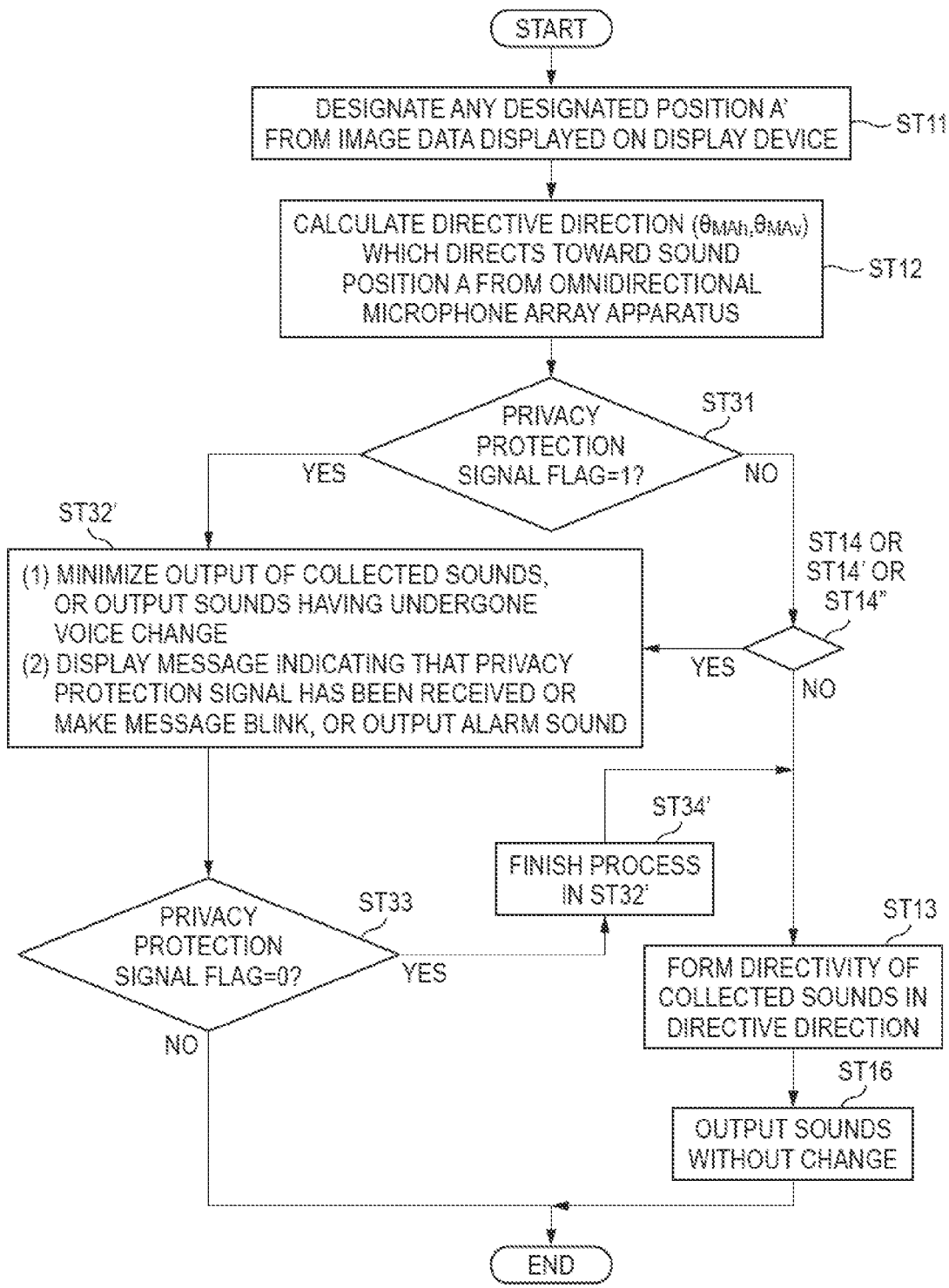
FIG. 20 is a flowchart illustrating another example of the operation procedure of changing sound output control depending on whether or not a privacy protection signal is received while the directivity control system of the second embodiment collects sounds in real time.

FIG. 20 is a flowchart illustrating another example of the operation procedure of changing sound output control depending on whether or not the privacy protection signal is received while the directivity control system of the second embodiment collects sounds in real time. In description of the flowchart illustrated in FIG. 20, content different from the description of the flowchart illustrated in FIG. 18 will be described, and description of the same content will be omitted or made briefly.

A main difference between the flowchart illustrated in FIG. 20 and the flowchart illustrated in FIG. 18 is an execution timing of the directivity forming process in step ST13. In other words, in FIG. 20, the directivity forming process in step ST13 is performed in a case where none of step ST14, step ST14', and step ST14" are satisfied.

Meanwhile, if it is determined that the privacy protection signal flag is set to 1 in step ST31 (ST31, YES), the output control section 35A controls output of sounds collected by the omnidirectional microphone array apparatus 2 in a state in which a directivity is not formed in the directive direction ($\theta_{MAh}, \theta_{MAv}$) (ST32'). In addition, the output control section 35A explicitly notifies the user that the privacy protection signal PRS1 or PRS2 transmitted from the privacy protection signal transmitter 7 or the camera apparatus 11A has been received (ST32). The output control section 35A displays a message indicating that the privacy protection signal PRS1 or PRS2 has been received or makes the message blink on the display device 36, or outputs a predetermined alarm sound from the speaker device 37 (ST32').

In addition, after step ST32', the output control section 35A determines whether or not the privacy protection signal flag correlated with sound data of sounds which are collected in real time is set to 0 (ST33). In other words, in step ST33, the output control section 35A determines whether or not a privacy protection cancel signal has been received, or whether or not a predetermined time has elapsed after the privacy protection signal PRS1 or PRS2 was received in a case where the omnidirectional microphone array apparatus 2 collects sounds in real time.

If it is determined that the privacy protection signal flag is set to 0 (ST33, YES), the output control section 35A finishes the process in step ST32' (ST34'), then forms a directivity in the directive direction ($\theta_{MAh}, \theta_{MAv}$) by using sound data of sounds collected by the omnidirectional microphone array apparatus 2 (ST13), and outputs the sounds whose directivity is formed from the speaker device 37 without change (ST16). Due to the above-described steps, the operation of the directivity control system 10A illustrated in FIG. 20 is finished.

FIG. 21 is a flowchart illustrating another example of the operation procedure of changing sound output control depending on whether or not a privacy protection signal is received in a case where the directivity control system of the second embodiment reproduces sound data of a recorded audio file. In description of the flowchart illustrated in FIG. 21, content different from the description of the flowchart illustrated in FIG. 19 will be described, and description of the same content will be omitted or made briefly.

A main difference between the flowchart illustrated in FIG. 21 and the flowchart illustrated in FIG. 19 is an execution timing of each process in steps ST11 to ST13. In other words, in FIG. 21, each process in steps ST11 to ST13 is performed in a case where it is determined in step ST44 that the recording time of the sound data of the audio file is not included in the privacy protection time PRT.

Meanwhile, if it is determined that the data on the privacy protection start time and the privacy protection end time is correlated with sound data of the audio file (ST42, YES), the output control section 35A preferentially performs a process in step ST45' (ST45'). Process content of step ST45' will be described later.

On the other hand, if it is determined that the data on the privacy protection start time and the privacy protection end time is not correlated with sound data of the audio file (ST42, NO), the output control section 35A determines whether or not the recording time of the sound data of the audio file is included in the predetermined privacy protection time PRT in the same manner as in the first embodiment (ST44). If it is determined that the recording time of the sound data of the audio file is included in the predetermined privacy protection time PRT (ST44, YES), the output control section 35A performs the process in step ST45'. If it is determined that the recording time of the sound data of the audio file is not included in the predetermined privacy protection time PRT (ST44, NO), the output control section 35A receives designation of any designated position A' in the image data displayed on the display device 36 via the operation unit 32 (ST11). Description of each process in steps ST11 to ST13 will not be repeated.

In step ST45', the output control section 35A controls output of sounds collected by the omnidirectional microphone array apparatus 2 in a state in which a directivity is not formed in the directive direction ($\theta_{MAh}, \theta_{MAv}$), and explicitly notifies the user that the privacy protection signal PRS1 or PRS2 has been received, or that the recording time is included in the privacy protection time PRT (ST45'). The output control section 35A displays a message indicating that the privacy protection signal PRS1 or PRS2 has been received or makes the message blink on the display device 36, or outputs a predetermined alarm sound from the speaker device 37 (ST45').

In addition, after step ST45', the output control section 35A determines whether or not the recording time is excluded in the privacy protection time PRT or whether or not the recording time is later than the privacy protection end time (ST46). In other words, in step ST46, the output control section 35A determines whether or not the predetermined privacy protection time PRT ends, whether or not the privacy protection cancel signal has been received, or whether or not a predetermined time has elapsed after the privacy protection signal PRS1 or PRS2 was received, during reproduction of the audio file.

If it is determined that the recording time is not included in the privacy protection time PRT or is later than the privacy protection end time (ST46, YES), the output control section 35A finishes the process in step ST45' (ST47'), and then performs the processes in step ST11 and subsequent steps. On the other hand, if it is determined that the recording time is included in the privacy protection time PRT or is not later than the privacy protection end time (ST46, NO), the process in step ST45' is continuously performed. Due to the above-described steps, the operation of the directivity control system 10A illustrated in FIG. 21 is finished.

Figure 22:
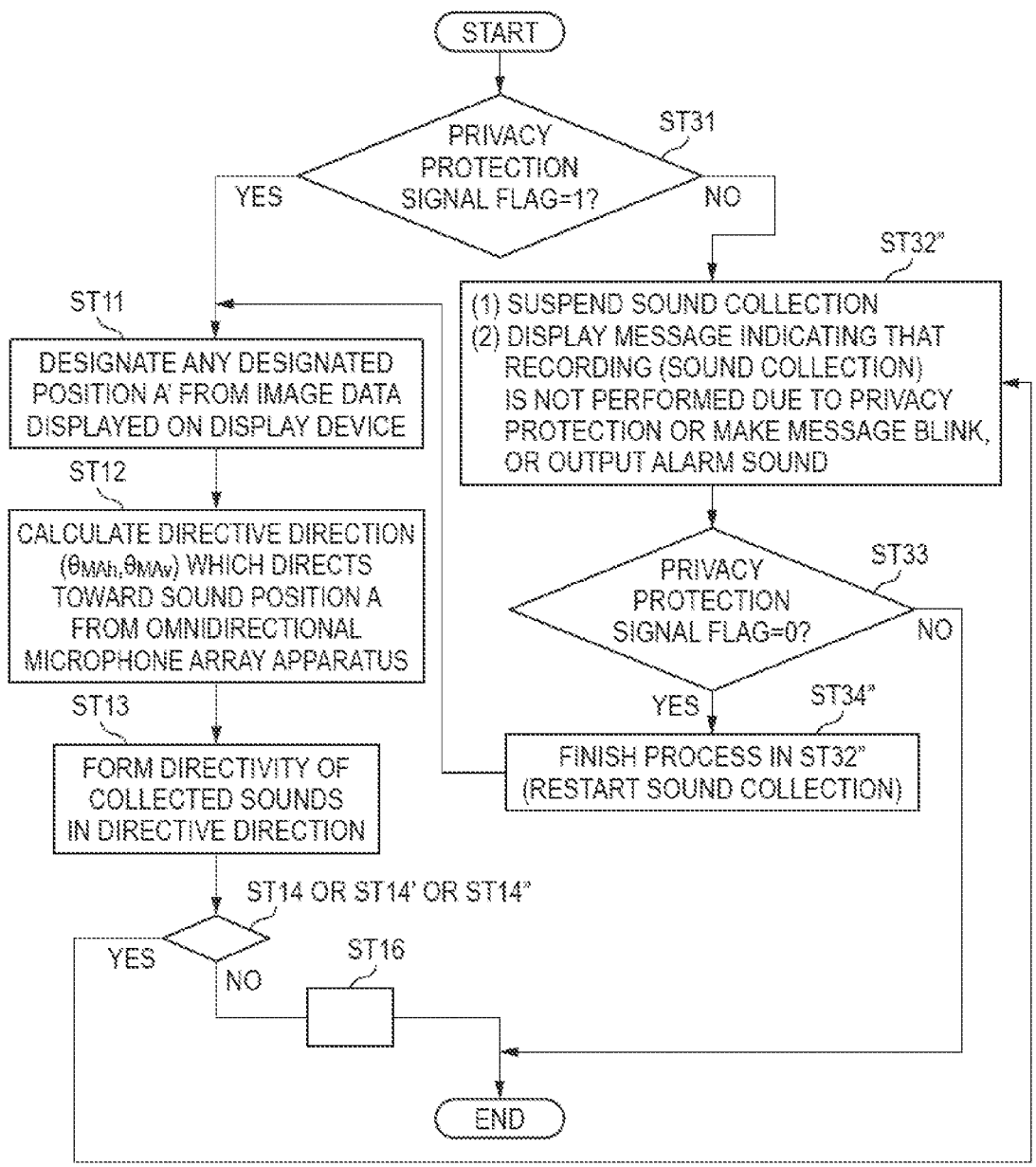
FIG. 22 is a flowchart illustrating an operation procedure of changing a sound collection process between being continued and being suspended depending on whether or not a privacy protection signal is received while the directivity control system of the second embodiment collects sounds in real time.

FIG. 22 is a flowchart illustrating an operation procedure of changing a sound collection process between being continued and being suspended depending on whether or not a privacy protection signal is received while the directivity control system of the second embodiment collects sounds in real time. In description of the flowchart illustrated in FIG. 22, content different from the description of the flowchart illustrated in FIG. 18 will be described, and description of the same content will be omitted or made briefly.

A main difference between the flowchart illustrated in FIG. 22 and the flowchart illustrated in FIG. 18 is an execution timing of each process in steps ST11 to ST13. In other words, in FIG. 22, each process in steps ST11 to ST13 is performed in a case where it is determined in step ST31 that the privacy protection signal flag is not set to 1.

Meanwhile, if it is determined that the privacy protection signal flag is set to 1 (ST31, YES), the output control section 35A temporarily suspends collection of sounds in the omnidirectional microphone array apparatus 2 (ST32"). In addition, the output control section 35A explicitly notifies the user that the privacy protection signal PRS1 or PRS2 transmitted from the privacy protection signal transmitter 7 or the camera apparatus 11A has been received (ST32"). The output control section 35A displays a message indicating that the privacy protection signal PRS1 or PRS2 has been received or makes the message blink on the display device 36, or outputs a predetermined alarm sound from the speaker device 37 (ST32").

In addition, after step ST32", the output control section 35A determines whether or not the privacy protection signal flag correlated with sound data of sounds which are collected in real time is set to 0 (ST33). In other words, in step ST33, the output control section 35A determines whether or not a privacy protection cancel signal has been received, or whether or not a predetermined time has elapsed after the privacy protection signal PRS1 or PRS2 was received in a case where the omnidirectional microphone array apparatus 2 collects sounds in real time.

If it is determined that the privacy protection signal flag is set to 0 (ST33, YES), the output control section 35A finishes the process in step ST32", and restarts collection of sounds in the omnidirectional microphone array apparatus 2 (ST34"). Next, the output control section 35A receives designation of any designated position A' in the image data displayed on the display device 36 via the operation unit 32 (ST11). Description of each process in steps ST11 to ST13 will not be repeated. In addition, after step ST13, it is determined whether or not any one of step ST14, step ST14', and step ST14" illustrated in FIG. 18 is satisfied, and if any one is satisfied, the process in step ST32" is performed. Due to the above-described steps, the operation of the directivity control system 10A illustrated in FIG. 22 is finished.

Figure 23:
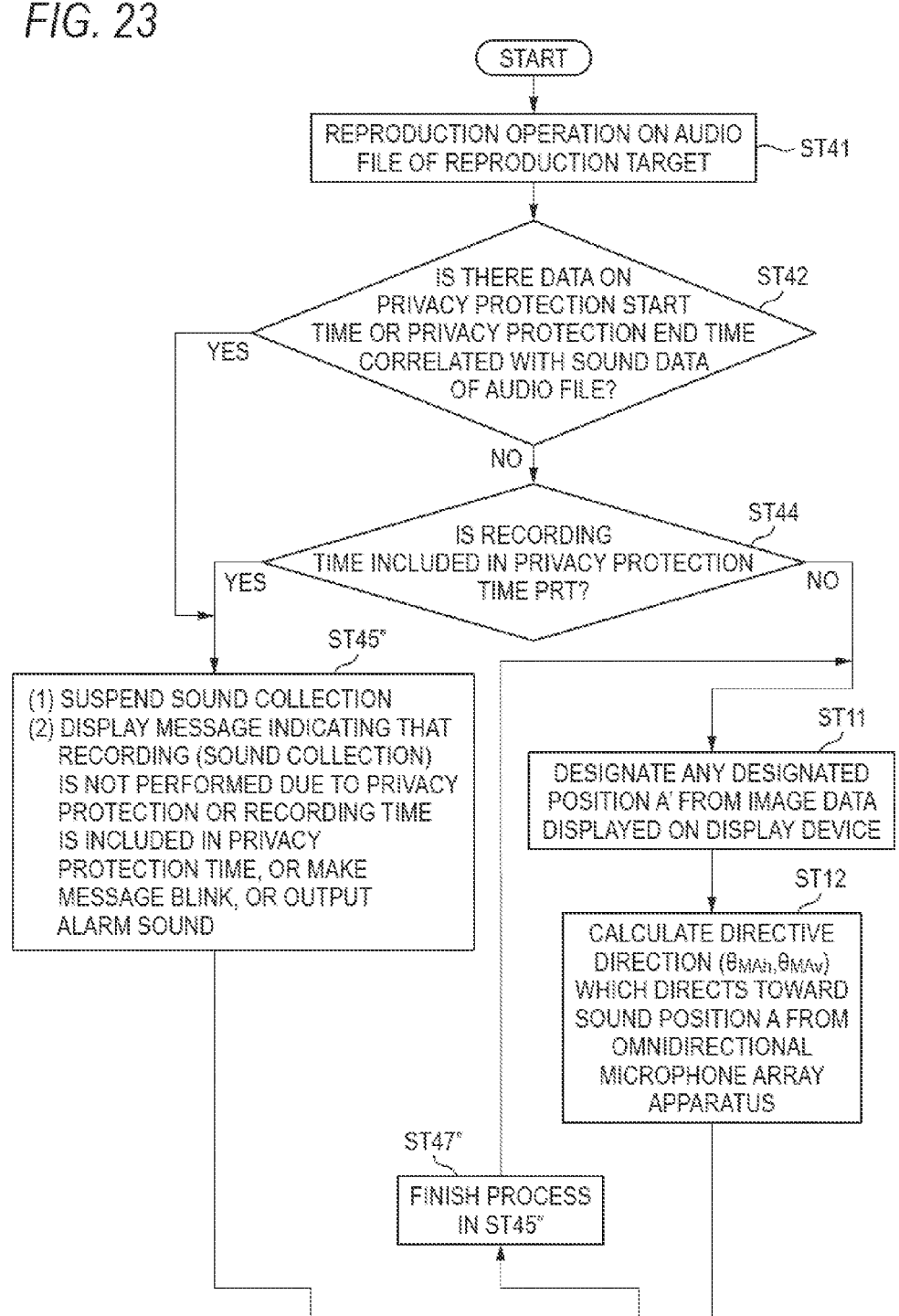
FIG. 23 is a flowchart illustrating an operation procedure of changing a sound collection process between being continued and being suspended depending on whether or not a privacy protection signal is received in a case where the directivity control system of the second embodiment reproduces sound data of a recorded audio file.

FIG. 23 is a flowchart illustrating an operation procedure of changing a sound collection process between being continued and being suspended depending on whether or not the privacy protection signal is received in a case where the directivity control system of the second embodiment reproduces sound data of a recorded audio file. In description of the flowchart illustrated in FIG. 23, content different from the description of the flowchart illustrated in FIG. 19 will be described, and description of the same content will be omitted or made briefly.

A main difference between the flowchart illustrated in FIG. 23 and the flowchart illustrated in FIG. 19 is an execution timing of each process in steps ST11 to ST13. In other words, in FIG. 23, each process in steps ST11 to ST13 is performed in a case where it is determined in step ST44 that the recording time is not included in the privacy protection time PRT.

Meanwhile, if it is determined that the recording time is included in the predetermined privacy protection time PRT (ST44, YES), or the data on the privacy protection start time and the privacy protection end time is correlated with sound data of the audio file (ST42, YES), the output control section 35A temporarily suspends collection of sounds in the omnidirectional microphone array apparatus 2 (ST45"). In addition, the output control section 35A explicitly notifies the user that the privacy protection signal PRS1 or PRS2 has been received, or that the recording time is included in the privacy protection time PRT (ST45"). The output control section 35A displays a message indicating that the privacy protection signal PRS1 or PRS2 has been received or makes the message blink on the display device 36, or outputs a predetermined alarm sound from the speaker device 37 (ST45").

In addition, after step ST45", the output control section 35A determines whether or not the recording time is excluded in the privacy protection time PRT or whether or not the recording time is later than the privacy protection end time (ST46). In other words, in step ST46, the output control section 35A determines whether or not the predetermined privacy protection time PRT ends, whether or not the privacy protection cancel signal has been received, or whether or not a predetermined time has elapsed after the privacy protection signal PRS1 or PRS2 was received, during reproduction of the audio file.

If it is determined that the recording time is not included in the privacy protection time PRT or is later than the privacy protection end time (ST46, YES), the output control section 35A finishes the process in step ST45" (ST47"), and then receives designation of any designated position A' in the image data displayed on the display device 36 via the operation unit 32 (ST11). Description of each process in steps ST11 to ST13 will not be repeated. After step ST13, the output control section 35A outputs the sounds whose directivity is formed in the directive direction $(\theta_{MAh}, \theta_{MAv})$ from the speaker device 37 without change (ST16). On the other hand, if it is determined that the recording time is included in the privacy protection time PRT or is not later than the privacy protection end time (ST46, NO), the process in step ST45" is continuously performed. Due to the above-described steps, the operation of the directivity control system 10A illustrated in FIG. 23 is finished.

As mentioned above, in the directivity control system 10A of the present embodiment, the external signal reception unit 39 of the directivity control apparatus 3A receives the privacy protection signal PRS1 which is transmitted from the privacy protection signal transmitter 7 which is an external device. When the privacy protection signal PRS1 transmitted from the privacy protection signal transmitter 7 is received, the output control section 35A of the directivity control apparatus 3A controls output of sounds collected by the omnidirectional microphone array apparatus 2 or sounds which are collected by the omnidirectional microphone array apparatus 2 and whose directivity is formed, or suspends collecting of sounds in the omnidirectional microphone array apparatus 2, in preference to a determination result of whether or not a sound position A is included in the privacy protection region PRA and a determination result of whether or not a sound collection time or a recording time is included in the privacy protection time PRT.

Accordingly, in the directivity control system 10A, for example, when the privacy protection signal PRS1 transmitted from the privacy protection signal transmitter 7 through an operation performed by a person who is a subject of the camera apparatus 11A, for example, even in a case where a position of the person who is a subject is not set in advance in the privacy protection region PRA, or a sound collection time or a recording time is not included in the privacy protection time PRT, the directivity control apparatus 3A can control output of sounds collected by the omnidirectional microphone array apparatus 2 or sounds which are collected by the omnidirectional microphone array apparatus 2 and whose directivity is formed, or can suspend collection of sounds in the omnidirectional microphone array apparatus 2, in the same manner as in a case where the position is included in the privacy protection region PRA, or the sound collection time or the recording time is included in the privacy protection time PRT. Therefore, for example, it is possible to prevent information from leaking to a third person other than the people involved.

In addition, the external signal reception unit 39 of the directivity control apparatus 3A receives a privacy protection cancel signal for canceling content of the privacy protection signal, transmitted from the privacy protection signal transmitter 7. In a case where the privacy protection cancel signal is received, or a predetermined period has elapsed from reception of the privacy protection signal, the output control section 35A of the directivity control apparatus 3A finishes output control of sounds collected by the omnidirectional microphone array apparatus 2 or sounds which are collected by the omnidirectional microphone array apparatus 2 and whose directivity is formed, or restarts collection of sounds in the omnidirectional microphone array apparatus 2.

Accordingly, in the directivity control system 10A, for example, in a case where the privacy protection cancel signal, which is transmitted from the privacy protection signal transmitter 7 due to a user's operation using the privacy protection signal transmitter 7, is received, or a predetermined period has elapsed from reception of the privacy protection signal, the directivity control apparatus 3A can output sounds of conversation content which may be heard by a third person other than those involved, such as chat content after conversations using highly confidential information are finished.

Hereinafter, description will be made of configurations, operations, and effects in some aspects of the above-described directivity control system and sound output control method according to the present invention.

A first aspect of the present invention provides a directivity control system including: at least one imaging part that captures an image; a sound collection part that collects sounds; a display part that displays image data captured by the at least one imaging part; a directive direction calculation part that calculates a directive direction which directs toward a sound position corresponding to a designated position of the image data from the sound collection part when any position of the displayed image data is designated; and a control part that forms a directivity in the sounds collected by the sound collection part in the calculated directive direction, wherein the control part controls output of the sounds collected by the sound collection part or output of the sounds which are collected by the sound collection part and of which the directivity is formed, or suspends collection of sounds in the sound collection part, when it is determined that the sound position is included in a preset protection region.

A second aspect of the present invention provides a directivity control system including: at least one imaging part that captures an image; a sound collection part that collects sounds; a recording part that records the sounds collected by the sound collection part; a display part that displays image data captured by the at least one imaging part; a directive direction calculation part that calculates a directive direction which directs toward a sound position corresponding to a designated position of the image data from the sound collection part when any position of the displayed image data is designated; and a control part that forms a directivity in the sounds collected by the sound collection part in the calculated directive direction, wherein the control part controls output of the sounds collected by the sound collection part or output of the sounds which are collected by the sound collection part and of which the directivity is formed, or suspends collection of sounds in the sound collection part, when it is determined that a sound collection time in the sound collection part or a recording time in the recording part is included in a preset protection time.

The directivity control system may be configured in that the control part performs a notification indicating that the sound position corresponding to the designated position of the image data is included in the preset protection region.

The directivity control system may be configured in that the control part performs a notification indicating that the sound collection time in the sound collection part or the recording time in the recording part is included in the preset protection time.

The directivity control system may be configured by further including an external signal reception part that receives a first protection signal transmitted from an external device, wherein the control part controls output of the sounds collected by the sound collection part or output of the sounds which are collected by the sound collection part and of which the directivity is formed, or suspends collection of sounds in the sound collection part, when the first protection signal is received in preference to a determination result of whether or not the sound position is included in the protection region.

The directivity control system may be configured by further including an external signal reception part that receives a first protection signal transmitted from an external device, wherein the control part controls output of the sounds collected by the sound collection part or output of the sounds which are collected by the sound collection part and of which the directivity is formed, or suspends collection of sounds in the sound collection part, when the first protection signal is received in preference to a determination result of whether or not the sound collection time in the sound collection part or the recording time in the recording part is included in the protection time.

The directivity control system may be configured in that the control part performs a notification indicating that the first protection signal is received from the external device.

The directivity control system may be configured in that when a first privacy protection cancel signal for canceling the first protection signal transmitted from the external device is received, or a first predetermined time has elapsed from reception of the first protection signal, the control part finishes output control of the sounds collected by the sound collection part or output control of the sounds which are collected by the sound collection part and of which the directivity is formed, or restarts collection of the sounds in the sound collection part.

The directivity control system may be configured by further including a communication part that receives a second protection signal transmitted from the at least one imaging part, wherein the control part controls output of the sounds collected by the sound collection part or output of the sounds which are collected by the sound collection part and of which the directivity is formed, or suspends collection of sounds in the sound collection part, when the second protection signal is received in preference to a determination result of whether or not the sound position is included in the protection region.

The directivity control system may be configured by further including a communication part that receives a second protection signal transmitted from the at least one imaging part, wherein the control part controls output of the sounds collected by the sound collection part or output of the sounds which are collected by the sound collection part and of which the directivity is formed, or suspends collection of sounds in the sound collection part, when the second protection signal is received in preference to a determination result of whether or not the sound collection time in the sound collection part or the recording time in the recording part is included in the protection time.

The directivity control system may be configured in that the control part performs a notification indicating that the second protection signal is received from the at least one imaging part.

The directivity control system may be configured in that when a second privacy protection cancel signal for canceling the second protection signal transmitted from the at least one imaging part is received, or a second predetermined time has elapsed from reception of the second protection signal, the control part finishes output control of the sounds collected by the sound collection part or output control of the sounds which are collected by the sound collection part and of which the directivity is formed, or restarts collection of the sounds in the sound collection part.

The directivity control system may be configured in that the control part controls output of the sounds collected by the sound collection part or output of the sounds which are collected by the sound collection part and of which the directivity is formed, by performing a mute process, a masking process, or a voice change process on sound data of the sounds collected by the sound collection part or sound data of the sounds which are collected by the sound collection part and of which the directivity is formed.

The directivity control system may be configured in that the control part performs a notification indicating that the sound position corresponding to the designated position of the image data is included in the protection region by displaying the notification or making notification blink on the display part or by outputting a predetermined alarm sound.

The directivity control system may be configured in that the control part performs a notification indicating that the sound collection time in the sound collection part or the recording time in the recording part is included in the protection time by displaying the notification or making notification blink on the display part or by outputting a predetermined alarm sound.

A third aspect of the present invention provides a sound output control method in a directivity control system including at least one imaging part that captures an image and a sound collection part that collects sounds, the method including: displaying image data captured by the at least one imaging part; calculating a directive direction which directs toward a sound position corresponding to a designated position of the image data from the sound collection part when any position of the displayed image data is designated; forming a directivity in the sounds collected by the sound collection part in the calculated directive direction; determining whether or not the sound position is included in a preset protection region; and controlling output of the sounds collected by the sound collection part or output of the sounds which are collected by the sound collection part and of which the directivity is formed, or suspending collection of sounds in the sound collection part, when it is determined that the sound position is included in the protection region.

A fourth aspect of the present invention provides a sound output control method in a directivity control system including at least one imaging part that captures an image, a sound collection part that collects sounds, and a recording part that records the sounds collected by the sound collection part, the method including: displaying image data captured by the at least one imaging part; calculating a directive direction which directs toward a sound position corresponding to a designated position of the image data from the sound collection part when any position of the displayed image data is designated; forming a directivity in the sounds collected by the sound collection part in the calculated directive direction; determining whether or not a sound collection time in the sound collection part or a recording time in the recording part is included in a preset protection time; and controlling output of the sounds collected by the sound collection part or output of the sounds which are collected by the sound collection part and of which the directivity is formed, or suspending collection of sounds in the sound collection part, when it is determined that the sound collection time in the sound collection part or the recording time in the recording part is included in the protection time.

As mentioned above, various embodiments have been described with reference to the drawings, but, needless to say, the present invention is not limited to the embodiments. It is obvious that those skilled in the art can conceive of various modifications or alterations in the scope recited in the claims, and it is understood that the modifications or alterations naturally fall within the technical scope of the present invention.

The present invention is useful as a directivity control system and a sound output control method capable of forming a directivity of collected sounds in a directive direction which directs toward a designated sound position from a microphone array apparatus, and controlling output of sounds collected by the microphone array apparatus or sounds collected by the microphone array apparatus and whose directivity is formed, or suspending collection of sounds in a case where the designated sound position is included in a predetermined privacy protection region or a sound collection time or a recording time is included in a predetermined privacy protection time.

The present application is based on and claims the benefit of Japanese patent applications No. 2013-131797 filed on Jun. 24, 2013 and No. 2013-223717 filed on Oct. 28, 2013, the contents of which are incorporated by reference in its entirety.

What is claimed is:

1. A directivity control system comprising:
   at least one imager that is arranged to capture an image of an area, wherein the area includes a privacy protection region;
   a sound collector that is arranged to collect sounds from the area;
   a display that, in operation, displays the image of the area captured by the imager, and that permits selection of an image position in the displayed image of the area, wherein the privacy protection region is predefined prior to selection of the image position; and
   a controller which, in operation,
   finds a sound position in the area that corresponds to the image position selected in the displayed image of the area,
   calculates a pointed direction from the sound collector to the sound position and provides directivity to the sounds collected by the sound collector in accordance with the pointed direction,
   responsive to the sound position inside the predefined privacy protection region, restricts output of the sounds provided with the directivity, and
   responsive to the sound position outside the predefined privacy protection region, outputs the sounds provided with the directivity.

2. A sound control method implemented in a directivity control system including at least one imager that captures an image of an area and a sound collector that collects sounds from the area, the method comprising:
   displaying an image of the area captured by the imager, wherein the area includes a privacy protection region;
   selecting an image position in the displayed image of the area, wherein the privacy protection region is predefined prior to the selection of the image position;
   finding a sound position in the area that corresponds to the image position selected in the displayed image of the area;
   calculating a pointed direction from the sound collector to the sound position and providing directivity to the sounds collected by the sound collector in accordance with the pointed direction;
   responsive to the sound position inside the predefined privacy protection region, restricting output of the sounds provided with the directivity, and
   responsive to the sound position outside the predefined privacy protection region, outputting the sounds provided with the directivity.

3. The sound control method according to claim 2, further comprising:
   issuing a notification indicating that the sound position is inside the predefined privacy protection region.

4. The sound control method according to claim 3, wherein the notification is displayed.

5. The sound control method according to claim 3, wherein the notification is issued as an alarm sound.

6. The sound control method according to claim 2, further comprising:
   receiving a protection signal transmitted from an external device, and
   restricting output of the sounds provided with the directivity, or suspending collection of sounds by the sound collector, when the protection signal is received.

7. The sound control method according to claim 6, further comprising:
   issuing a notification indicating that the protection signal is received from the external device.

8. The sound control method according to claim 6, further comprising:
   receiving a cancelation signal; and
   stopping the output restriction of the sounds provided with the directivity, or restarting collection of sounds by the sound collector, when the cancelation signal is received.

9. The sound control method according to claim 6, further comprising:
   stopping the output restriction of the sounds provided with the directivity, or restarting collection of sounds by the sound collector, when a first time period has elapsed from reception of the protection signal.

10. The sound control method according to claim 2, further comprising:
    receiving a protection signal transmitted from the imager, and
    restricting output of the sounds provided with the directivity, or suspending collection of sounds by the sound collector, when the protection signal is received.

11. The sound control method according to claim 10, further comprising:
    issuing a notification indicating that the protection signal is received from the imager.

12. The sound control method according to claim 10, further comprising:
    receiving a cancelation signal; and
    stopping the output restriction of the sounds provided with the directivity, or restarting collection of sounds by the sound collector, when the cancellation signal is received.

13. The sound control method according to claim 10, further comprising:
    stopping the output restriction of the sounds provided with the directivity, or restarting collection of sounds by the sound collector, when a second time period has elapsed from reception of the protection signal.

14. The sound control method according to claim 2, wherein the output restriction of the sounds provided with the directivity includes at least one of a mute process, a masking process, and a voice change process.

15. The sound control method according to claim 2, wherein the image position in the displayed image of the area is selected by a user.

16. The sound control method according to claim 15, wherein the image position is selected by a user placing a pointer at the image position in the displayed image of the area.

17. The sound control method according to claim 2, wherein the privacy protection region is predefined by a user.

18. The sound control method according to claim 17, wherein the privacy protection region is predefined by a user placing a pointer at the privacy protection region in the displayed image of the area.

19. A non-transitory computer-readable medium including computer-executable instructions which, when loaded onto a computer, perform a process of controlling a system including at least one imager that captures an image of an area and a sound collector that collets sounds from the area, the process comprising:

displaying an image of the area captured by the imager, wherein the area includes a privacy protection region;

selecting an image position in the displayed image of the area, wherein the privacy protection region is predefined prior to the selection of the image position;

finding a sound position in the area that corresponds to the image position selected in the displayed image of the area;

calculating a pointed direction from the sound collector to the sound position and providing directivity to the sounds collected by the sound collector in accordance with the pointed direction;

responsive to the sound position inside the privacy protection region, restricting output of the sounds provided with the directivity, and responsive to the sound position outside the privacy protection region, outputting the sounds provided with the directivity.

20. The non-transitory computer-readable medium according to claim 19, wherein the output restriction of the sounds provided with the directivity includes at least one of a mute process, a masking process, and a voice change process.

\* \* \* \* \*